(12) United States Patent
Kusaka et al.

(10) Patent No.: US 8,379,126 B2
(45) Date of Patent: Feb. 19, 2013

(54) IMAGE-SENSING APPARATUS

(75) Inventors: Yasushi Kusaka, Mishima-Gun (JP); Tomokazu Kakumoto, Nagaokakyo (JP); So Yano, Ibaraki (JP); Katsuhiko Asai, Sakai (JP); Satoshi Nakamura, Ikeda (JP)

(73) Assignee: Konica Minolta Holdings, Inc., Tokyo (JP)

( * ) Notice: Subject to any disclaimer, the term of this patent is extended or adjusted under 35 U.S.C. 154(b) by 2560 days.

(21) Appl. No.: 10/963,084

(22) Filed: Oct. 12, 2004

(65) Prior Publication Data
US 2005/0052557 A1 Mar. 10, 2005

Related U.S. Application Data

(63) Continuation of application No. 09/602,876, filed on Jun. 23, 2000, now abandoned.

(30) Foreign Application Priority Data

| Jun. 24, 1999 | (JP) | H11-178963 |
| Jun. 25, 1999 | (JP) | H11-179548 |
| Jun. 25, 1999 | (JP) | H11-180635 |
| Jun. 28, 1999 | (JP) | H11-182169 |
| Jul. 12, 1999 | (JP) | H11-198027 |
| Jan. 6, 2000 | (JP) | 2000-005780 |

(51) Int. Cl.
*H04N 5/335* (2011.01)
*H04N 5/235* (2006.01)

(52) U.S. Cl. ................. 348/308; 348/229.1
(58) Field of Classification Search .......... None
See application file for complete search history.

(56) References Cited

U.S. PATENT DOCUMENTS

| 4,973,833 A | 11/1990 | Takada et al. ............. 250/208.1 |
| 5,241,575 A | 8/1993 | Miyatake et al. ............. 377/60 |
| 5,289,286 A | 2/1994 | Nakamura et al. ............ 438/223 |
| 5,861,621 A | 1/1999 | Takebe et al. ............. 250/214 R |
| 6,191,408 B1 * | 2/2001 | Shinotsuka et al. ....... 250/208.1 |
| 6,323,479 B1 | 11/2001 | Hynecek et al. .......... 250/214 L |

FOREIGN PATENT DOCUMENTS

JP 5-308522 A 11/1993

* cited by examiner

*Primary Examiner* — William C Vaughn, Jr.
*Assistant Examiner* — Heather Jones
(74) *Attorney, Agent, or Firm* — Cozen O'Connor

(57) ABSTRACT

When the brightness of a subject detected by a detecting device 4 is higher than a predetermined value, for example 700 [cd/m$^2$], a switching judgment circuit 5 judges that an area sensor (solid-state image-sensing device) 3 should perform logarithmic conversion. In response to this judgment by the switching judgment circuit 5, a switching signal generating circuit 6 outputs a switching signal to instruct the area sensor 3 to perform logarithmic conversion. When the brightness of the subject detected by the detecting device 4 is lower than the predetermined value, for example 700 [cd/m$^2$], a switching judgment circuit 5 judges that the area sensor 3 should perform linear conversion. In response to this judgment by the switching judgment circuit 5, the switching signal generating circuit 6 outputs a switching signal to instruct the area sensor 3 to perform linear conversion.

27 Claims, 30 Drawing Sheets

DISTANCE ⋯ REMOTE

MAGNIFY ⋯ HIGH

DISTANCE ⋯ CLOSE

MAGNIFY ⋯ LOW

DISTANCE ⋯ REMOTE

MAGNIFY ⋯ LOW

IMAGE-SENSING APPARATUS

This application is a continuation application of application Ser. No. 09/602,876, filed Jun. 23, 2000 now abandoned, which is based on applications Nos. H11-178963, H11-179548, H11-180635, H11-182169, H11-198027, and 2000-005780 filed in Japan on Jun. 24, 1999, Jun. 25, 1999, Jun. 25, 1999, Jun. 28, 1999, Jul. 12, 1999, and Jan. 6, 2000, respectively, the entire contents of which is hereby incorporated by reference.

BACKGROUND OF THE INVENTION

1. Field of the Invention

The present invention relates to an image-sensing apparatus having a solid-state image-sensing device that can convert incident light into an electric signal selectively either linearly or logarithmically, and particularly to an image-sensing apparatus having a single image-sensing device whose operation can be switched between linear conversion and logarithmic conversion.

2. Description of the Prior Art

Conventionally, a solid-state image-sensing device, such as an area sensor, having photosensitive devices, such as photodiodes, arranged in a matrix outputs a signal that is obtained by linearly converting the brightness of the light incident on those photosensitive devices. An area sensor that performs such linear conversion (an area sensor of this type will hereafter be referred to as a "linear sensor") is adjusted, for example by adjusting the aperture of a lens, in such a way that those of the photosensitive devices which are sensing the brightest parts (highlights) of a subject output an electric signal having about 90% of the maximum level that they can output. By using a linear sensor like this, it is possible to acquire the data of a subject with superb gradation as long as, assuming that the brightness of the subject distributes from a minimum value Lmin [$cd/m^2$] to a maximum value Lmax [$cd/m^2$], the brightness range of the subject Lmax/Lmin is so narrow as to be expressed with a two-digit value.

On the other hand, in U.S. Pat. No. 5,241,575, the assignee of the present invention once proposed an area sensor provided with a photosensitive device that outputs a photoelectric current in proportion to the amount of incident light, a MOS transistor to which the photoelectric current is fed, and a bias means for biasing the MOS transistor in such a way that a subthreshold current flows therethrough, so that the photoelectric current is converted logarithmically (an area sensor of this type will hereafter be referred to as a "LOG sensor"). A LOG sensor like this, by being adjusted in the same manner as with a linear sensor, i.e. in such a way that those of its photosensitive devices which are sensing the brightest parts (highlights) of a subject output an electric signal having about 90% of the maximum level that they can output, permits the data of the subject to be acquired in a brightness range Lmax/Lmin so wide as to be expressed with a five- to six-digit value.

However, a linear sensor permits image sensing in a brightness range so narrow as to be expressed with a two-digit value. Accordingly, when the brightness of a subject is high, as in a case where the subject is in direct sunlight, the brightness of bright parts of the subject exceeds the level that the photosensitive devices can handle, and thus causes an overflow in them. This makes it impossible to acquire the data of parts of the subject where the brightness exceeds that level, and thereby causes saturation. Saturation can be avoided by shifting the brightness range in which data acquisition is feasible into a brighter region to make it possible to acquire the data of bright parts of the subject; however, this in turn makes it impossible to acquire the data of dim parts of the subject, and thus leads to flat blackness.

On the other hand, a LOG sensor offers a logarithmic output characteristic as shown in FIG. 36. Therefore, using a LOG sensor tends to result in poor gradation in bright parts of a subject. Accordingly, for example, whereas a LOG sensor permits acquisition of both dim and bright parts of a brightly-lit subject, it yields rather poor gradation in bright parts of a dimly-lit subject.

Given the characteristics of a linear sensor and of a LOG sensor described above, it will be understood that a linear sensor is effective in shooting a subject having a narrow brightness range and that a LOG sensor is effective in shooting a subject having a wide brightness range. Accordingly, a linear sensor is effective in shooting a subject while zooming in on it or in shooting a subject at a close distance, because in such cases the shooting range is narrow and thus, generally, the brightness range is also narrow. By contrast, a LOG sensor is effective in shooting a subject at a far distance without zooming in on it, particularly when shooting it outdoors under a clear sky, because in such cases the shooting range is wide and thus the brightness range is also wide.

SUMMARY OF THE INVENTION

An object of the present invention is to provide an image-sensing apparatus that achieves satisfactory image sensing with various subjects.

Another object of the present invention is to provide an image-sensing apparatus that achieves satisfactory image sensing invariably irrespective of the brightness of a subject.

Another object of the present invention is to provide an image-sensing apparatus in which whether to convert the amount of light incident on an image-sensing device into an electric signal linearly or logarithmically can be switched automatically.

Another object of the present invention is to provide an image-sensing apparatus in which whether to convert the amount of light incident on an image-sensing device into an electric signal linearly or logarithmically can be switched manually by the user.

Another object of the present invention is to provide an image-sensing apparatus having a single image-sensing device whose operation can be switched between linear conversion and logarithmic conversion.

To achieve the above objects, according to the present invention, an image-sensing apparatus is provided with: a solid-state image-sensing device, composed of a plurality of pixels individually including photosensitive portions that generate electric signals in accordance with amount of light incident thereon, that operates selectively either in a first state in which the individual pixels output signals obtained by linearly converting the electric signals generated by the photosensitive portions thereof or in a second state in which the individual pixels output signals obtained by natural-logarithmically converting the electric signals generated by the photosensitive portions thereof; and a generator for generating a switching signal for switching the solid-state image-sensing device between the first and second states.

This image-sensing apparatus configured as described above permits high-quality images to be shot in accordance with the brightness of a subject by bringing the solid-state image-sensing device, for example, into the first state when the subject is dimly lit and into the second state when the subject is brightly lit.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
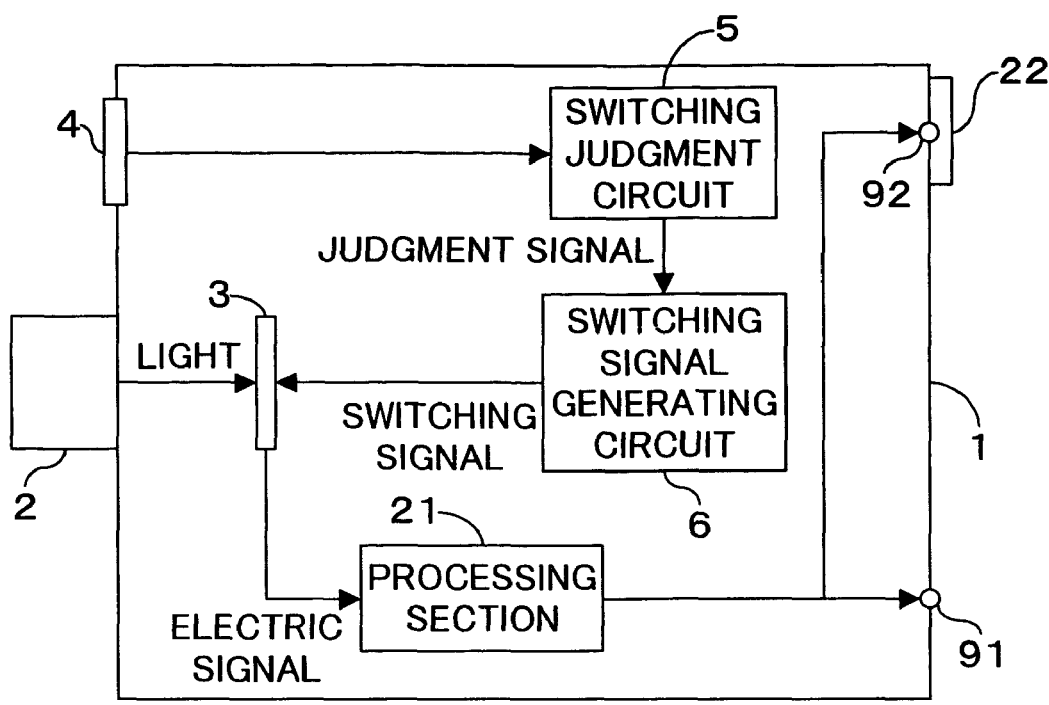
FIG. 1 is a block diagram showing the internal structure of the image-sensing apparatus of a first embodiment of the invention.
Figure 2:
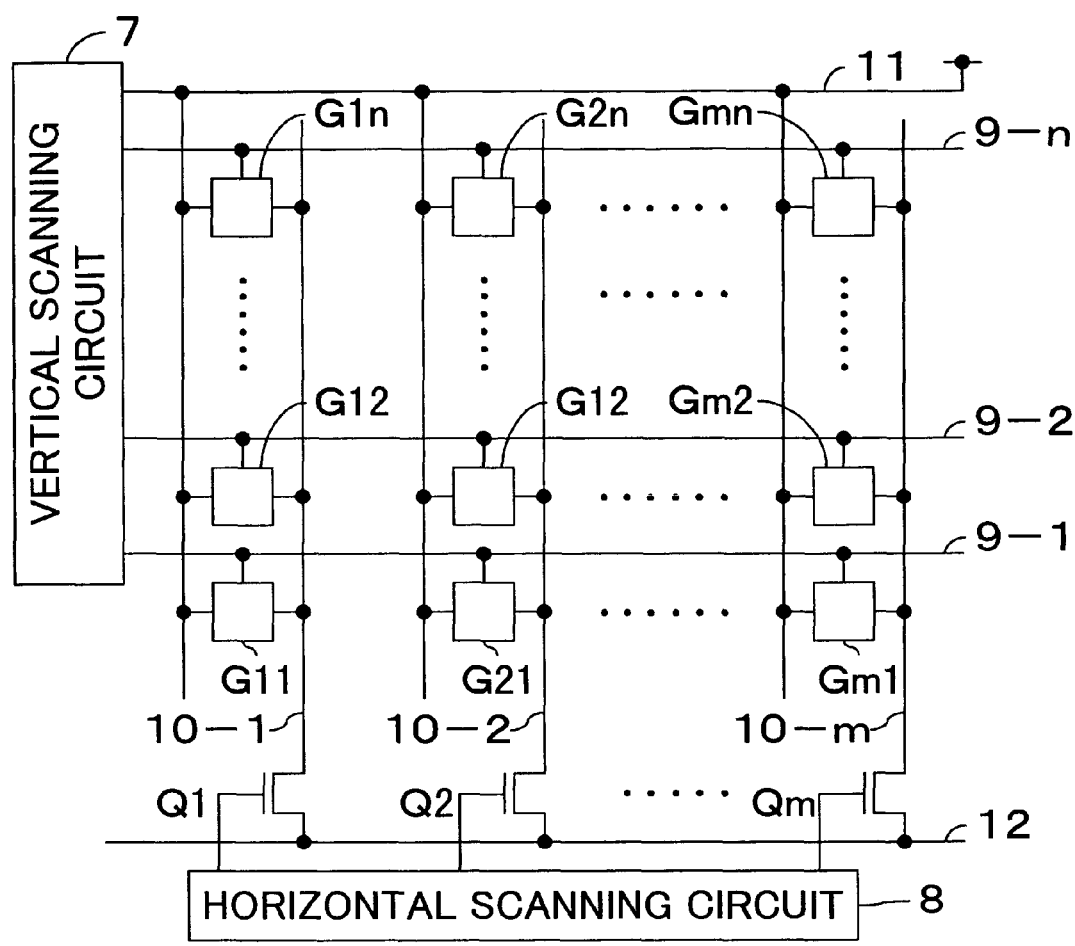
FIG. 2 is a diagram showing an example of the internal structure of the area sensor used in an image-sensing apparatus.
Figure 3:
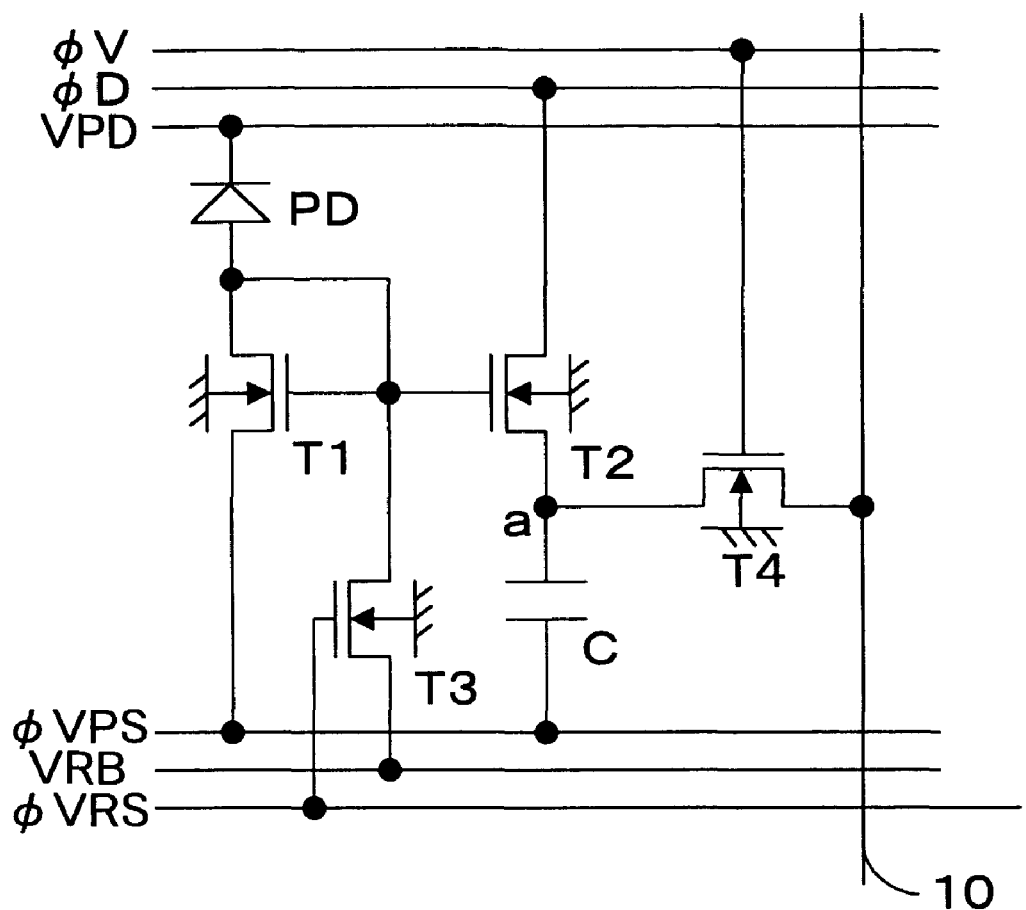
FIG. 3 is a diagram showing an example of the circuit configuration of each pixel provided in an area sensor.
Figure 4:
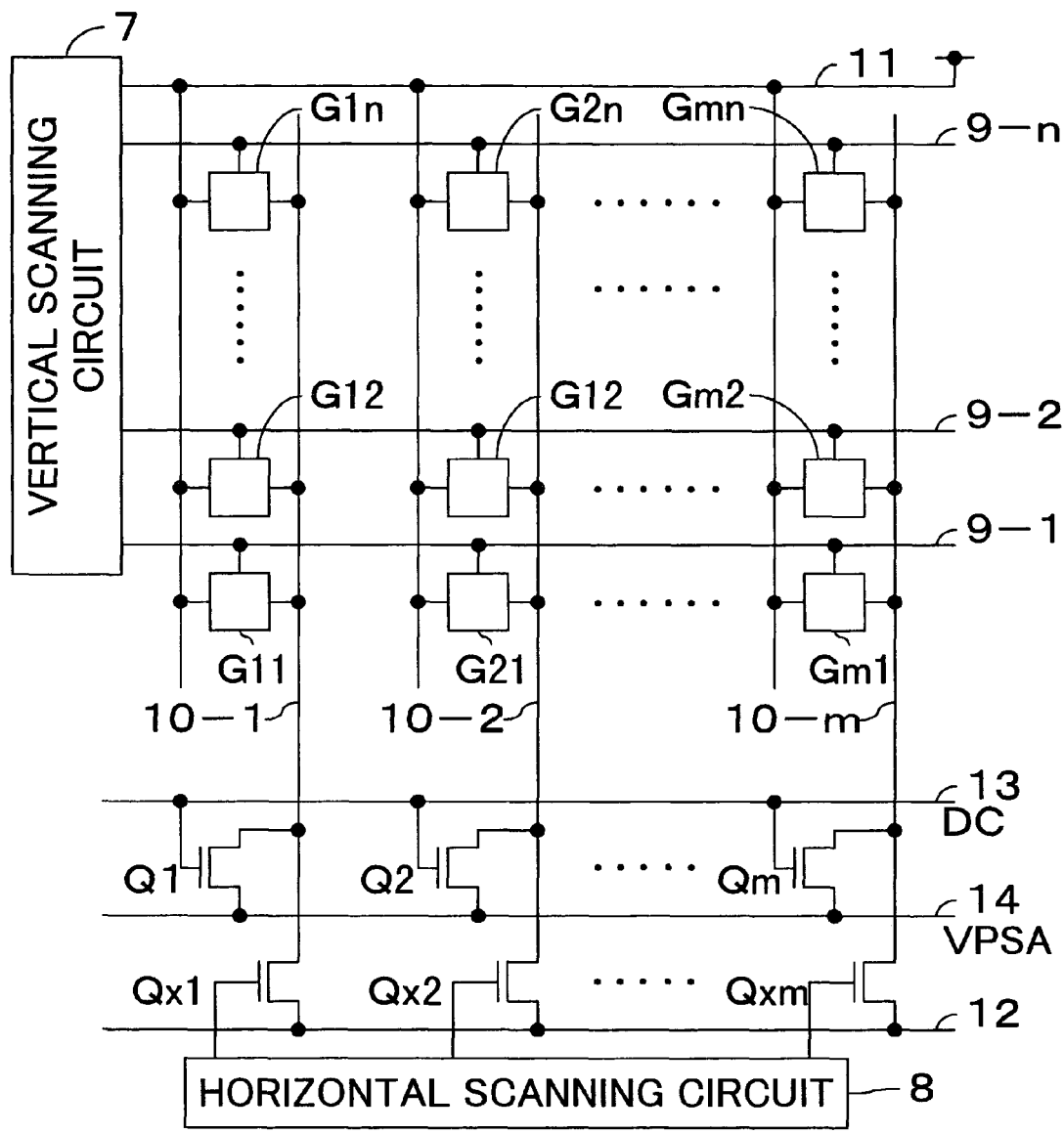
FIG. 4 is a diagram showing an example of the internal structure of the area sensor used in an image-sensing apparatus.
Figure 6:
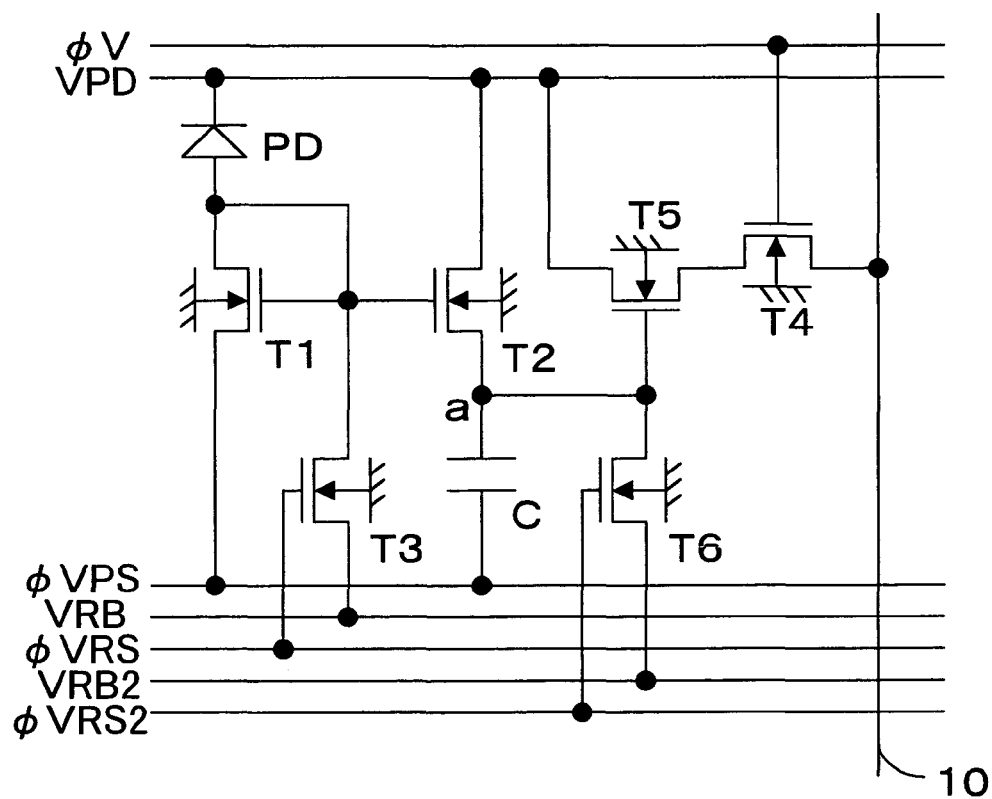
FIG. 6 is a diagram showing an example of the circuit configuration of each pixel provided in an area sensor.

A first embodiment of the present invention will be described below with reference to the relevant drawings. FIG. 1 is a block diagram showing the internal structure of the image-sensing apparatus of a first embodiment of the invention. FIGS. 2 and 4 are block diagrams showing examples of the structure of the area sensor used as a solid-state image-sensing device in the image-sensing apparatus shown in FIG. 1. FIG. 3 is a circuit diagram showing an example of the circuit configuration of each pixel of the area sensor shown in FIG. 2. FIG. 6 is a circuit diagram showing an example of the circuit configuration of each pixel of the area sensor shown in FIG. 4.

In FIG. 1, the image-sensing apparatus 1 has an area sensor 3 that outputs an electric signal obtained by logarithmically or linearly converting the light incident thereon through an objective lens 2, a detector 4 for detecting the brightness of a subject, a switching judgment circuit 5 that determines whether to switch the operation of the area sensor 3 to logarithmic or linear conversion in accordance with the level of the electric signal fed from the detector 4 and that generates a judgment signal, a switching signal generating circuit 6 that feeds the area sensor 3 with a switching signal to switch the operation of the area sensor 3 between logarithmic and linear conversion, and a processing section 21 that processes the electric signal output from the area sensor 3. The detector 4 is composed of, for example, a photodiode or phototransistor. The signal processed by the processing section 21 is fed out of the image-sensing apparatus 1 via an output terminal 91 so as to be used for various purposes, such as for storage on a recording medium and for output to a display device. This signal is fed also via another output terminal 92 to a viewfinder 22.

1. An Example of the Circuit Configuration of the Area Sensor

Now, an example of the circuit configuration of the area sensor 3 used in this image-sensing apparatus configured as described above will be described with reference to FIG. 2. In this figure, reference symbols G11 to Gmn represent pixels that are arranged in a two-dimensional array (in a matrix).

Reference numeral 7 represents a vertical scanning circuit, which scans lines (rows) 9-1, 9-2, . . . , 9-$n$ sequentially. Reference numeral 8 represents a horizontal scanning circuit, which reads out, sequentially pixel by pixel in a horizontal direction, the signals fed from the individual pixels to output signal lines 10-1, 10-2, . . . , 10-$m$ as a result of photoelectric conversion performed in those pixels. Reference numeral 11 represents a power line. The individual pixels are connected not only to the lines 9-1, 9-2, . . . , 9-$n$, to the output signal lines 10-1, 10-2, . . . , 10-$m$, and to the power line 11 mentioned above, but also to other lines (for example clock lines and bias supply lines). These other lines, however, are omitted in FIG. 2.

As shown in the figure, N-channel MOS transistors Q1, Q2, . . . , Qm are provided one for each of the output signal lines 10-1, 10-2, . . . , 10-$m$. The MOS transistors Q1, Q2, . . . , Qm have their drains connected to the output signal lines 10-1, 10-2, . . . , 10-$m$ respectively, have their sources connected to a signal line 12 serving as a final destination line, and have their gates connected to the horizontal scanning circuit 8. As will be described later, within each pixel, another N-channel MOS transistor (a fourth MOS transistor) T4 functioning as a switch is provided. Whereas this MOS transistor T4 serves to select a row (line), the MOS transistors Q1, Q2, . . . , Qm serve to select a column.

Next, an example of the circuit configuration of each pixel of this area sensor 3 will be described with reference to FIG. 3. In FIG. 3, a pn photodiode PD serves as a photosensitive element (photoelectric conversion element). The anode of this photodiode PD is connected to the drain and the gate of a first MOS transistor T1, also to the gate of a second MOS transistor T2, and also to the drain of a third MOS transistor T3. The source of the MOS transistor T2 is connected to the drain of a fourth MOS transistor T4 for selecting a row. The source of this MOS transistor T4 is connected to the output signal line 10 (this output signal line 10 corresponds to one of the output signal lines 10-1, 10-2, . . . , 10-$m$ shown in FIG. 2). The MOS transistors T1, T2, T3, and T4 are all N-channel MOS transistors, and have their back gates grounded.

A direct-current voltage VPD is applied to the cathode of the photodiode PD. On the other hand, a signal φVPS is applied to the source of the MOS transistor T1, and also to one end of a capacitor C of which the other end is connected to the source of the MOS transistor T2. A direct-current voltage VRB is applied to the source of the MOS transistor T3, and a signal φVRS is fed to the gate of the same MOS transistor T3. A signal φD is fed to the drain of the MOS transistor T2. Moreover, a signal φV is fed to the gate of the MOS transistor T4. It is to be noted that, in this embodiment, the signal φVPS is a binary signal that takes one of two predetermined levels, i.e. either a low level or a high level, at a time. Here, a low level refers to a level that causes the MOS transistors T1 and T2 to operate in a subthreshold region, and a high level is a level that is approximately equal to the direct-current voltage VPD.

In this pixel having a circuit configuration as described above, by switching the voltage of the signal φVPS and thereby switching the bias to the MOS transistor T1, it is possible to switch between two modes of conversion so as to allow the output signal fed from each pixel to the output signal line 10 to vary either natural-logarithmically or linearly with respect to the electric signal (hereinafter referred to as the "photoelectric current") that the photodiode PD outputs in accordance with the amount of light entering it. A brief description of each of these two modes will be given below.
(1) Mode in which the Output Signal is Produced by Converting the Photoelectric Current Natural-Logarithmically First, a description will be given of how conversion is achieved when the signal φVPS is kept at a low level to permit the MOS transistors T1 and T2 to operate in a subthreshold region. In this mode, where the signal φVRS fed to the gate of the MOS transistor T3 is kept at a low level, the MOS transistor T3 remains off, and can thus be ignored as substantially absent. On the other hand, the signal φD fed to the MOS transistor T2 is at a high level (at a potential equal to or close to the direct-current voltage VPD).

In the circuit shown in FIG. 3, when light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, electric charge that is equivalent to the value obtained by converting the integral of the photoelectric current natural-logarithmically is accumulated in the capacitor C. That is, a voltage proportional to the value obtained by converting the integral of the photoelectric current natural-logarithmically appears at the node "a" between the capacitor C and the source of the MOS transistor T2. At this time, the MOS transistor T4 is off.

Next, the signal φV, which is a pulse signal, is fed to the gate of the MOS transistor T4 to turn this MOS transistor T4 on. This causes the electric charge accumulated in the capacitor C to be fed as the output current to the output signal line 10. This current thus fed to the output signal line 10 has the value obtained by converting the integral of the photoelectric current natural-logarithmically. In this way, it is possible to read a signal (output current) that is proportional to the logarithm of the amount of incident light. After this signal has been read, the MOS transistor T4 is turned off, and the signal φD is turned to a low level (to a potential lower than the signal φVPS), so that the electric charge accumulated in the capacitor C is discharged through the MOS transistor T2 to the signal line of the signal φD, and thereby the potential at the capacitor C, and thus at the node "a", is initialized. By repeating this sequence of operations at regular time intervals, it is possible to shoot continuously an ever-changing subject image with a wide dynamic range. It is to be noted that, when the output current is so controlled as to vary natural-logarithmically with respect to the amount of incident light as in this mode, the signal φVRS is kept at a low level all the time, and thus the MOS transistor T3 remains off.
(2) Mode in which the Output Signal is Produced by Converting the Photoelectric Current Linearly Next, a description will be given of how conversion is achieved when the signal φVPS is kept at a high level. In this mode, the potential at the source of the MOS transistor T1 is kept at a high level. Accordingly, the MOS transistor T1 is kept substantially off, and thus no current flows through the channel between the source and the drain thereof. Moreover, the signal φVRS fed to the gate of the MOS transistor T3 is kept at a low level, and thus this MOS transistor T3 is kept off.

First, the MOS transistor T4 is turned off, and the signal φD is turned to a low level (to a potential lower than the signal φVPS), so that the electric charge in the capacitor C flows through the MOS transistor T2 to the signal line of the signal φD, and thereby the capacitor C is reset. As a result, the potential at the node "a" is initialized, for example, to a potential lower than the direct-current voltage VPD. This potential is maintained by the capacitor C. Thereafter, the signal φD is turned back to a high level (to a potential equal to or close to the direct-current voltage VPD). In this state, when light enters the photodiode PD, a photoelectric current is generated therein. At this time, since capacitors exist between the back gate and the gate of the MOS transistor T1 and at the junction of the photodiode PD, the electric charge resulting from the photoelectric current is accumulated mainly at the gates of the MOS transistors T1 and T2. Thus, the gate voltage of the MOS transistors T1 and T2 has the value proportional to the integral of the photoelectric current.

Now that, as a result of the initialization described above, the potential at the node "a" is lower than the direct-current voltage VPD, the MOS transistor T2 is on. As a result, a current corresponding to the gate voltage of the MOS transistor T2 flows through the MOS transistor T2 as its drain current, and thus electric charge proportional to the gate voltage of the MOS transistor T2 is accumulated in the capacitor C. Accordingly, the voltage at the node "a" has the value proportional to the integral of the photoelectric current. Next, the pulse signal $\phi V$ is fed to the gate of the MOS transistor T4 to turn this MOS transistor T4 on, so that the electric charge accumulated in the capacitor C is fed as the output current to the output signal line 10. This output current has the value obtained by converting the integral of the photoelectric current linearly.

In this way, it is possible to read a signal (output current) that is proportional to the amount of incident light. Thereafter, the MOS transistor T4 is turned off, and the signal $\phi D$ is turned to a low level, so that the electric charge accumulated in the capacitor C is discharged through the MOS transistor T2 to the signal line of the signal $\phi D$, and thereby the potential at the capacitor C, and thus at the node "a", is initialized. Thereafter, a high level is fed as the signal $\phi VRS$ to the gate of the MOS transistor T3 to turn this MOS transistor T3 on so as to initialize the photodiode PD, the drain voltage of the MOS transistor T1, and the gate voltage of the MOS transistors T1 and T2. By repeating this sequence of operations at regular time intervals, it is possible to shoot continuously an ever-changing subject image with a satisfactory S/N ratio.

As described above, in the pixel shown in FIG. 3, simple manipulation of potentials makes it possible to switch the output characteristics of the same pixel among different patterns of output characteristics. When the conversion mode is switched from logarithmic conversion to linear conversion, it is preferable to switch the output first by adjusting the potential of the signal $\phi VPS$ and then make the MOS transistor T3 reset the MOS transistor T1 and others. On the other hand, when the conversion mode is switched from linear conversion to logarithmic conversion, it is not necessary to make the MOS transistor T3 reset the MOS transistor T1 and others. This is because the carriers accumulated in the MOS transistor T1 as a result of the MOS transistor T1 not really being kept in a completely off state are canceled by carriers of the opposite polarity.

2. Another Example of the Circuit Configuration of the Area Sensor

Now, another example of the circuit configuration of the area sensor 3 will be described with reference to FIG. 4. In this figure, reference symbols G11 to Gmn represent pixels that are arranged in a two-dimensional array (in a matrix). Reference numeral 7 represents a vertical scanning circuit, which scans lines (rows) 9-1, 9-2, . . . , 9-n sequentially. Reference numeral 8 represents a horizontal scanning circuit, which reads out, sequentially pixel by pixel in a horizontal direction, the signals fed from the individual pixels to output signal lines 10-1, 10-2, . . . , 10-m as a result of photoelectric conversion performed in those pixels. Reference numeral 11 represents a power line. The individual pixels are connected not only to the lines 9-1, 9-2, . . . , 9-n, to the output signal lines 10-1, 10-2, . . . , 10-m, and to the power line 11 mentioned above, but also to other lines (for example clock lines and bias supply lines). These other lines, however, are omitted in FIG. 4.

As shown in the figure, N-channel MOS transistors Qx1, Qx2 . . . , Qxm and N-channel MOS transistors Q1, Q2, . . . , Qm are provided in pairs, one pair for each of the output signal lines 10-1, 10-2, . . . , 10-m. The MOS transistors Q1, Q2, . . . , Qm have their gates connected to a direct-current voltage line 13, have their drains connected to the output signal lines 10-1, 10-2, . . . , 10-m respectively, and have their sources connected to a direct-current voltage VPSA line 14. On the other hand, the MOS transistors Qx1, Qx2, . . . , Qxm have their drains connected to the output signal lines 10-1, 10-2, . . . , 10-m respectively, have their sources connected to a signal line 12 serving as a final destination line, and have their gates connected to the horizontal scanning circuit 8.

Figure 5A:
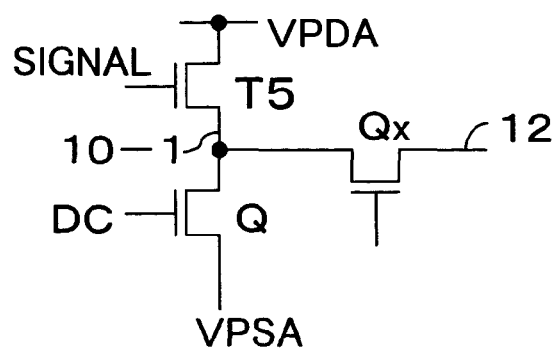
FIGS. 5A and 5B are circuit diagrams of a part of FIG. 4.

As will be described later, the pixels G11 to Gmn are each provided with an N-channel MOS transistor (a fifth MOS transistor) T5 that outputs a signal in accordance with the photoelectric charge generated in that pixel. How this MOS transistor T5 is connected to the MOS transistor Q (this transistor Q corresponds to the transistors Q1 to Qm shown in FIG. 4) is shown in FIG. 5A. Here, the direct-current voltage VPSA connected to the source of the MOS transistor Q and the direct-current voltage VPDA connected to the drain of the MOS transistor T5 fulfill the relation VPDA>VPSA, where the direct-current voltage VPSA is equal to, for example, the ground-level voltage. In this circuit configuration, the signal from a pixel is fed to the gate of the upper-stage MOS transistor T5, and a direct-current voltage DC is kept applied to the gate of the lower-stage MOS transistor Q. Thus, the lower-stage MOS transistor Q is equivalent to a resistor or constant-current source, and therefore the circuit shown in FIG. 5A forms an amplifier circuit of a source-follower type. Here, it can safely be assumed that, as a result of amplification, the MOS transistor T5 outputs a current.

Figure 5B:
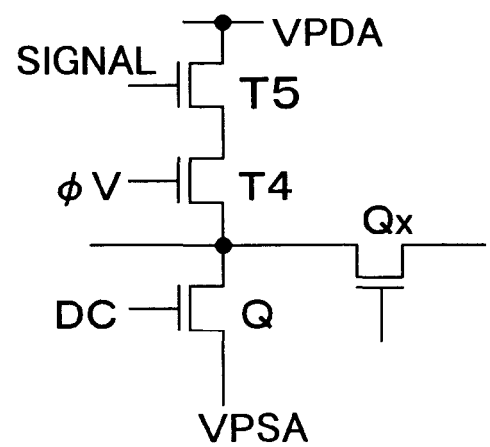

The MOS transistor Qx (this transistor Qx corresponds to the transistors Qx1 to Qxm shown in FIG. 4) is controlled by the horizontal scanning circuit 8 so as to function as a switching device. As will be described later, in the pixel shown in FIG. 6, another, i.e. a fourth, N-channel MOS transistor T4 functioning as a switch is provided. If this fourth MOS transistor T4 is illustrated explicitly, the circuit shown in FIG. 5A has, more precisely, a circuit configuration as shown in FIG. 5B. Specifically, the MOS transistor T4 is inserted between the MOS transistor Q and the MOS transistor T5. Here, the MOS transistor T4 serves to select a row (line), and the MOS transistor Qx serves to select a column.

The circuit configuration shown in FIGS. 5A and 5B permits the signal generated therein to be output with a high gain. Accordingly, even in a case where the photoelectric current generated in a photosensitive element is converted natural-logarithmically to obtain a wider dynamic range and thus the output signal obtained is comparatively low if left intact, this amplifier circuit amplifies the signal so as to make it sufficiently high and thus easier to process in the succeeding signal processing circuit (not shown). Here, the MOS transistor Q that serves as the load resistor of the amplifier circuit is provided within each pixel; however, such transistors may be provided, instead, one for each of the output signal lines 10-1, 10-2, . . . , 10-m, i.e. one for each of the groups of pixels constituting individual columns, with the pixels constituting each column collectively connected to one of the output signal lines 10-1, 10-2, . . . , 10-m. This helps reduce the number of load resistors or constant-current sources required, and thus reduce the area occupied by the amplifying circuits on a semiconductor chip.

Next, an example of the circuit configuration of each pixel of this area sensor 3, configured as shown in FIG. 4, will be described with reference to FIG. 6. It is to be noted that such elements, signal lines, and others as are used for the same purposes here as in the pixel shown in FIG. 3 are identified with the same reference symbols, and their detailed descriptions will be omitted.

In the pixel shown in FIG. 6, as compared with the pixel shown in FIG. 3, there are provided additionally a fifth MOS transistor T5 having its gate connected to the node "a" for performing current amplification in accordance with the voltage applied to the node "a", a fourth MOS transistor T4 having its drain connected to the source of the MOS transistor T5 for row selection, a sixth MOS transistor T6 having its drain connected to the node "a" for initializing the potential at the capacitor C, and thus at the node "a". The source of the MOS transistor T4 is connected to the output signal line 10 (this output signal line 10 corresponds to the output signal lines 10-1, 10-2, . . . 10-m shown in FIG. 4). Just like the MOS transistors T1 to T3, the MOS transistors T4 to T6 are all N-channel MOS transistors, and have their back gates grounded.

A direct-current voltage VPD is applied to the drains of the MOS transistors T2 and T5, and a signal φV is fed to the gate of the MOS transistor T4. A direct-current voltage VRB2 is applied to the source of the MOS transistor T6, and a signal φVRS2 is fed to the gate of the same MOS transistor T6. In this pixel, the MOS transistors T1 to T3 and the capacitor C operate in the same manner as in the pixel shown in FIG. 3, and thus, by switching the voltage of the signal φVPS and thereby switching the bias to the MOS transistor T1, it is possible to switch between two modes of conversion so as to allow the output signal fed to the output signal line 10 to vary either natural-logarithmically or linearly with respect to the photoelectric current. A brief description of each of these two modes will be given below.

(1) Mode in which the Output Signal is produced by Converting the Photoelectric Current Natural-Logarithmically First, a description will be given of how conversion is achieved when the signal φVPS is kept at a low level to permit the MOS transistors T1 and T2 to operate in a subthreshold region. As in the pixel shown in FIG. 3, in this mode, where the signal φVRS fed to the gate of the MOS transistor T3 is kept at a low level, the MOS transistor T3 remains off, and can thus be ignored as substantially absent.

When light enters the photodiode PD, a photoelectric current is generated therein, and, due to the subthreshold characteristics of MOS transistors, a voltage having the value obtained by converting the photoelectric current natural-logarithmically appears at the gates of the MOS transistors T1 and T2. This voltage causes a current to flow through the MOS transistor T2, and, as a result, electric charge that is equivalent to the value obtained by converting the integral of the photoelectric current natural-logarithmically is accumulated in the capacitor C. That is, a voltage proportional to the value obtained by converting the integral of the photoelectric current natural-logarithmically appears at the node "a" between the capacitor C and the source of the MOS transistor T2. At this time, the MOS transistors T4 and T6 are off.

Next, the signal φV, which is a pulse signal, is fed to the gate of the MOS transistor T4 to turn this MOS transistor T4 on. This causes a current proportional to the voltage applied to the gate of the MOS transistor T5 to flow through the MOS transistors T4 and T5 to the output signal line 10. Now, the voltage applied to the gate of the MOS transistor T5 is equal to the voltage applied to the node "a", and therefore the current thus fed to the output signal line 10 has the value obtained by converting the integral of the photoelectric current natural-logarithmically.

In this way, it is possible to read a signal (output current) that is proportional to the logarithm of the amount of incident light. After this signal has been read, the MOS transistor T4 is turned off, and a high level is fed as the signal φVRS2 to the gate of the MOS transistor T6, so that the MOS transistor T6 is turned on, and thereby the potential at the capacitor C, and thus at the node "a", is initialized. It is to be noted that, when the output current is so controlled as to vary natural-logarithmically with respect to the amount of incident light as in this mode, the signal φVRS is kept at a low level all the time.

(2) Mode in which the Output Signal is Produced by Converting the Photoelectric Current Linearly Next, a description will be given of how conversion is achieved when the signal φVPS is kept at a high level. First, the signal φVRS fed to the gate of the MOS transistor T3 is kept at a low level, and thus this MOS transistor T3 is kept off. In addition, a high level is fed as the signal φVRS2 to the gate of the MOS transistor T6 to turn this MOS transistor T6 on and thereby reset the capacitor C, and simultaneously the potential at the node "a" is initialized to the potential VRB2, which is lower than the direct-current voltage VPD. This potential is maintained by the capacitor C. Thereafter, the signal φVRS2 is turned to a low level to turn this MOS transistor T6 off. In this state, when light enters the photodiode PD, a photoelectric current is generated therein. At this time, since capacitors exist between the back gate and the gate of the MOS transistor T1 and at the junction of the photodiode PD, the electric charge resulting from the photoelectric current is accumulated at the gate and the drain of the MOS transistor T1. Thus, the gate voltage of the MOS transistors T1 and T2 has the value proportional to the integral of the photoelectric current.

Now that the potential at the node "a" is lower than the direct-current voltage VPD, the MOS transistor T2 is on. As a result, a current corresponding to the gate voltage of the MOS transistor T2 flows through the MOS transistor T2 as its drain current, and thus electric charge proportional to the gate voltage of the MOS transistor T2 is accumulated in the capacitor C. Accordingly, the voltage at the node "a" has the value proportional to the integral of the photoelectric current. Next, the pulse signal φV is fed to the gate of the MOS transistor T4 to turn this MOS transistor T4 on, so that a current proportional to the voltage applied to the gate of the MOS transistor T5 flows through the MOS transistors T4 and T5 to the output signal line 10. Since the voltage applied to the gate of the MOS transistor T5 is equal to the voltage at the node "a", the current thus fed to the output signal line 10 has the value obtained by converting the integral of the photoelectric current linearly.

In this way, it is possible to read a signal (output current) that is proportional to the amount of incident light. After this signal has been read, the MOS transistor T4 is turned off, and a high level is fed as the signal φVRS to the gate of the MOS transistor T3 to turn this MOS transistor T3 on so as to initialize the photodiode PD, the drain voltage of the MOS transistor T1, and the gate voltage of the MOS transistors T1 and T2. Next, a high level is fed as the signal φVRS2 to the gate of the MOS transistor T6 to turn this MOS transistor T6 on and thereby initialize the potential at the capacitor C, and thus at the node "a".

The reading of the signal from each pixel may be achieved by the use of a charge-coupled device (CCD). In that case, the transfer of electric charge to the CCD is achieved by providing a potential barrier with a variable potential level that corresponds to the MOS transistor T4 shown in FIG. 3 or 6.

Next, with reference to FIGS. 1 and 7, descriptions will be given of how the image-sensing apparatus 1 operates when it is provided with an area sensor configured as shown in FIG. 2 and having pixels as shown in FIG. 3 or when it is provided with an area sensor configured as shown in FIG. 4 and having pixels as shown in FIG. 6. In the image-sensing apparatus 1 shown in FIG. 1, the switching point with reference to which to determine whether to make the area sensor 3 perform logarithmic conversion or linear conversion is set at 700 [cd/m$^2$] in terms of the brightness of a subject The reason that the switching point is set at 700 [cd/m$^2$] will be described below.

When the area sensor 3 is made to perform logarithmic conversion, it is possible to shoot a subject having a wide brightness range, though with poor gradation in bright portions of the subject. Accordingly, logarithmic conversion is effective in cases where the brightness range tends to be wide, as when the brightness of a subject is high, in particular when the subject is in direct sunlight or the background includes direct sunlight, because logarithmic conversion then offers sufficient rendering of portions in shade and thus yields high-quality images with satisfactory perspective. The brightness of such a brightly-lit subject is approximately 1,000 [cd/m$^2$].

When the area sensor 3 is made to perform linear conversion, although it is not possible to shoot a subject having a wide brightness range, it is possible to obtain superb gradation all over the image obtained. Accordingly, linear conversion is effective in cases where the brightness range tends to be narrow, as when the brightness of a subject is low, in particular when the subject is in shade or the subject is shot under a cloudy sky, because linear conversion then yields high-quality images with superb gradation. The brightness of such a dimly-lit subject is approximately 500 [cd/m$^2$]. Thus, to make the area sensor 3 perform logarithmic conversion when a subject is brightly-lit with direct sunlight and perform linear conversion when a subject is dimly-lit without direct sunlight, it is preferable to set the switching point at 700 [cd/m$^2$].

(A) When a Subject is Shot in Brightly-Lit Conditions

Figure 7A:
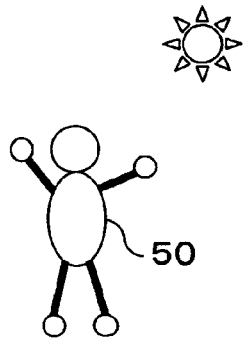
FIGS. 7A and 7B are diagrams showing the conditions of a subject when the subject is shot with the image-sensing apparatus shown in FIG. 1.
Figure 7A:
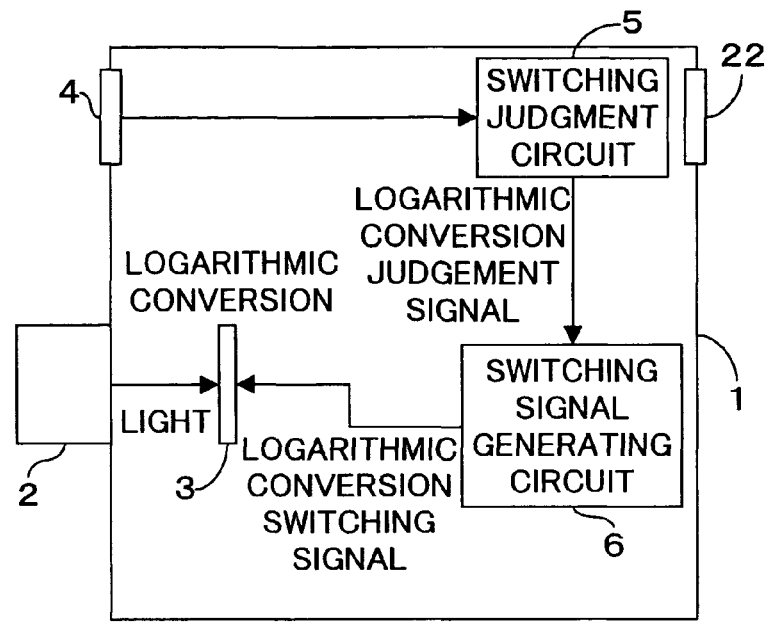

As shown in FIG. 7A, when a subject 50 is shot in direct sunlight, the detector 4 detects a subject brightness (for example 1,000 [cd/m$^2$]) above 700 [cd/m$^2$]. Thus, the switching judgment circuit 5 judges that the area sensor 3 should be made to perform logarithmic conversion. On receiving a judgment signal to that effect, the switching signal generating circuit 6 generates a switching signal that turns the signal φVPS (FIG. 3 or 6) to a low level. This switching signal causes the voltage applied to the source of the transistor T1 (FIG. 3 or 6) and to the capacitor C (FIG. 3 or 6) in each pixel to turn to a low level. As a result, the transistors T1 and T2 (FIG. 3 or 6) are so biased as to operate in a subthreshold region as described earlier, and thus an electric signal having undergone logarithmic conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

(B) When a Subject is Shot in Dimly-Lit Conditions

Figure 7B:
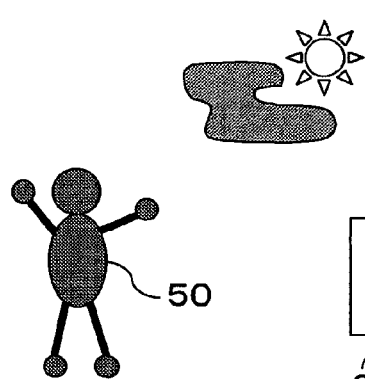
Figure 7B:
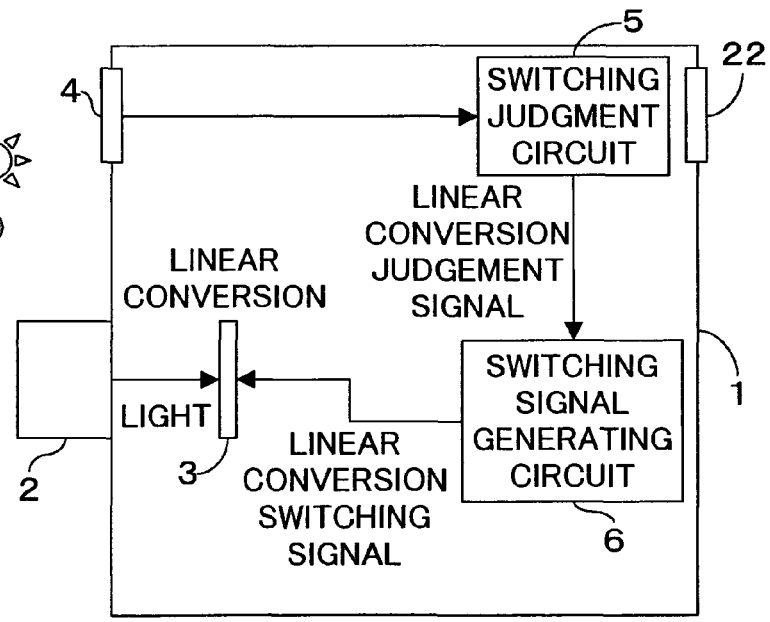

As shown in FIG. 7B, when a subject 50 is shot without direct sunlight, as under a cloudy sky, the detector 4 detects a subject brightness (for example 500 [cd/m$^2$]) below 700 [cd/m$^2$]. Thus, the switching judgment circuit 5 judges that the area sensor 3 should be made to perform linear conversion. On receiving a judgment signal to that effect, the switching signal generating circuit 6 generates a switching signal that turns the signal φVPS (FIG. 3 or 6) to a high level. This switching signal causes the voltage applied to the source of the transistor T1 (FIG. 3 or 6) in each pixel to turn to a high level. As a result, the transistor T1 is substantially turned off as described earlier, and thus an electric signal having undergone linear conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

Second Embodiment

Figure 8:
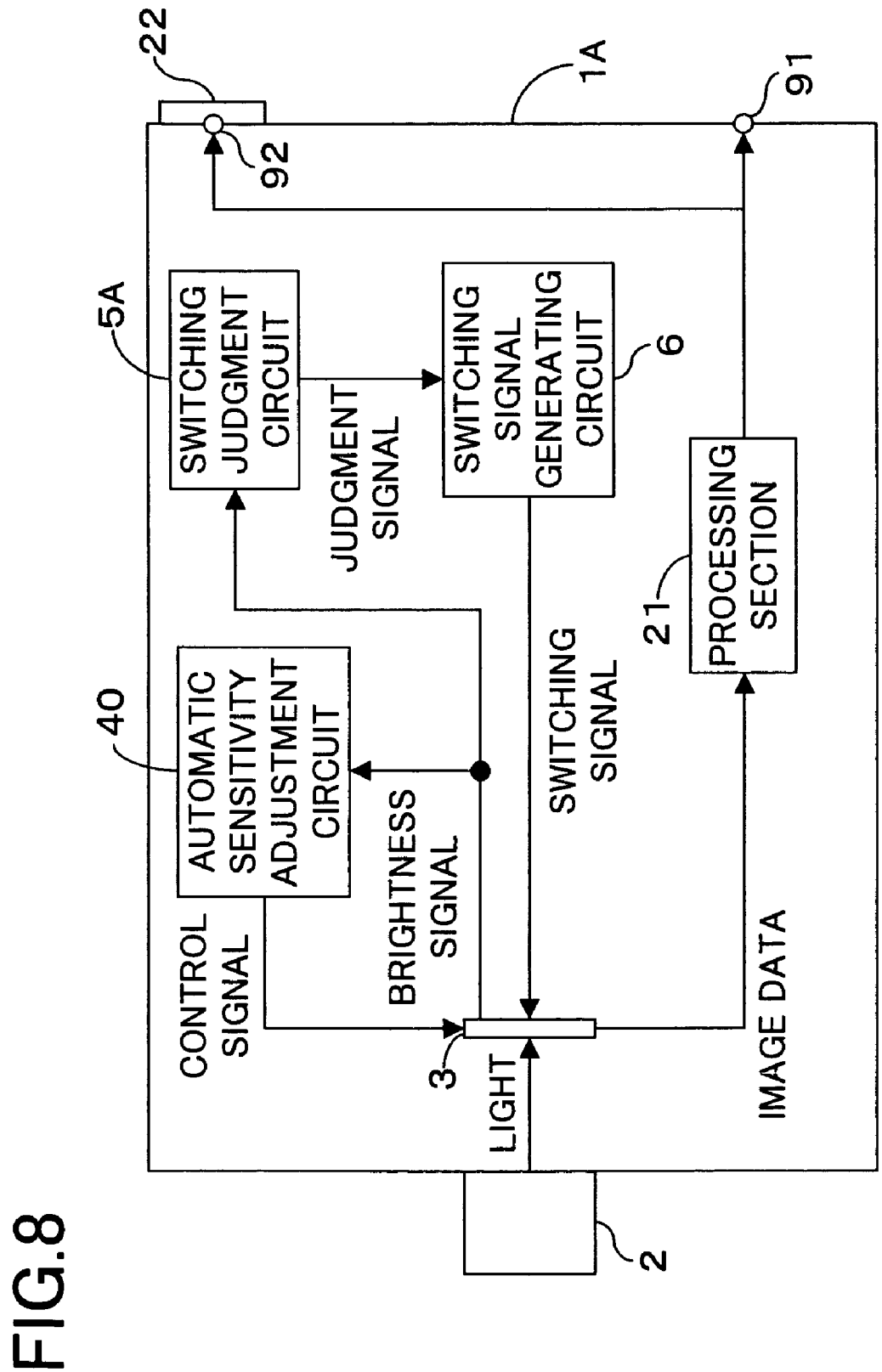
FIG. 8 is a block diagram showing the internal structure of the image-sensing apparatus of a second embodiment of the invention.

A second embodiment of the present invention will be described below with reference to the relevant drawings. FIG. 8 is a block diagram showing the configuration of a principal portion of the image-sensing apparatus of this embodiment. It is to be noted that, in the image-sensing apparatus shown in FIG. 8, such elements as are used for the same purposes here as in the image-sensing apparatus shown in FIG. 1 are identified with the same reference symbols, and their detailed descriptions will be omitted. In this embodiment, the area sensor and its pixels are configured in the same manner as in the first embodiment.

The image-sensing apparatus 1A shown in FIG. 8 has an objective lens 2, an area sensor 3, a switching signal generating circuit 6, a processing section 21, an automatic sensitivity adjustment circuit 40 that detects the brightness of a subject and performs sensitivity adjustment on the basis of an electric signal (brightness signal) that it receives from the area sensor 3, and a switching judgment circuit 5A that determines whether to switch the operation of the area sensor 3 to logarithmic or linear conversion by detecting the brightness of the subject on the basis of a brightness signal and that generates a judgment signal.

The signal processed by the processing section 21 is fed out of the image-sensing apparatus 1A via an output terminal 91 so as to be used for various purposes, such as for storage on a recording medium and for output to a display device. This signal is fed also via another output terminal 92 to a viewfinder 22. It is to be noted that, in FIG. 8, the portion around the automatic sensitivity adjustment circuit 40, which will be described in detail below, is illuminated in a simplified manner.

Figure 9:
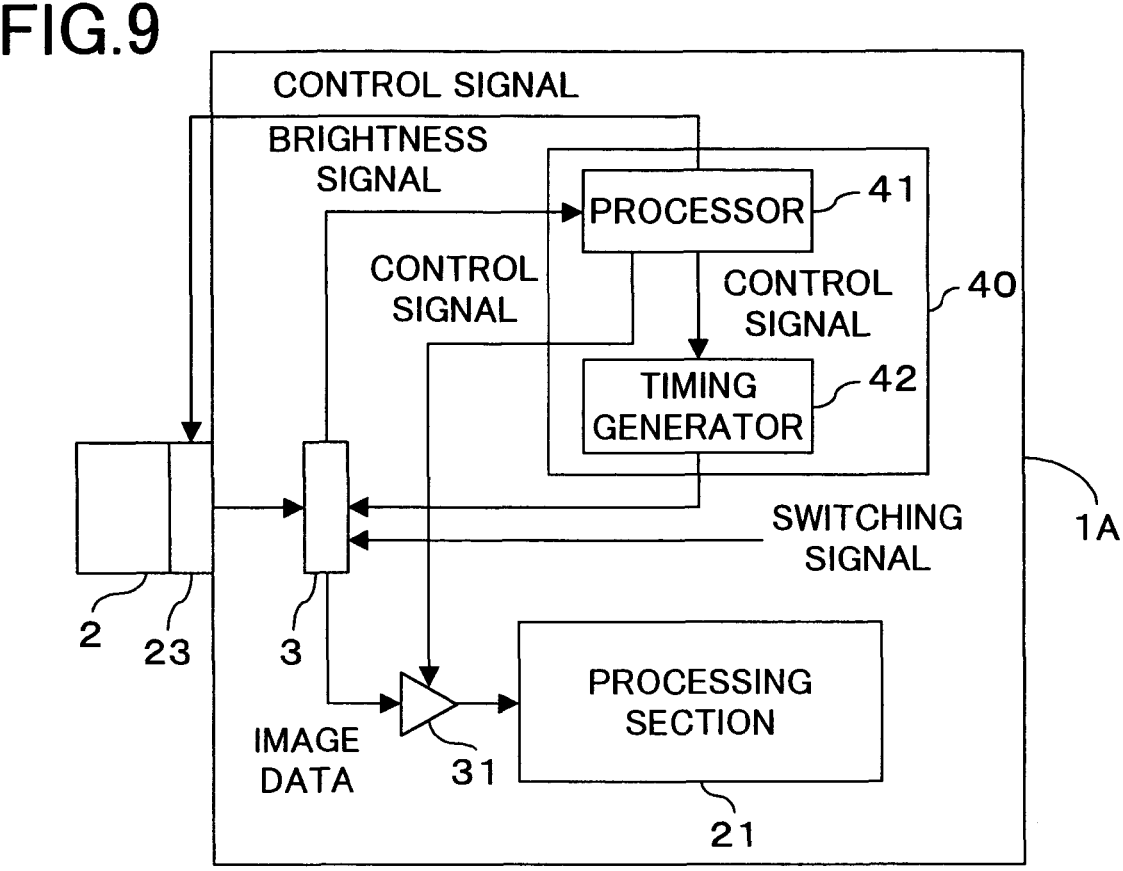
FIG. 9 is a diagram showing the configuration of the automatic sensitivity adjustment circuit and the circuits around it.

Now, the automatic sensitivity adjustment circuit 40 will be described in detail with reference to FIG. 9. The automatic sensitivity adjustment circuit 40 has a processor 41 that, on the basis of a brightness signal it receives from the area sensor 3, detects the brightness of a subject and a timing generator 42 that, in accordance with a control signal it receives from the processor 41, changes the exposure time of the area sensor 3. Within the objective lens 2, an iris 23 is provided, which changes its aperture in accordance with a control signal it receives from the processor 41. On the output side of the area sensor 3, an amplifier 31 is provided that amplifies the outputs of the individual pixels of the area sensor 3 and then outputs them to the processing section 21. This amplifier 31 also receives a control signal from the processor 41.

In this automatic sensitivity adjustment circuit 40, on receiving a brightness signal from the area sensor 3, the processor 41 detects, on the basis of this brightness signal, the brightness of a subject. On detecting the brightness of the subject, the processor 41 feeds the iris 23, the amplifier 31, and the timing generator 42 individually with control signals in accordance with the detected brightness. On receiving their respective control signals, the iris 23, the amplifier 31, and the timing generator 42 each operate as follows. It is to be noted that, in FIG. 8, the amplifier 31, the iris 23, and the signal paths from the automatic sensitivity adjustment circuit 40 to the amplifier 31 and the iris 23 are omitted.

As for the iris 23, the higher the brightness of a subject, the more its aperture is stopped down to reduce the amount of light reaching the area sensor 3. This is because, the higher the brightness of a subject, the larger the amount of light reaching the area sensor 3, and thus the more readily the individual pixels of the area sensor 3 become saturated. As for the amplifier 31, the lower the brightness of a subject, the higher its gain is made to enhance the gradation obtained. This is because, the lower the brightness of a subject, the lower the outputs from the individual pixels of the area sensor 3, and thus the poorer the gradation obtained. As for the timing generator 42, the lower the brightness of a subject, the longer the integration time of the individual pixels of the area sensor 3 is made to permit them to receive enough light to yield outputs. This is because, the lower the brightness of a subject, the smaller the amount of light reaching the area sensor 3, and sometimes so small that the area sensor 3 yields no output at all. Here, as the brightness signal, it is possible to use, for example, an output of a specific pixel of the area sensor 3 intact, or alternatively an average output of a plurality of pixels thereof.

Next, with reference to FIGS. 8 and 10, descriptions will be given of how the image-sensing apparatus 1A operates when it is provided with an area sensor 3 configured in the same manner as in the first embodiment. It is to be noted that, in FIG. 8, the processing section 21 and the automatic sensitivity adjustment circuit 40 are omitted. In the image-sensing apparatus 1A shown in FIG. 8, as in the first embodiment, the switching point with reference to which to determine whether to make the area sensor 3 perform logarithmic or linear conversion is set at approximately 700 [cd/m$^2$] in terms of the brightness of a subject as detected by the switching judgment circuit 5A.

(A) When a Subject is Shot in Brightly-Lit Conditions

Figure 10A:
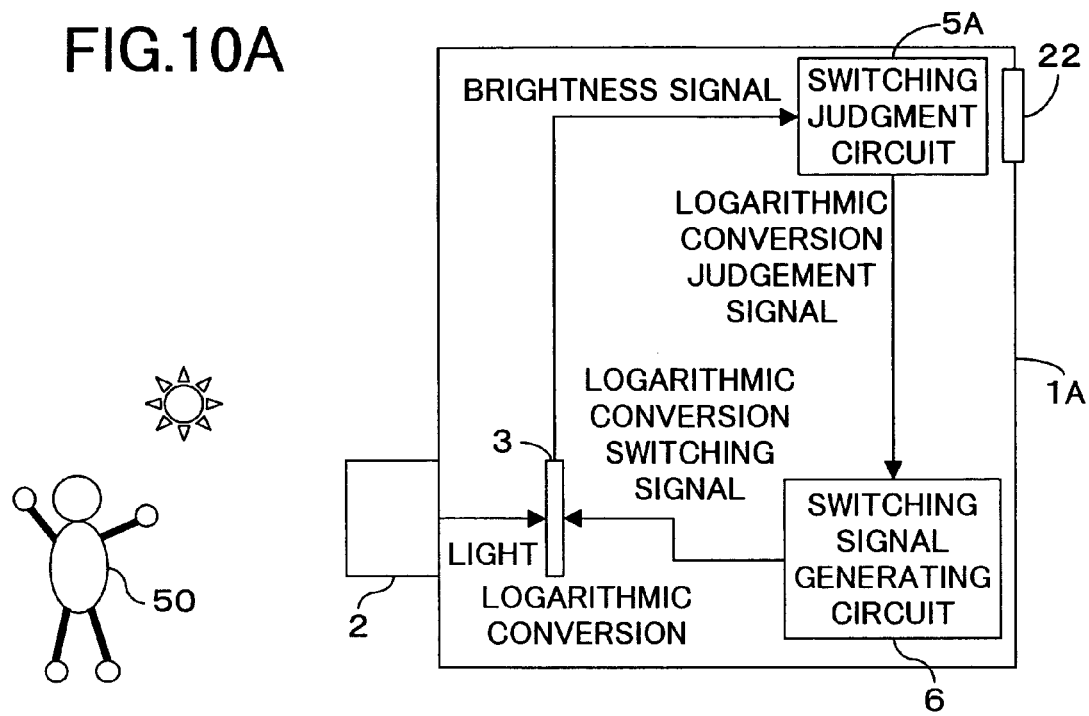
FIGS. 10A and 10B are diagrams showing the conditions of a subject when the subject is shot with the image-sensing apparatus shown in FIG. 8.

As shown in FIG. 10A, when a subject 50 is shot in direct sunlight, on the basis of a brightness signal that the area sensor 3 feeds to the switching judgment circuit 5A, the switching judgment circuit 5A detects a subject brightness (for example 1,000 [cd/m$^2$]) above 700 [cd/m$^2$]. Thus, the switching judgment circuit 5A judges that the area sensor 3 should be made to perform logarithmic conversion. On receiving a judgment signal to that effect, the switching signal generating circuit 6 generates a switching signal that turns the signal φVPS (FIG. 3 or 6) to a low level. This switching signal causes the voltage applied to the source of the transistor T1 (FIG. 3 or 6) and to the capacitor C (FIG. 3 or 6) in each pixel to turn to a low level. As a result, the transistors T1 and T2 (FIG. 3 or 6) are so biased as to operate in a subthreshold region as described earlier, and thus an electric signal having undergone logarithmic conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

(B) When a Subject is Shot in Dimly-Lit Conditions

Figure 10B:
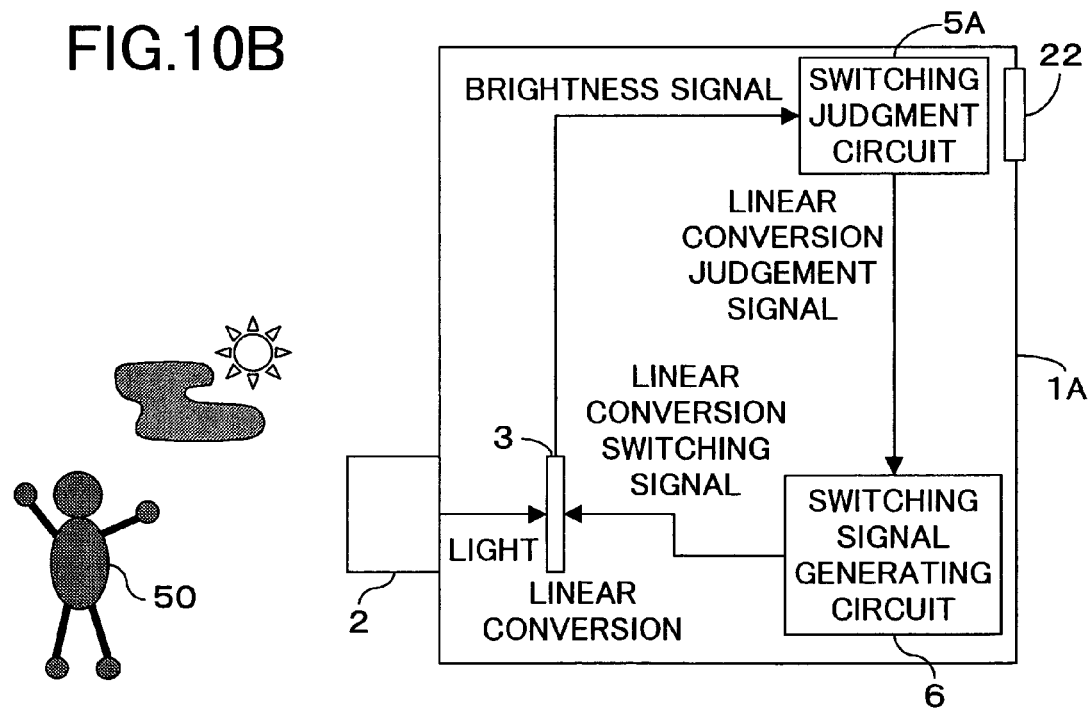

As shown in FIG. 10B, when a subject 50 is shot without direct sunlight, as under a cloudy sky, on the basis of a brightness signal that the area sensor 3 feeds to the switching judgment circuit 5A, the switching judgment circuit 5A detects a subject brightness (for example 500 [cd/m$^2$]) below 700 [cd/m$^2$]. Thus, the switching judgment circuit 5A judges that the area sensor 3 should be made to perform linear conversion. On receiving a judgment signal to that effect, the switching signal generating circuit 6 generates a switching signal that turns the signal φVPS (FIG. 3 or 6) to a high level. This switching signal causes the voltage applied to the source of the transistor T1 (FIG. 3 or 6) in each pixel to turn to a high level. As a result, the transistor T1 is substantially turned off as described earlier, and thus an electric signal having undergone linear conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

As described above, in the switching judgment circuit 5A, it is possible to determine whether to make the area sensor 3 perform logarithmic or linear conversion on the basis of a brightness signal that is fed from the area sensor 3 to the automatic sensitivity adjustment circuit 40. Here, the automatic sensitivity adjustment circuit 40 keeps operating irrespective of whether the area sensor 3 is performing logarithmic or linear conversion. Accordingly, even when the operation of the area sensor 3 is switched from one type of conversion to the other, it is possible to keep the obtained image displayed on the viewfinder 22 or other without a noticeable discontinuity.

Third Embodiment

Figure 11:
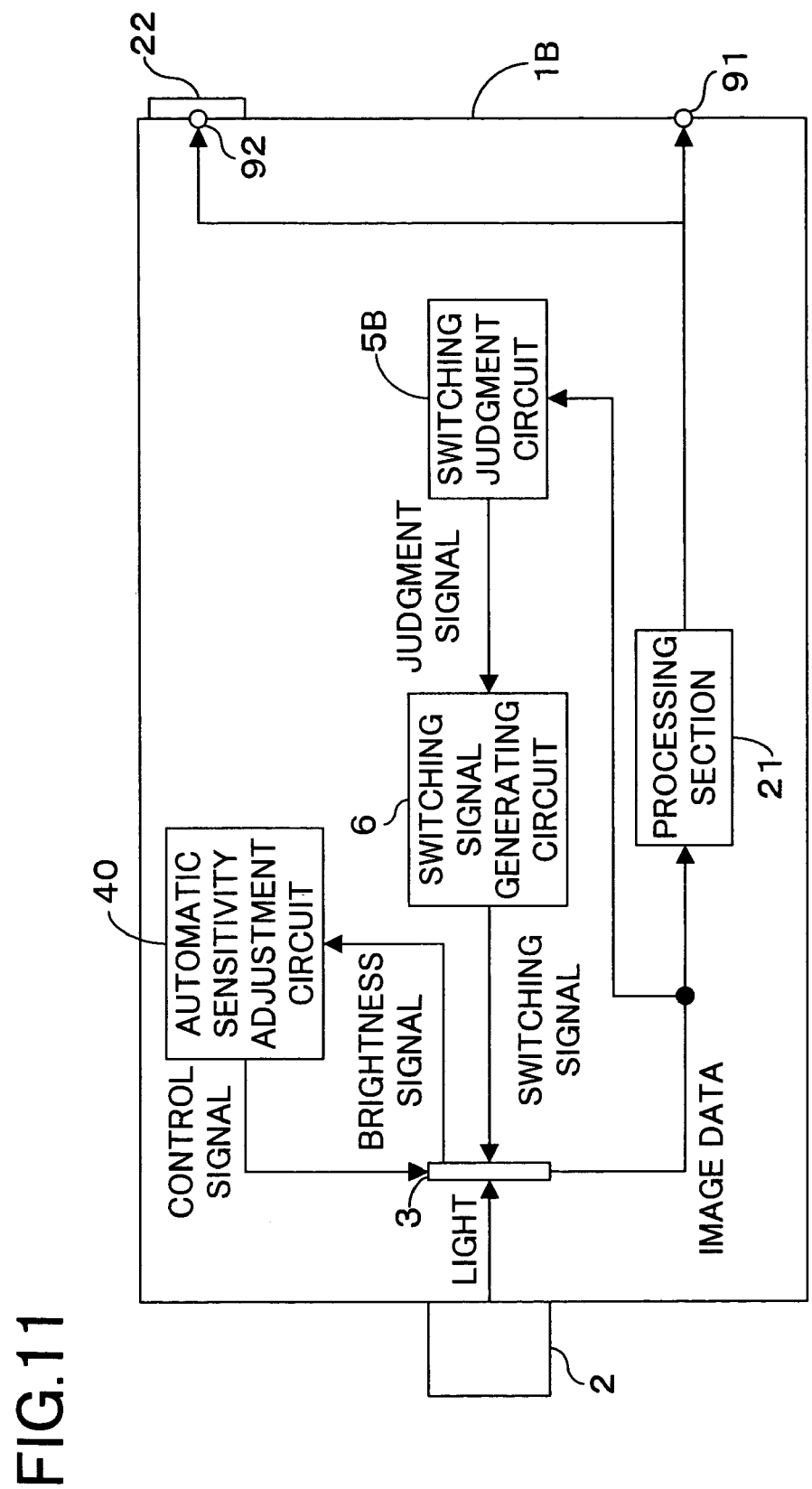
FIG. 11 is a block diagram showing the internal structure of the image-sensing apparatus of a third embodiment of the invention.

A third embodiment of the present invention will be described with reference to the relevant drawings. FIG. 11 is a block diagram showing the internal structure of the image-sensing apparatus of this embodiment. It is to be noted that, in the image-sensing apparatus shown in FIG. 11, such elements as are used for the same purposes here as in the image-sensing apparatus shown in FIG. 8 are identified with the same reference symbols, and their detailed descriptions will be omitted. In this embodiment, the area sensor and its pixels are configured in the same manner as in the first embodiment.

In the image-sensing apparatus 1B shown in FIG. 11, the switching judgment circuit 5B receives image data from the area sensor 3 instead of receiving a brightness signal as is fed to both the switching judgment circuit 5A and the automatic sensitivity adjustment circuit 40 in FIG. 8. Moreover, on the basis of the image data received from the area sensor 3, this switching judgment circuit 5B detects not only the brightness of a subject as does the switching judgment circuit 5A shown in FIG. 8, but also the brightness range of the subject. It is to be noted that, in FIG. 11, as in FIG. 8, the iris 23, the amplifier 31, and the signal paths from the automatic sensitivity adjustment circuit 40 to the iris 23 and the amplifier 31 are omitted. The automatic sensitivity adjustment circuit 40 here is configured in the same manner as the automatic sensitivity adjustment circuit 40 shown in FIG. 9, and operates in the same manner as in the second embodiment.

First, how the brightness range of a subject is detected will be described assuming that the image-sensing apparatus 1B is a camcorder (a videocassette recorder incorporating a camera). A modern camcorder or the like records 30 frames of images per second. Thus, by forcing the area sensor 3 to perform logarithmic conversion at regular time intervals, for example in one frame per second, it is possible to detect the brightness range of a subject on the basis of the image data corresponding to the frame that the area sensor 3 feeds to the switching judgment circuit 5B on every such occasion. Then, on the basis of the thus obtained brightness range of the subject, it is possible to determine whether to make the area sensor 3 perform linear or logarithmic conversion.

Next, with reference to FIGS. 11 and 12, descriptions will be given of how this image-sensing apparatus 1B configured as described above operates. It is to be noted that, in FIG. 12, the processing section 21 and the automatic sensitivity adjustment circuit 40 are omitted. In the image-sensing apparatus 1B shown in FIG. 11, the switching point with reference to which to determine whether to make the area sensor 3 perform logarithmic or linear conversion is set at a point at which the brightness range of a subject is expressed, for example, with a 2.5-digit value.

When the area sensor 3 is made to perform logarithmic conversion, it is possible to shoot a subject having a wide brightness range, though with poor gradation in bright portions of the subject. Accordingly, logarithmic conversion is effective in cases where the brightness range is so wide as to be expressed with a three- to four-digit value, as when the brightness of a subject is high, in particular when the subject is in direct sunlight or the background includes direct sunlight, because logarithmic conversion then offers sufficient rendering of portions in shade and thus yields high-quality images with satisfactory perspective.

When the area sensor 3 is made to perform linear conversion, although it is not possible to shoot a subject having a wide brightness range, it is possible to obtain superb gradation all over the image obtained. Accordingly, linear conversion is effective in cases where the brightness range is so narrow as to be expressed with a two-digit value, as when the brightness of a subject is low, in particular when the subject is in shade or the subject is shot under a cloudy sky, because linear conversion then yields high-quality images with superb gradation.

(A) When a Subject is Shot in Brightly-Lit Conditions

Figure 12A:
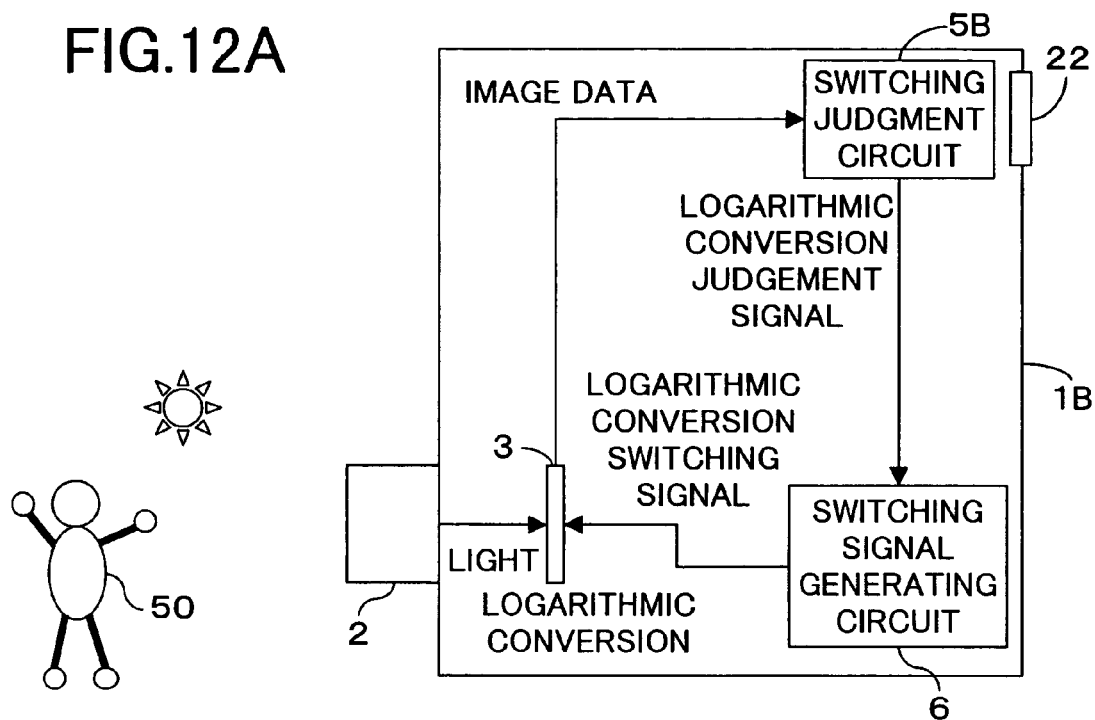
FIGS. 12A and 12B are diagrams showing the conditions of a subject when the subject is shot with the image-sensing apparatus shown in FIG. 11.

As shown in FIG. 12A, when a subject 50 is shot in direct sunlight, the area sensor 3, at regular time intervals, feeds the switching judgment circuit 5B with image data corresponding to one frame and having undergone logarithmic conversion. Every time this image data corresponding to one frame is fed from the area sensor 3 to the switching judgment circuit 5B, the switching judgment circuit 5B compares the levels of the electric signals output from the individual pixels with one another in such a way as to detect the maximum and minimum values among those levels. Then, if the difference between the maximum and minimum values of the thus detected levels is greater than a reference value (i.e. if the brightness range of the subject is expressed with a value having 2.5 or more digits), the subject is judged to have a wide brightness range. Thus, the switching judgment circuit 5B judges that the area sensor 3 should be made to perform logarithmic conversion.

On receiving a judgment signal to that effect, the switching signal generating circuit 6 generates a switching signal that turns the signal φVPS (FIG. 3 or 6) to a low level. This switching signal causes the voltage applied to the source of the transistor T1 (FIG. 3 or 6) and to the capacitor C (FIG. 3 or 6) in each pixel to turn to a low level. As a result, the transistors T1 and T2 (FIG. 3 or 6) are so biased as to operate in a subthreshold region as described earlier, and thus an electric signal having undergone logarithmic conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

(B) When a Subject is Shot in Dimly-Lit Conditions

Figure 12B:
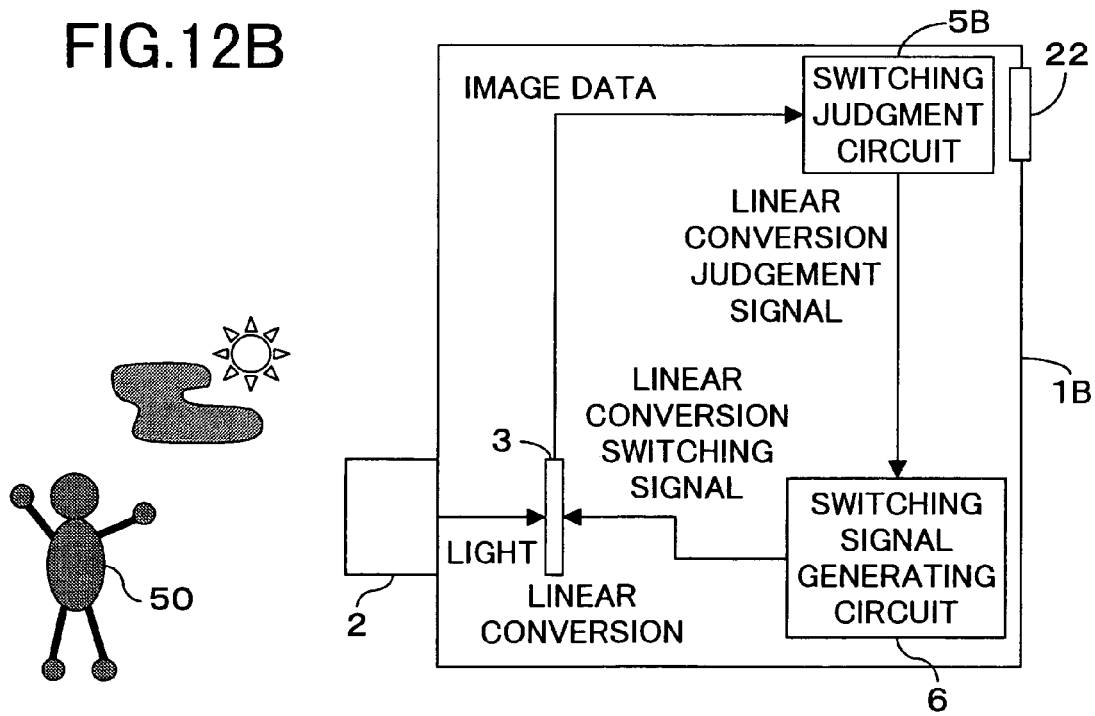

As shown in FIG. 12B, when a subject 50 is shot without direct sunlight, as under a cloudy sky, the area sensor 3, at regular time intervals, feeds the switching judgment circuit 5B with image data corresponding to one frame and having undergone logarithmic conversion. Every time this image data corresponding to one frame is fed from the area sensor 3 to the switching judgment circuit 5B, the switching judgment circuit 5B compares the levels of the electric signals output from the individual pixels with one another in such a way as to detect the maximum and minimum values among those levels. Then, if the difference between the maximum and minimum values of the thus detected levels is less than a reference value (i.e. if the brightness range of the subject is expressed with a value having less than 2.5 digits), the subject is judged to have a narrow brightness range. Thus, the switching judgment circuit 5B judges that the area sensor 3 should be made to perform linear conversion.

On receiving a judgment signal to that effect, the switching signal generating circuit 6 generates a switching signal that turns the signal φVPS (FIG. 3 or 6) to a high level. This switching signal causes the voltage applied to the source of the transistor T1 (FIG. 3 or 6) in each pixel to turn to a high level. As a result, the transistor T1 is substantially turned off as described earlier, and thus an electric signal having undergone linear conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

While performing logarithmic conversion, the area sensor 3 is made, at regular time intervals, to feed image data corresponding to one frame to the switching judgment circuit 5B. On the other hand, while performing linear conversion, the area sensor 3 is made, at regular time intervals, to perform logarithmic conversion and feed the image data obtained on that occasion to the switching judgment circuit 5B; then, if no need is recognized to change the type of conversion, the area sensor 3 returns to linear conversion.

In this embodiment, the brightness range of a subject is determined on the basis of the image data corresponding to one frame that is obtained by forcing the area sensor to perform logarithmic conversion even while it is performing linear conversion. However, it is also possible to determine whether to switch the types of conversion by determining the brightness of a subject on the basis of the number of saturated pixels as known from the image data obtained at regular time intervals while the area sensor is performing linear conversion. That is, while the area sensor is performing linear conversion, if the number of saturated pixels is found to be grater than a predetermined number, it is recognized that saturation or flat blackness is occurring in a considerably wide area, and thus the operation of the area sensor is switched to the logarithmic conversion.

Furthermore, as in the second embodiment, by keeping the automatic sensitivity adjustment circuit 40 operating irrespective of whether the area sensor 3 is performing logarithmic or linear conversion, it is possible, even when the operation of the area sensor 3 is switched from one type of conversion to the other, to keep the obtained image displayed on the viewfinder 22 or other without a noticeable discontinuity.

Fourth Embodiment

Figure 13:
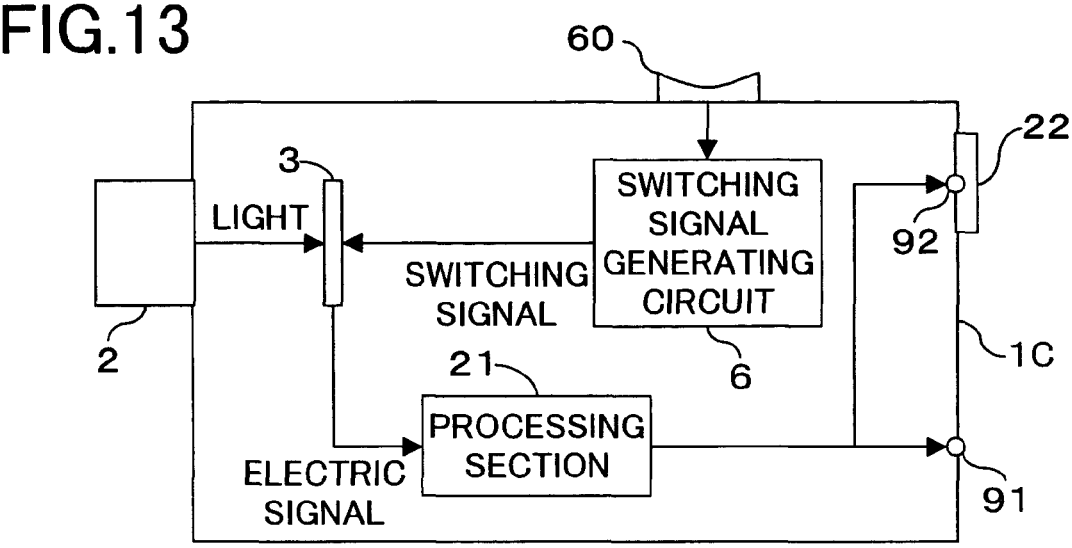
FIG. 13 is a block diagram showing the internal structure of the image-sensing apparatus of a fourth embodiment of the invention.

A fourth embodiment of the present invention will be described with reference to the relevant drawings. FIG. 13 is a block diagram showing the internal structure of the image-sensing apparatus of this embodiment. It is to be noted that, in the image-sensing apparatus shown in FIG. 13, such elements as are used for the same purposes here as in the image-sensing apparatus shown in FIG. 1 are identified with the same reference symbols, and their detailed descriptions will be omitted. In this embodiment, the area sensor and its pixels are configured in the same manner as in the first embodiment.

The image-sensing apparatus 1C shown in FIG. 13 has a switch 60 provided on the outside thereof so as to be operated by a user. When this switch 60 is operated, a switching signal for switching the operation of the area sensor 3 between logarithmic and linear conversion is fed to the area sensor 3. In other respects, this image-sensing apparatus 1C is configured in the same manner as the image-sensing apparatus 1 shown in FIG. 1.

Now, with reference to FIG. 13, how this image-sensing apparatus 1C configured as described above operates will be described. When the user operates the switch 60 so as to instruct the area sensor 3 to perform linear conversion, then, in response to this operation of the switch 60, the switching signal generating circuit 6 generates a switching signal that turns the signal $\phi$VPS (FIG. 3 or 6) to a high level. This switching signal causes the voltage applied to the source of the transistor T1 (FIG. 3 or 6) in each pixel to turn to a high level. As a result, the transistor T1 is substantially turned off as described earlier, and thus an electric signal having undergone linear conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

On the other hand, when the user operates the switch 60 so as to instruct the area sensor 3 to perform logarithmic conversion, then, in response to this operation of the switch 60, the switching signal generating circuit 6 generates a switching signal that turns the signal $\phi$VPS (FIG. 3 or 6) to a low level. This switching signal causes the voltage applied to the source of the transistor T1 (FIG. 3 or 6) and to the capacitor C (FIG. 3 or 6) in each pixel to turn to a low level. As a result, the transistors T1 and T2 (FIG. 3 or 6) are so biased as to operate in a subthreshold region as described earlier, and thus an electric signal having undergone logarithmic conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

With this image-sensing apparatus 1C, shooting is performed as follows. For example, when a subject is shot outdoors in the daytime under a cloudy sky without direct sunlight, the subject has a brightness range that is expressed with a two-digit value at the most. Accordingly, to obtain better gradation, the user, in the course of shooting while viewing the viewfinder 22, operates the switch 60 to select linear conversion. While the area sensor 3 is performing linear conversion in this way, if direct sunlight suddenly comes to strike the subject, the brightness range of the subject widens, causing saturation or flat blackness in the image displayed on the viewfinder 22. Having recognized saturation or flat blackness in the image displayed on the viewfinder 22, the user, to make it possible to shoot the subject now having a wide brightness range, operates the switch 60 to instruct the area sensor 3 to perform logarithmic conversion.

Fifth Embodiment

Figure 14:
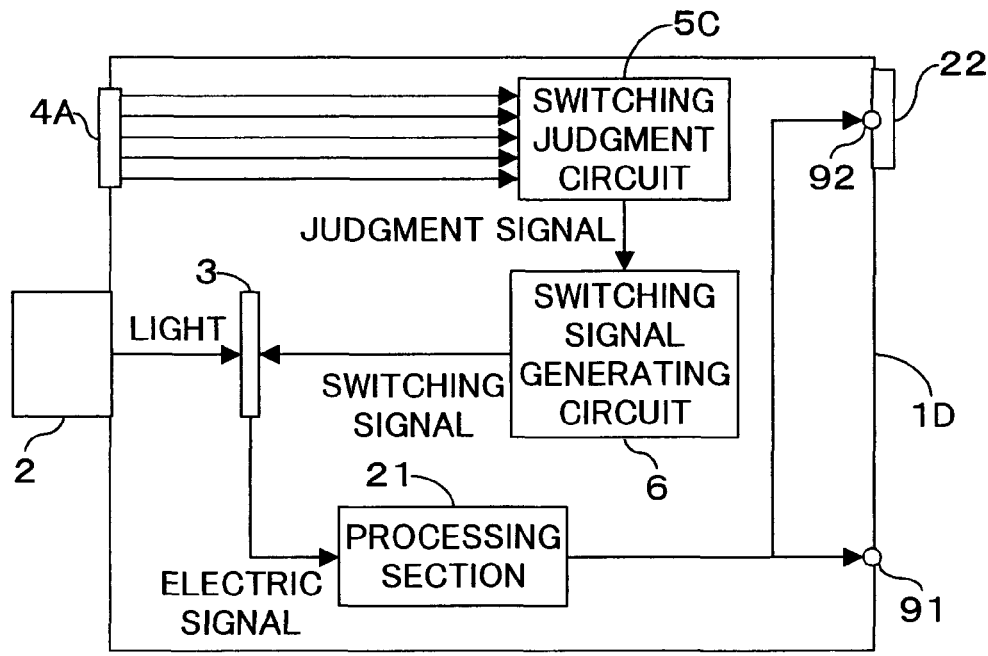
FIG. 14 is a block diagram showing the internal structure of the image-sensing apparatus of a fifth embodiment of the invention.

A fifth embodiment of the present invention will be described with reference to the relevant drawings. FIG. 14 is a block diagram showing the internal structure of the image-sensing apparatus of this embodiment. It is to be noted that, in the image-sensing apparatus shown in FIG. 14, such elements as are used for the same purposes here as in the image-sensing apparatus shown in FIG. 1 are identified with the same reference symbols, and their detailed descriptions will be omitted. In this embodiment, the area sensor and its pixels are configured in the same manner as in the first embodiment.

In the image-sensing apparatus 1D shown in FIG. 14, instead of the detector 4 (FIG. 1), a brightness detecting device 4A is provided that has a plurality of brightness detecting elements arranged for detecting the brightness of a subject. The switching judgment circuit 5C detects the brightness range of a subject by calculating the differences between the levels of the electric signals output from the individual brightness detecting elements provided in this brightness detecting device 4A, and then determines whether to make the area sensor 3 perform logarithmic or linear conversion. Then, the switching judgment circuit 5C feeds a judgment signal to the switching signal generating circuit 6. In other respects, this image-sensing apparatus 1D is configured in the same manner as the image-sensing apparatus 1 shown in FIG. 1. The brightness detecting elements are each composed of a photodiode or phototransistor.

Next, with reference to FIGS. 14 and 15, descriptions will be given of how this image-sensing apparatus 1D configured as described above operates. It is to be noted that, in FIG. 15, the processing section 21 is omitted. In the image-sensing apparatus 1D shown in FIG. 14, as in the third embodiment, the switching point with reference to which to determine whether to make the area sensor 3 perform logarithmic or linear conversion is set at a point at which the brightness range of a subject is expressed, for example, with a 2.5-digit value.

(A) When a Subject is Shot in Brightly-Lit Conditions

Figure 15A:
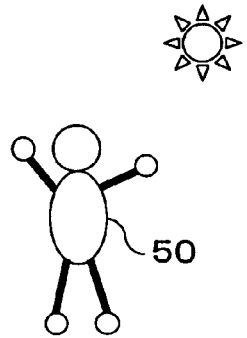
FIGS. 15A and 15B are diagrams showing the conditions of a subject when the subject is shot with the image-sensing apparatus shown in FIG. 14.
Figure 15A:
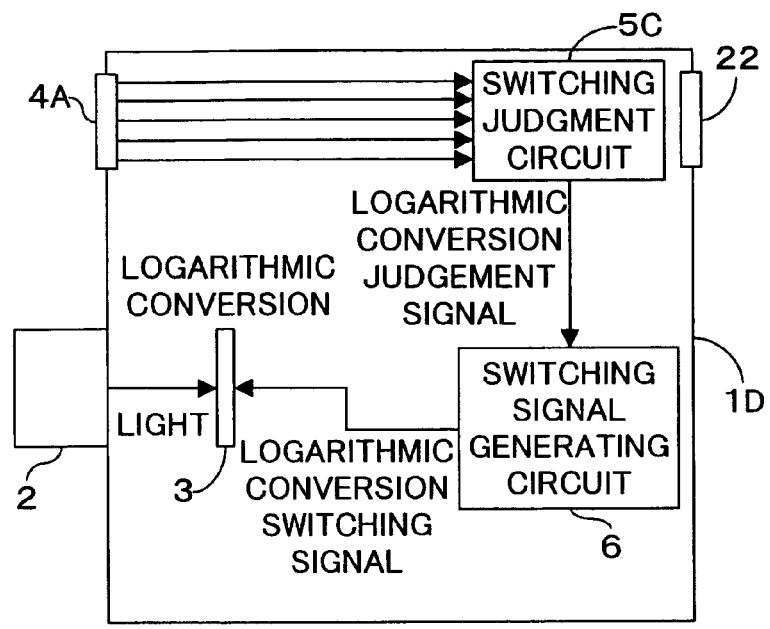

As shown in FIG. 15A, when a subject 50 is shot in direct sunlight, the switching judgment circuit 5C is fed with en electric signal that varies according to the brightness of the light incident, from the subject side, on the individual brightness detecting elements provided in the brightness detecting device 4A. The switching judgment circuit 5C compares the levels of the electric signals output from the individual brightness detecting elements of the brightness detecting device 4A with one another in such a way as to detect the maximum and minimum values among those levels. Then, if the difference between the maximum and minimum values of the thus detected levels is greater than a reference value (i.e. if the brightness range of the subject is expressed with a value having 2.5 or more digits), the subject is judged to have a wide brightness range. Thus, the switching judgment circuit 5C judges that the area sensor 3 should be made to perform logarithmic conversion.

On receiving a judgment signal to that effect, the switching signal generating circuit 6 generates a switching signal that turns the signal $\phi$VPS (FIG. 3 or 6) to a low level. This switching signal causes the voltage applied to the source of the transistor T1 (FIG. 3 or 6) and to the capacitor C (FIG. 3 or 6) in each pixel to turn to a low level. As a result, the transistors T1 and T2 (FIG. 3 or 6) are so biased as to operate in a subthreshold region as described earlier, and thus an electric signal having undergone logarithmic conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

(B) When a Subject is Shot in Dimly-Lit Conditions

Figure 15B:
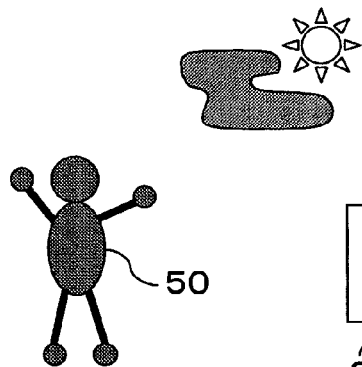
Figure 15B:
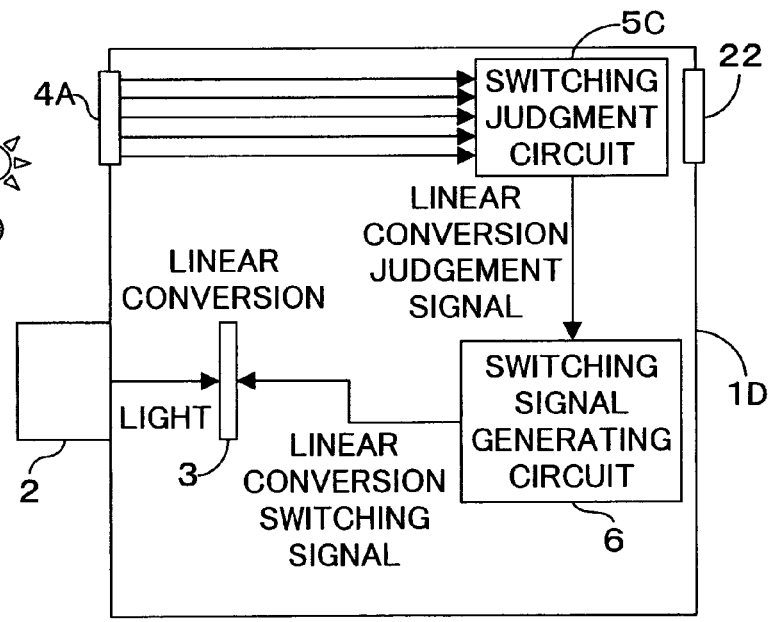

As shown in FIG. 15B, when a subject 50 is shot without direct sunlight, as under a cloudy sky, the switching judgment circuit 5C is fed with en electric signal that varies according to the brightness of the light incident, from the subject side, on the individual brightness detecting elements provided in the brightness detecting device 4A. The switching judgment circuit 5C compares the levels of the electric signals output from the individual brightness detecting elements of the brightness detecting device 4A with one another in such a way as to detect the maximum and minimum values among those levels. Then, if the difference between the maximum and minimum values of the thus detected levels is less than a reference value (i.e. if the brightness range of the subject is expressed with a value having less than 2.5 digits), the subject is judged to have a narrow brightness range. Thus, the switching judgment circuit 5C judges that the area sensor 3 should be made to perform linear conversion.

On receiving a judgment signal to that effect, the switching signal generating circuit 6 generates a switching signal that turns the signal φVPS (FIG. 3 or 6) to a high level. This switching signal causes the voltage applied to the source of the transistor T1 (FIG. 3 or 6) in each pixel to turn to a high level. As a result, the transistor T1 is substantially turned off as described earlier, and thus an electric signal having undergone linear conversion is output from the area sensor 3 through the output signal line 10 (FIG. 3 or 6) and then through the signal line 12 (FIG. 2 or 4) serving as the final destination line to the processing section 21. The processing section 21 processes the received electric signal so as to display the obtained image on the viewfinder 22.

Sixth Embodiment

Figure 16:
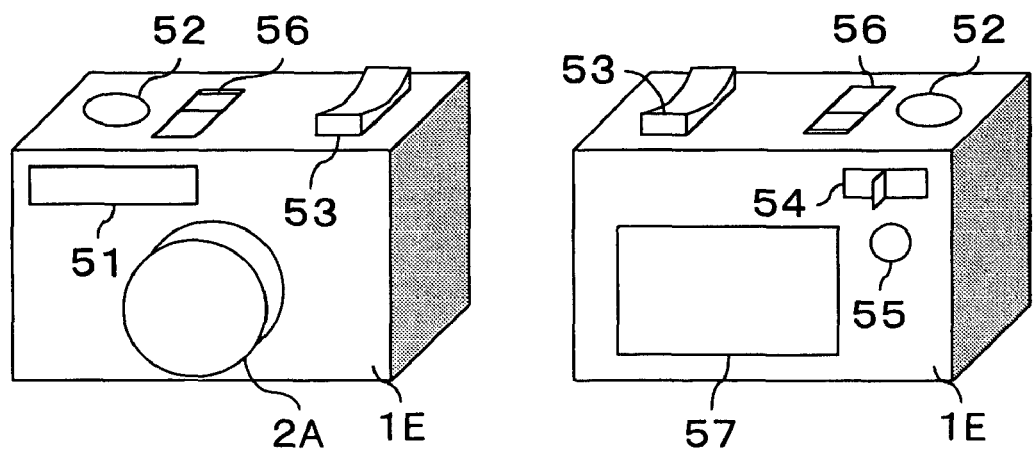
FIG. 16 is an external perspective views of the image-sensing apparatus of a sixth and a seventh embodiment of the invention.
Figure 17:
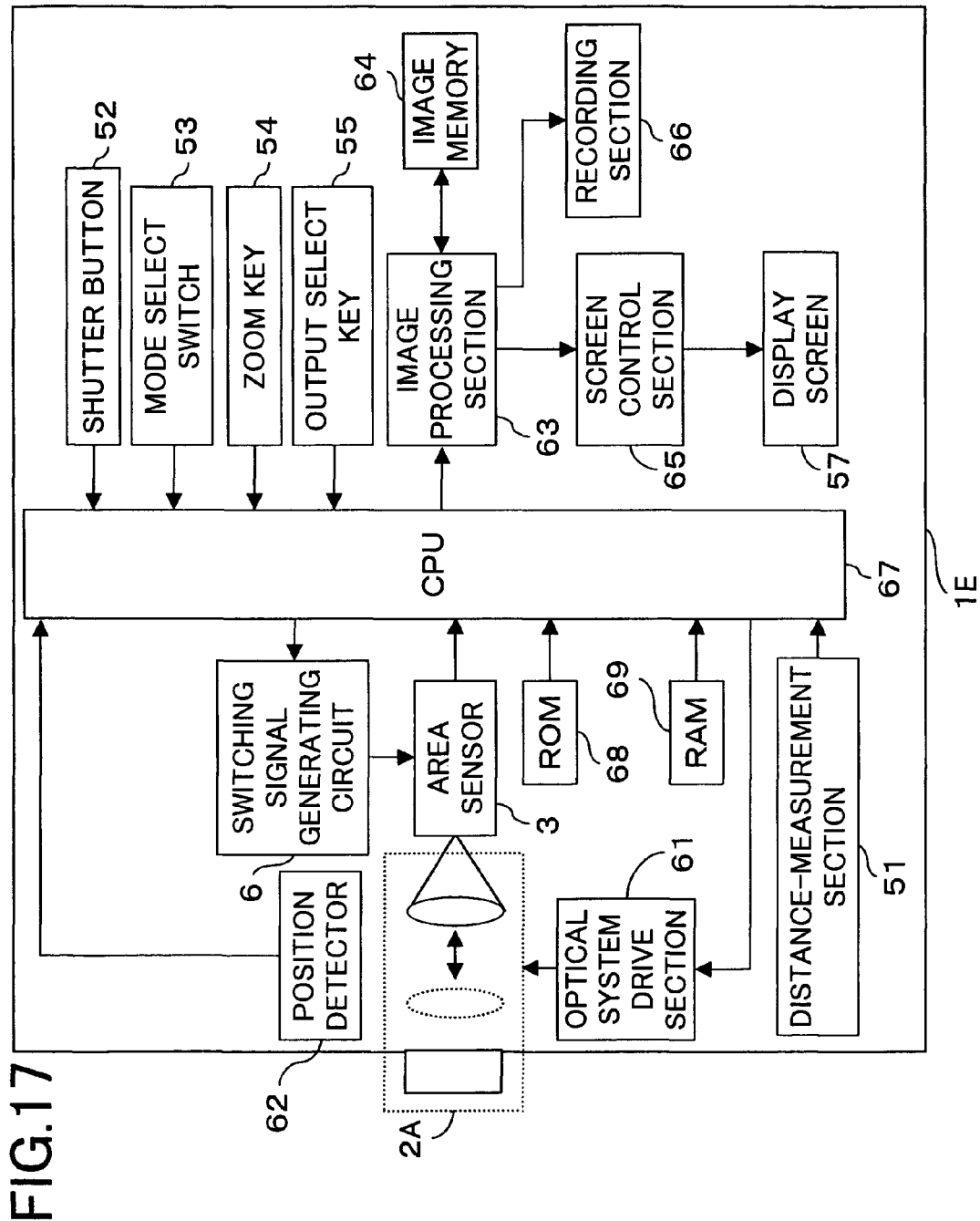
FIG. 17 is a block diagram showing the internal structure of the image-sensing apparatus of the sixth embodiment.

A sixth embodiment of the present invention will be described with reference to the relevant drawings. FIG. 16 is an external perspective view of the image-sensing apparatus of this embodiment. FIG. 17 is a block diagram showing the internal structure of the image-sensing apparatus of this embodiment. It is to be noted that, in the image-sensing apparatus shown in FIG. 17, such elements as are used for the same purposes here as in the image-sensing apparatus shown in FIG. 1 are identified with the same reference symbols, and their detailed descriptions will be omitted. In this embodiment, the area sensor and its pixels are configured in the same manner as in the first embodiment.

The image-sensing apparatus 1E shown in FIG. 16 has a zoom lens optical system 2A, a distance-measurement section 51 for measuring the distance to a subject in order to bring the lens into focus, a shutter button 52, a mode select switch 53 for switching between an automatic mode in which the operation of the area sensor (FIG. 17) is automatically switched to logarithmic or linear conversion and a manual mode in which such automatic switching is inhibited, a zoom key 54 for varying the shooting magnification, an output select key 55 for forcibly switching the operation of the area sensor 3 to the other of the two conversion types that is not currently selected, a display screen 57 for displaying the image of a subject to be shot, and a power switch 56 for turning on and off the image-sensing apparatus 1E. The image-sensing apparatus 1E may be a digital camcorder for shooting moving images, or a digital camera for shooting still images.

Moreover, as shown in FIG. 17, this image-sensing apparatus 1E has, inside it, the zoom lens optical system 2A, an area sensor 3 that outputs an electric signal obtained by converting logarithmically or linearly the light coming in through the zoom lens optical system 2A, a switching signal generating circuit 6 that feeds the area sensor 3 with a switching signal for switching the operation of the area sensor 3 between logarithmic and linear conversion, an optical system driving section 61 that drives the zoom lens optical system 2A to vary the shooting magnification continuously and to achieve focus, a position detector 62 for detecting the zoom position, an image processing section 63 that performs image processing such as edge enhancement and color conversion on the image of a subject fed thereto as an electric signal from the area sensor 3, an image memory 64 used for temporary storage of the signal processed by the image processing section 63, a display control section 65 that controls the display screen 57 on the basis of the signal processed by the image processing section 63, a recording section 66 for recording the signal processed by the image processing section 63 on a recording medium (not shown) or the like, a central processing unit (CPU) that controls the various parts of the image-sensing apparatus 1E, a ROM (read-only memory) 68 used for storage of software and the like with which to control the various parts of the image-sensing apparatus 1E, and a RAM (random-access memory) 69 used for temporary storage of data and for other purposes.

Figure 18:
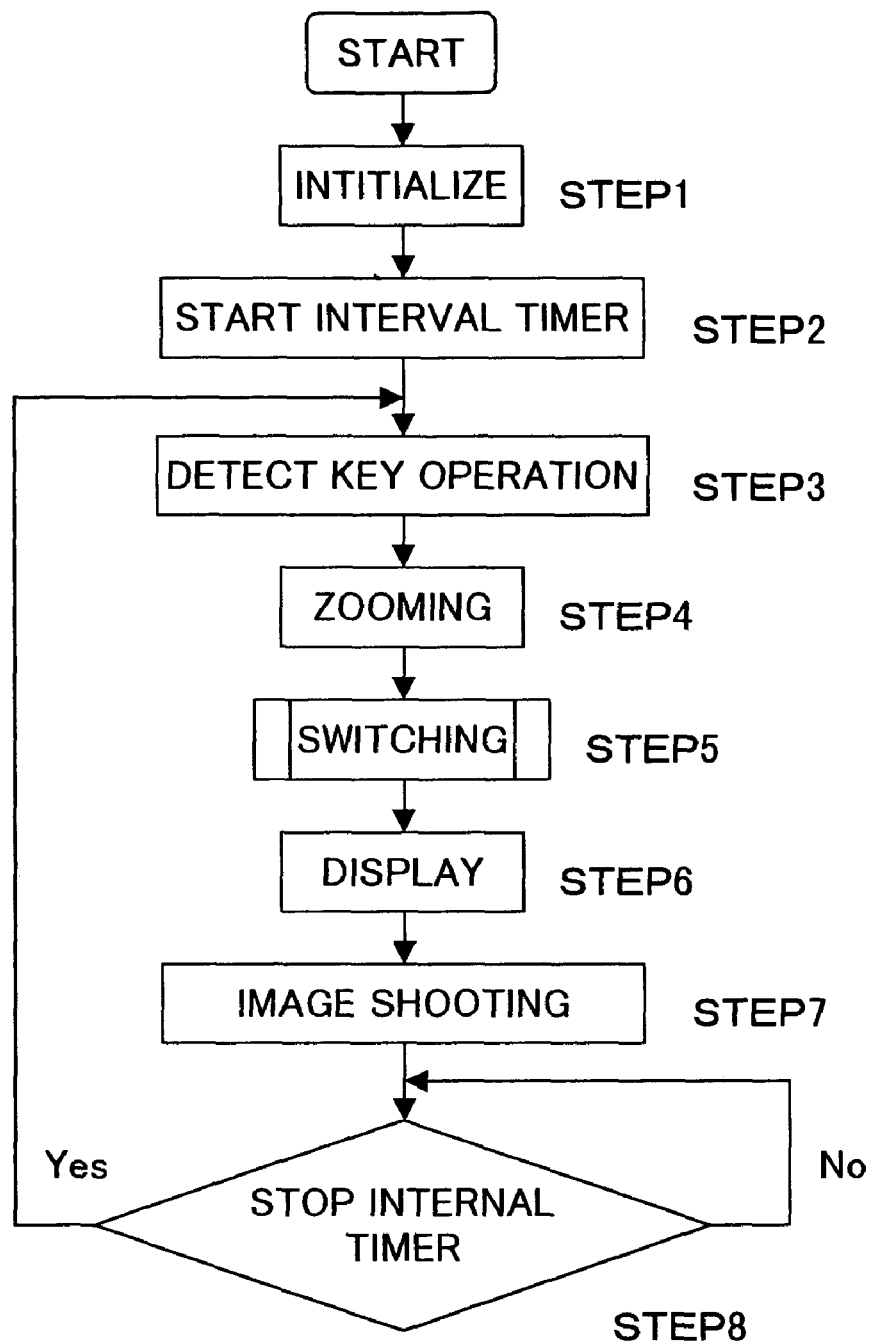
FIG. 18 is a flow chart of the operation of the image-sensing apparatus of the sixth and seventh embodiments.
Figure 19:
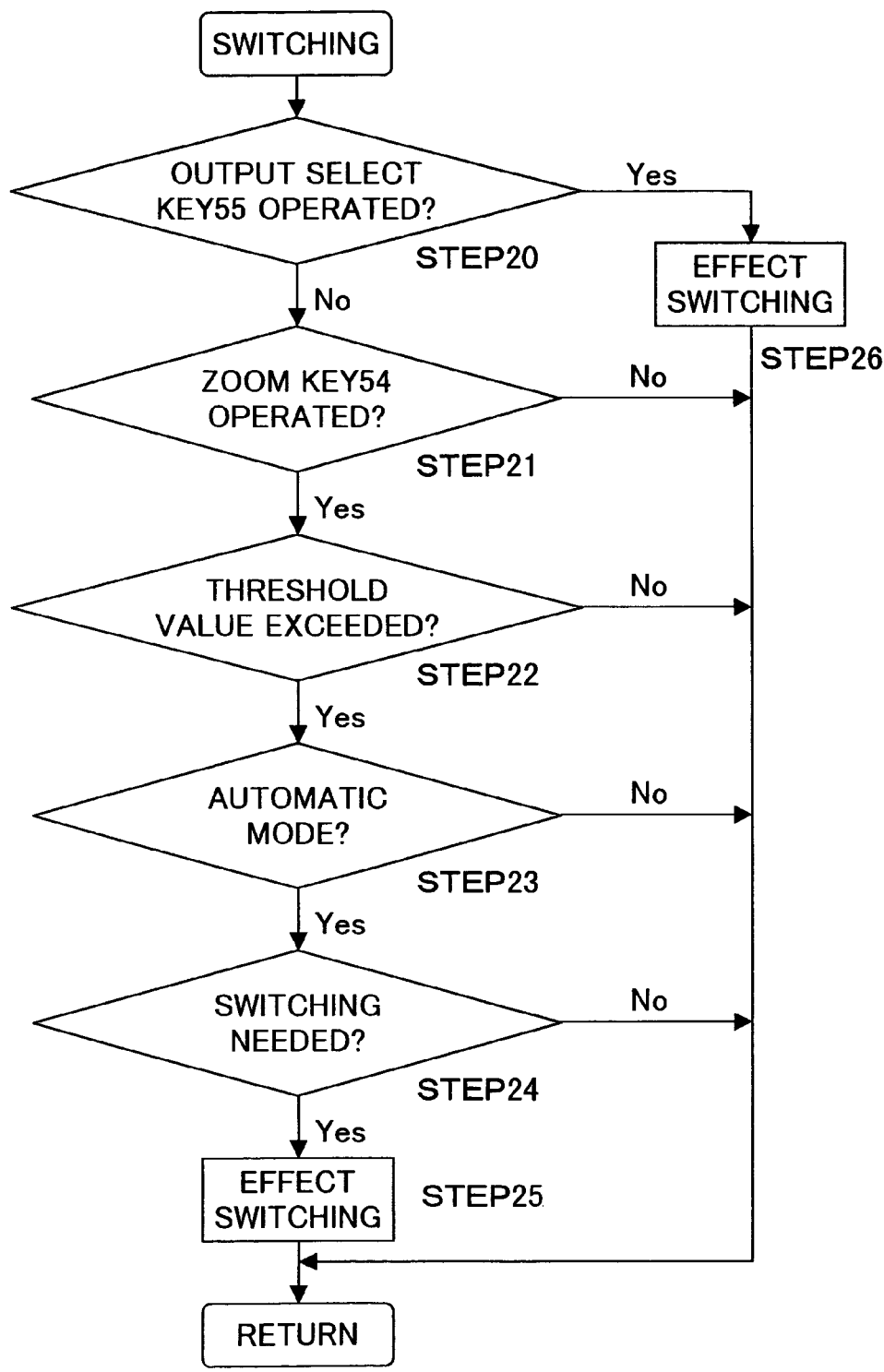
FIG. 19 is a flow chart of the switching step shown in FIG. 18.

With reference to FIGS. 16, 17, 18, and 19, how this image-sensing apparatus 1E configured as described above operates will be described below. FIGS. 18 and 19 are flow charts showing the flow of operations performed by the CPU 67 of the image-sensing apparatus 1E. First, when the user operates the power switch 56 to turn on the image-sensing apparatus 1E, the CPU 67 starts operating and initializes the internal RAM incorporated therein. Then, the data in the image memory 64 and in the RAM 69 provided in the image-sensing apparatus 1E are also initialized, and the image processing section 63 and others are brought into their initial states (STEP 1). At this time, the area sensor 3 is set to perform logarithmic conversion. Then, the internal timer (not shown) incorporated in the CPU 67 starts counting (STEP 2).

While this internal timer is counting, the CPU 67 checks whether or not the user is operating any of the shutter button 52, mode select switch 53, zoom key 54, and output select key 55, which together constitute an operation section (STEP 3). If, among those components constituting the operation section, the zoom key 54 is found to be being operated, in accordance with how the user is operating it, the optical system driving section 61 continuously drives the zoom lens optical system 2A to vary the magnification thereof and thereby zoom in or out on a subject (STEP 4). Meanwhile, on the basis of the data on the distance to the subject as measured by the distance-measurement section 51, the optical system driving section 61 automatically brings the optical system into focus.

After the magnification of the zoom lens optical system 2A has been varied in this way, the operation of the area sensor 3 is switched between logarithmic and linear operation in STEP 5. Now, this switching operation will be described with reference to the flow chart shown in FIG. 19. First, in STEP 20, whether the output select key 55 has been operated or not is checked; then, if it is found to have already been operated (YES) in STEP 3 (FIG. 18), the operation flow proceeds to STEP 26, and, otherwise (NO), the operation flow proceeds to STEP 21. In STEP 21, whether the zoom key 54 has been operated or not is checked; then, if it is found to have already been operated (YES) in STEP 3 (FIG. 18), the operation flow proceeds to STEP 22.

In STEP 22, the position detector 62 detects the zoom position of the zoom lens optical system 2A to check whether or not the zoom position has moved, within a telephoto region, to a position on the wide-angle side of a predetermined position (threshold value) or, within a wide-angle region, to a position on the telephoto side of the predetermined position (threshold value). Here, if the zoom position is found to have moved past this predetermined value (YES), the operation flow proceeds to STEP 23. It is to be understood that, in cases where zooming is achieved optically, the zoom position can be detected by detecting the focal length of the zoom lens on the basis of the position of the lens or the number of revolutions of the lens barrel. Alternatively, it is also possible to detect the zoom position by electrically detecting the magnification intended by the user as known from how the zoom key 54 is operated. This method mentioned last is effective also in cases where zooming is achieved electrically.

In STEP 23, whether the mode select switch 53 has been set for the automatic mode or not is checked, and, if it is found to have been set for the automatic mode (YES), the operation flow proceeds to STEP 24. Then, in STEP 24, whether or not the operation of the area sensor 3 has already been switched to the specified type of conversion, for example through the operation of the output select key 55, is checked to determine whether switching is necessary or not. If switching of the operation of the area sensor 3 is found to be necessary (YES), the operation flow proceeds to STEP 25, where the CPU 67 instructs the switching signal generating circuit 6 to feed a switching signal to the area sensor 3 to switch its operation.

In cases where the operation flow proceeds from STEP 20 to STEP 26, the CPU 67 forces the switching signal generating circuit 6 to feed a switching signal to the area sensor 3 to switch its operation forcibly. If any of the checks in STEPS 21 to 24 results in "NO", the operation flow proceeds to STEP 6 in FIG. 18. Similarly, after the operation of the area sensor 3 has been switched in accordance with the instruction to do so in STEP 25 or 26, the operation flow proceeds to STEP 6 in FIG. 18.

In STEP 6, the image processing section 63 processes the electric signal obtained from the area sensor 3 performing that type of conversion which was determined through the switching operation performed in STEP 5, and then, on the basis of the thus processed electric signal, the screen control section 65 displays an image on the display screen 57. Then, in STEP 7, if the shutter button 52 is found to have already been operated in STEP 3, the recording section 66 records the image data on the recording medium, and thereby performs a shooting operation. Lastly, in STEP 8, whether the internal timer has stopped counting is checked, and, if it is found to have stopped counting, the operation flow proceeds to STEP 3 to repeat the same sequence of operations described above. The entire flow of operations described above is repeated until the power switch 56 is turned off.

Now, a description will be given below of how to operate the image-sensing apparatus 1E that operates as shown in the flow charts FIGS. 18 and 19. When the user operates the power switch 56 to turn on the image-sensing apparatus 1E, the relevant portions thereof are initialized as described previously, and the area sensor 3 is set to perform logarithmic conversion. Thus, an image based on an electric signal logarithmically converted by the area sensor 3 is displayed on the display screen 57. Thereafter, the operations shown in FIG. 18 are repeated at regular time intervals.

When the user operates the zoom key 54 to zoom in on a subject, whether the zoom position has moved to a position on the telephoto side of a predetermined position or not is checked on the basis of the data output from the position detector 62. If the zoom position is found to have been moved to a position on the telephoto side of the predetermined position, and in addition the mode select switch 53 is found to be set for the automatic mode, the switching signal generating circuit 6 feeds the area sensor 3 with a switching signal to instruct it to perform linear conversion. If the mode select switch 53 is set for the manual mode, this is recognized in STEP 23 (FIG. 19), and the area sensor 3 continues performing logarithmic conversion.

When the operation of the area sensor 3 is switched to linear conversion in this way, an image based on an electric signal linearly converted by the area sensor 3 is displayed on the display screen 57. Thereafter, when the user operates the shutter button 52, this is recognized in STEP 3 (FIG. 18), and then, in STEP 7 (FIG. 18), a shooting operation is performed.

If the user, after zooming in on the subject so that an image based on a linearly converted electrical signal is displayed, operates the output select key 55 in order to check an image based on an electric signal logarithmically converted by the area sensor 3, this is recognized in STEP 3, and then, in STEP 20 (FIG. 19) and in STEP 26 (FIG. 19), the operation of the area sensor 3 is switched to logarithmic conversion. When the user, after checking the image based on an electric signal logarithmically converted by the area sensor 3, operates the shutter button 52, this is recognized in STEP 3, and then, in STEP 7, a shooting operation is performed.

If the user operates the output select key 55 to force the area sensor 3 to perform logarithmic conversion and then operates the zoom key 54 again to zoom out, whether the zoom position has moved to a position on the wide-angle side of a predetermined position or not is checked on the basis of the data output from the position detector 62. Here, if the zoom position is found to have moved to a position on the wide-angle side of the predetermined position, it is determined that the area sensor 3 should be made to perform logarithmic conversion. However, since the area sensor 3 is now already performing logarithmic conversion after being so switched by the output select key 55, such switching is found to be unnecessary in STEP 24 (FIG. 19). Thus, the switching signal generating circuit 6 does not feed the area sensor 3 with a switching signal.

If the user, after zooming in so that the area sensor 3 performs linear conversion, zooms out to move the zoom position to a position on the wide-angle side of the predetermined position, this is recognized in STEP 22, and the operation of the area sensor 3 is switched to logarithmic conversion. However, if the mode select switch 53 is set for the manual mode, this is recognized in STEP 23, and the area sensor 3 continues performing linear conversion. If the user, after switching the operation of the area sensor 3 to logarithmic conversion, operates the output select key 55, the operation of the area sensor 3 is forcibly switched to linear conversion. In this case, if the user zooms in again to move the zoom position to a position on the telephoto side of the predetermined position, switching is found to be unnecessary in STEP 24, and therefore the operation of the area sensor 3 is not switched.

In this way, if the mode select switch 53 is set for the automatic mode, when the user zooms in to move the zoom position to a position on the telephoto side of the predetermined position, the operation of the area sensor 3 is switched to linear conversion, and, when the user zooms out to move the zoom position to a position on the wide-angle side of the predetermined position, the operation of the area sensor 3 is switched to logarithmic conversion. On the other hand, if the mode select switch 53 is set for the manual mode, when the user operates the mode select switch 55, the operation of the area sensor 3 is switched. Moreover, even if the mode select switch 53 is set for the automatic mode, when the user operates the output select switch 55, the operation of the area sensor 3 is forcibly switched.

Seventh Embodiment

Figure 20:
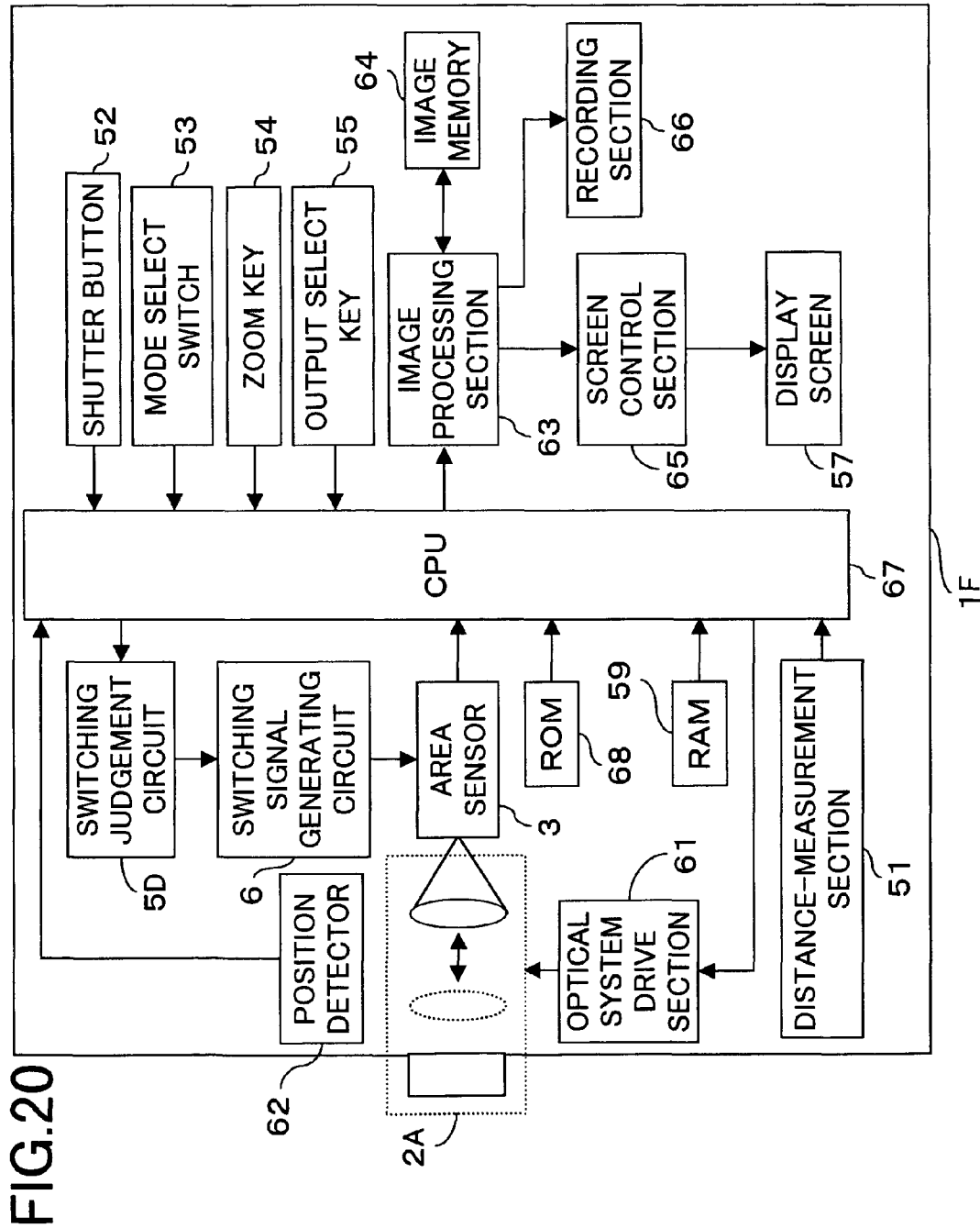
FIG. 20 is a block diagram showing the internal structure of the image-sensing apparatus of the seventh embodiment.

A seventh embodiment of the present invention will be described with reference to the relevant drawings. FIG. 20 is a block diagram showing the internal structure of the image-sensing apparatus of this embodiment. It is to be noted that, in the image-sensing apparatus shown in FIG. 20, such elements as are used for the same purposes here as in the image-sensing apparatus shown in FIG. 17 are identified with the same reference symbols, and their detailed descriptions will be omitted. In this embodiment, the area sensor and its pixels are configured in the same manner as in the first embodiment.

The image-sensing apparatus 1F shown in FIG. 20 has a switching judgment circuit 5D that determines whether to switch the operation of the area sensor 3 or not in accordance with a signal fed thereto from the CPU 67, and, in response to a switching signal output from the switching judgment circuit 5D, the switching signal generating circuit 6 feeds a switching signal to the area sensor 3 to switch its operation.

This image-sensing apparatus 1F configured as described above operates basically in the same manner as the image-sensing apparatus 1E of the sixth embodiment (FIG. 17). However, whereas what is judged in STEP 22 in FIG. 19 in the sixth embodiment is the zoom position, what is judged in this embodiment is the area to be shot (hereafter referred to as the "shooting area"). Specifically, the CPU 67 calculates the shooting area on the basis of a focus signal that indicates the distance to the subject detected by the distance-measurement section 51 and a zoom signal output from the zoom key 54 whenever it is operated to indicate the magnification of the image obtained. Then, the calculated shooting area is compared with a reference area (for example, a shooting area of 3 m high×4 m wide) with reference to which to determine the type of conversion that the area sensor 5 should perform. If the switching judgment circuit 5D judges the calculated shooting area to be larger than the reference area (threshold value), the area sensor 3 is made to perform logarithmic conversion; if the switching judgment circuit 5D judges the calculated shooting area to be smaller than the reference area (threshold value), the area sensor 3 is made to perform linear conversion. In other respects, this image-sensing apparatus 1F operates in the same manner as shown in the flow charts FIGS. 18 and 19. In this embodiment, the switching operation in STEP 5 (FIG. 18) is performed by the switching judgment circuit 5D.

Figure 21A:
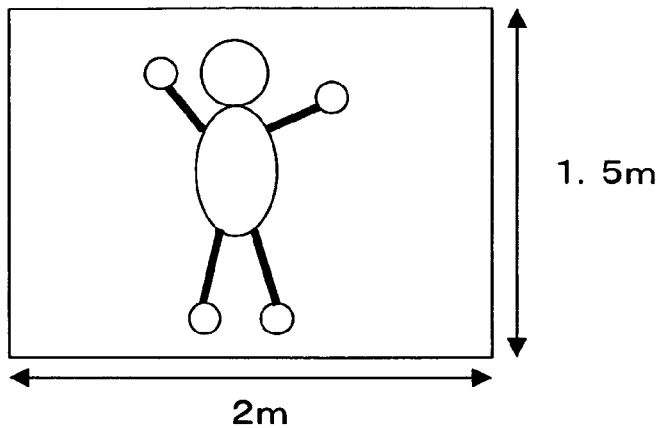
FIGS. 21A, 21B, and 21C are diagrams showing the area shot with the image-sensing apparatus shown in FIG. 20.
Figure 21B:
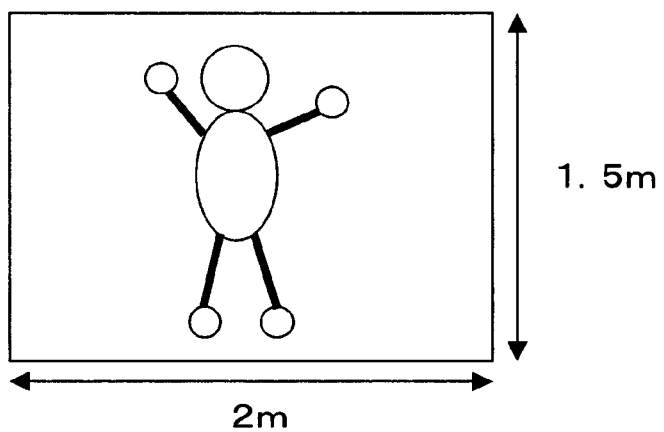
Figure 21C:
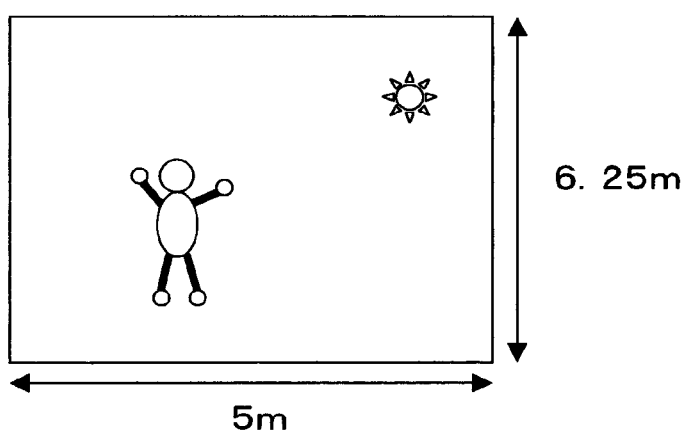

In actual shooting, this image-sensing apparatus 1F, configured so as to operate as described above, operates as follows when used with the mode select switch 53 set for the automatic mode. When a remote subject is shot with a high magnification, by zooming in on it, if, for example as shown in FIG. 21A, the shooting area is 2 m×1.5 m, i.e. smaller than the reference area 4 m×3 m, the area sensor 3 is made to perform linear conversion. Similarly, also when a close subject is shot, where, for example as shown in FIG. 21B, the shooting area is often smaller than the reference area 4 m×3 m even with a low magnification, the area sensor 3 is made to perform linear conversion. On the other hand, when a remote object is shot with a low magnification, by zooming out on it, if, for example as shown in FIG. 21C, the shooting area is 5 m×6.25 m, i.e. larger than the reference area 4 m×3 m, the area sensor 3 is made to perform logarithmic conversion.

In this way, in the automatic mode, irrespective of the magnification and the distance to the subject, it is possible to make the area sensor 3 perform linear conversion whenever the shooting area is smaller than the reference area. On the other hand, when a remote subject is shot with a low magnification, if the shooting area is larger than the reference area, it is possible to make the area sensor 3 perform logarithmic conversion. Moreover, as in the sixth embodiment, when the mode select switch 53 is set for the manual mode, it is possible to switch the operation of the area sensor 3 by operating the output select key 55. Even in the automatic mode, by operating the output select key 55, it is possible to switch the operation of the area sensor 3 forcibly.

Although the sixth and seventh embodiments deal with image-sensing apparatuses having a zoom lens optical system that offers continuously variable shooting magnification, the configurations of those two embodiments are applicable also to image-sensing apparatuses having a multiple-focus optical system, such as a bifocal optical system, that permits switching among a plurality of optical systems having different focal lengths. This helps make the overall configuration of an image-sensing apparatus simpler than when it incorporates a zoom lens optical system, and also make selection of a desired shooting magnification easier.

Eighth Embodiment

Figure 22:
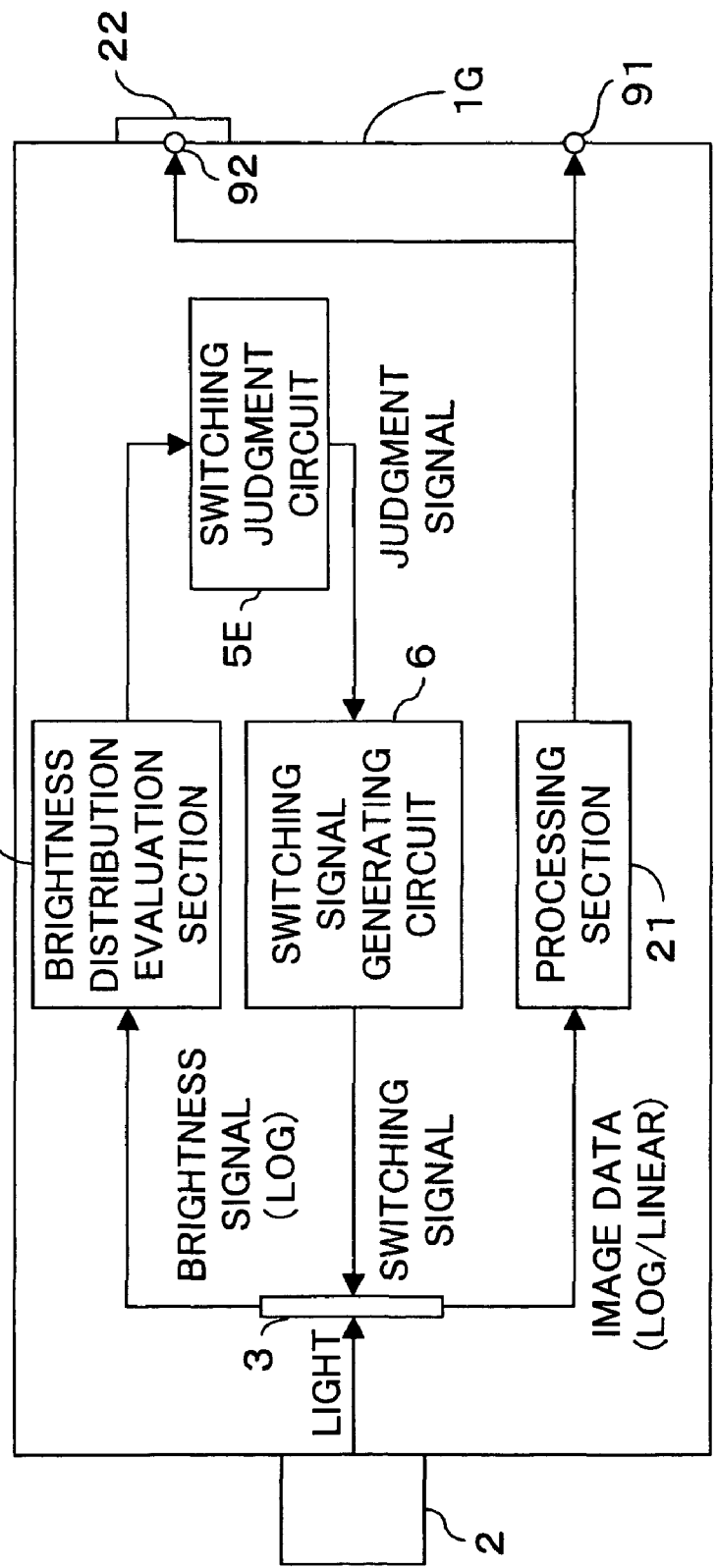
FIG. 22 is a block diagram showing the internal structure of the image-sensing apparatus of an eighth embodiment of the invention.
Figure 23:
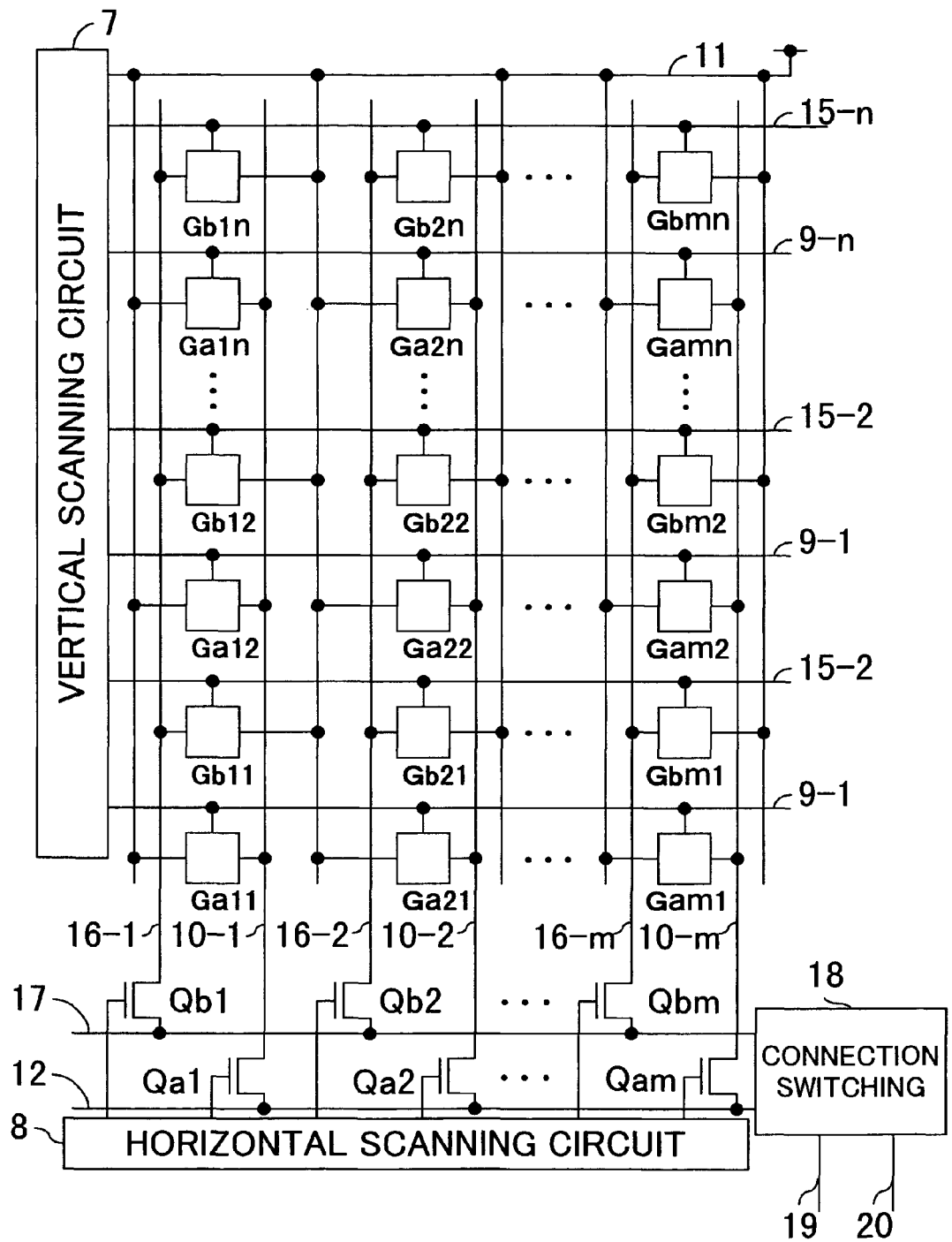
FIG. 23 is a diagram showing an example of the internal structure of the area sensor used in an image-sensing apparatus.
Figure 24:
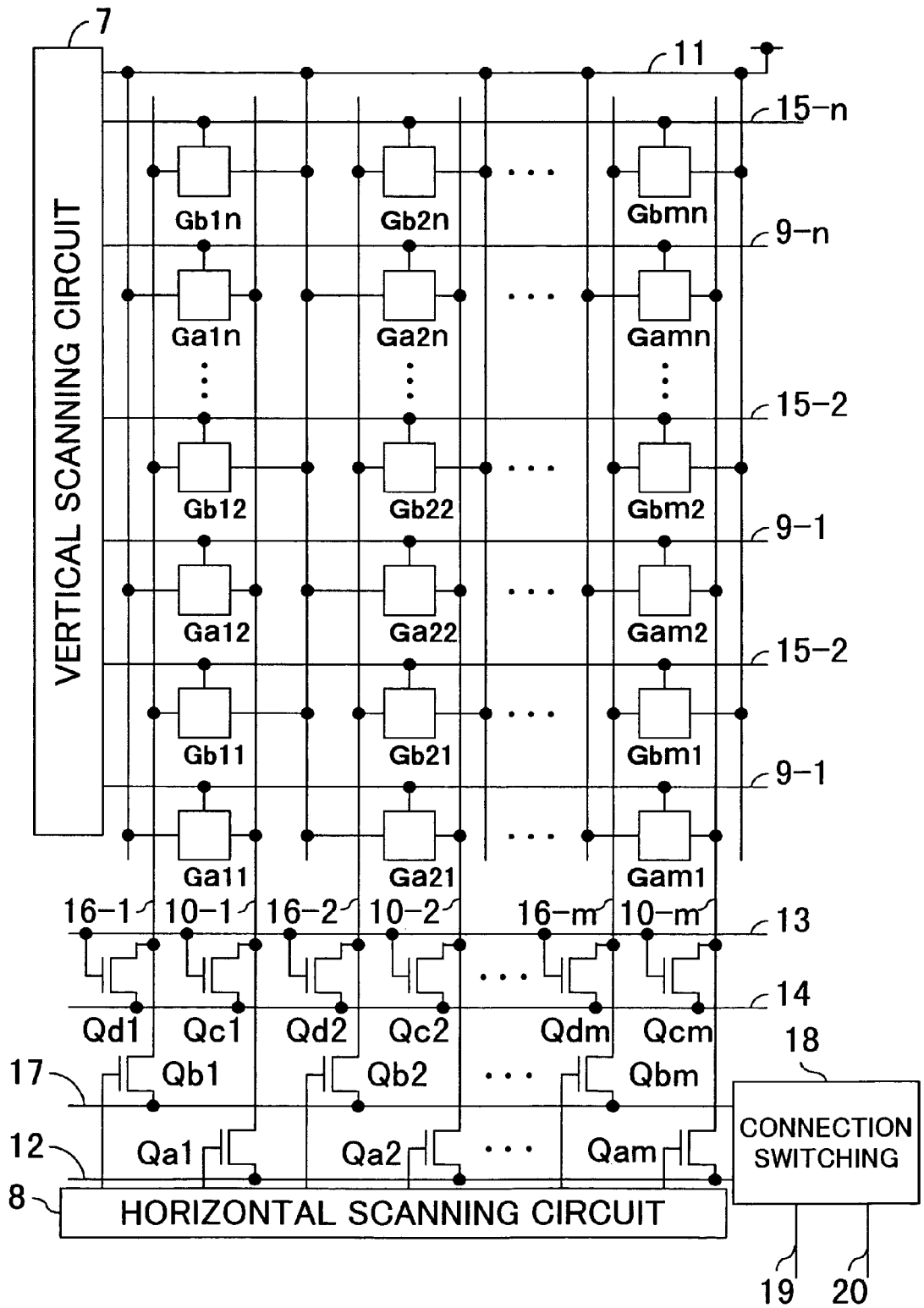
FIG. 24 is a diagram showing an example of the internal structure of the area sensor used in an image-sensing apparatus.

An eighth embodiment of the present invention will be described with reference to the relevant drawings. FIG. 22 is a block diagram showing the internal structure of the image-sensing apparatus of this embodiment. FIGS. 23 and 24 are block diagrams showing examples of the structure of the area sensor used as a solid-state image-sensing device in the image-sensing apparatus shown in FIG. 22. It is to be noted that, in the image-sensing apparatus shown in FIG. 22, such elements as are used for the same purposes here as in the image-sensing apparatus shown in FIG. 1 are identified with the same reference symbols, and their detailed descriptions will be omitted.

In the image-sensing apparatus 1G shown in FIG. 22, the detector 4 (FIG. 1) is omitted, and instead a brightness distribution evaluation section 45 is provided that evaluates the brightness distribution of a subject on the basis of an electric signal fed thereto from the area sensor 3. On the basis of the shape of the brightness distribution evaluated by the brightness distribution evaluation section 45, the switching judgment circuit 5E determines whether to make the area sensor 3 perform logarithmic or linear conversion and generates a judgment signal. On the basis of this judgment signal, the switching signal generating circuit 6 feeds a switching signal to the area sensor 3 to switch its operation between logarithmic and linear conversion. In other respects, this image-sensing apparatus 1G is configured in the same manner as the image-sensing apparatus 1 shown in FIG. 1. It is to be noted that, in the following descriptions, the electric signal fed from the area sensor 3 to the processing section 21 is referred to as the "image data", and the electric signal fed from the area sensor 3 to the brightness distribution evaluation section 45 is referred to as the "brightness signal".

1. An Example of the Circuit Configuration of the Area Sensor

Now, an example of the circuit configuration of the area sensor 3 used in this image-sensing apparatus configured as described above will be described with reference to FIG. 23. In this figure, reference symbols Ga11 to Ga*mn* and Gb11 to Gb*mn* represent pixels that are arranged in odd-numbered and even-numbered lines (rows), respectively, so as to form a two-dimensional array (in a matrix) as a whole. Reference numeral 7 represents a vertical scanning circuit, which scans the odd-numbered lines 9-1, 9-2, . . . , 9-*n* sequentially and also, separately therefrom, the even-numbered lines 15-1, 15-2, . . . , 15-n sequentially. Here, as in the first embodiment, the pixels Ga11 to Gamn and Gb11 to Gbmn each have a circuit configuration as shown in FIG. 3.

Reference numeral 8 represents a horizontal scanning circuit, which sequentially feeds the signals fed from the pixels Ga11 to Gamn to output signal lines 10-1, 10-2, . . . , 10-m as a result of photoelectric conversion performed in those pixels to a signal line 12 serving as a final destination line, and also sequentially feeds the signals fed from the pixels Gb11 to Gbmn to output signal lines 16-1, 16-2, . . . , 16-m as a result of photoelectric conversion performed in those pixels to a signal line 17 serving as a final destination line. Reference numeral 11 represents a power line. In addition, a connection switching section 18 is provided, which switches the destinations of the signal lines 12 and 17 individually between a brightness signal line 19 that leads to the brightness distribution evaluation section 45 (FIG. 1) and an image data line 20 that leads to the processing section 21 (FIG. 1).

The individual pixels are connected not only to the odd-numbered lines 9-1, 9-2, . . . , 9-n, the even-numbered lines 15-1, 15-2, . . . , 15-n, the output signal lines 10-1, 10-2, . . . , 10-m, the output signal lines 16-1, 16-2, . . . , 16-m, and to the power line 11 mentioned above, but also to other lines (for example clock lines and bias supply lines). These other lines, however, are omitted in FIG. 23.

As shown in the figure, N-channel MOS transistors Qa1, Qa2, . . . , Qam are provided one for each of the output signal lines 10-1, 10-2, . . . , 10-m, and N-channel MOS transistors Qb1, Qb2, . . . , Qbm are provided one for each of the output signal lines 16-1, 16-2, . . . , 16-m. The MOS transistors Qa1, Qa2, . . . , Qam have their drains connected to the output signal lines 10-1, 10-2, . . . , 10-m respectively, have their sources connected to the signal line 12 serving as a final destination line, and have their gates connected to the horizontal scanning circuit 8. On the other hand, the MOS transistors Qb1, Qb2, . . . , Qbm have their drains connected to the output signal lines 16-1, 16-2, . . . , 16-m respectively, have their sources connected to the signal line 17 serving as a final destination line, and have their gates connected to the horizontal scanning circuit 8.

As described earlier, within each pixel, another N-channel MOS transistor (a fourth MOS transistor) T4 functioning as a switch is provided. Whereas this MOS transistor T4 serves to select a row (line), the MOS transistors Qa1, Qa2, . . . , Qam and Qb1, Qb2, . . . , Qbm serve to select a column.

In this area sensor 3 configured as described above, while the vertical scanning circuit 7 is scanning the pixels Ga11 to Gamn along the odd-numbered lines 9-1 to 9-n, the horizontal scanning circuit 8 turns on the transistors Qa1 to Qam sequentially so that the electric signals delivered to the output signal lines 10-1 to 10-m are delivered further to the signal line 12. Here, it is assumed that the signal line 12 is kept connected to the image data line 20 by the connection switching section 18, and therefore those electric signals, conveying as a whole one field of an image, are then fed as image data to the processing section 21 (FIG. 22).

Simultaneously, while the vertical scanning circuit 7 is scanning the pixels Gb11 to Gbmn along the even-numbered lines 15-1 to 15-n, the horizontal scanning circuit 8 turns on the transistors Qb1 to Qbm sequentially so that the electric signals delivered to the output signal lines 16-1 to 16-m are delivered further to the signal line 17. Here, it is assumed that the signal line 12 is kept connected to the image data line 20 by the connection switching section 18, and therefore the signal line 17 is kept connected to the brightness signal line 19. Accordingly, the electric signals delivered to the signal line 17 are then fed as a brightness signal to the brightness distribution evaluation section 45 (FIG. 22).

In this way, the image data corresponding to one frame from the pixels Ga11 to Gamn is fed to the processing section 21, and simultaneously the brightness signal from the pixels Gb11 to Gbmn is fed to the brightness distribution evaluation section 45. Thereafter, the connection switching section 18 reconnects the signal line 12 to the brightness signal line 19 and the signal line 17 to the image data line 20. After this switching of the connection of the signal lines 12 and 17 by the connection switching section 18, the image data corresponding to one frame from the pixels Gb11 to Gbmn is fed to the processing section 21, and simultaneously the brightness signal from the pixels Ga11 to Gamn is fed to the brightness distribution evaluation section 45.

In this way, this area sensor 3 adopts interlaced scanning by outputting as image data alternately, field by field, the electric signals obtained from the pixels Ga11 to Gamn arranged in the odd-numbered lines and the electric signals obtained from the pixels Gb11 to Gbmn arranged in the even-numbered lines. However, in this area sensor, all the pixels are read within each field, and the connection switching section 18 switches the signal destinations in such a way that the electric signals from the pixels arranged in the lines currently selected for image data output are fed as image data to the image data line 20 and the electric signals from the pixels arranged in the other lines that are not currently selected for image data output are fed as a brightness signal to the brightness signal line 19.

2. Another Example of the Circuit Configuration of the Area Sensor

Now, another example of the circuit configuration of the area sensor 3 will be described with reference to FIG. 24. In this figure, reference symbols Ga11 to Gamn and Gb11 to Gbmn represent pixels that are arranged in odd-numbered and even-numbered lines (rows), respectively, so as to form a two-dimensional array (in a matrix) as a whole. Reference numeral 7 represents a vertical scanning circuit, which scans the odd-numbered lines 9-1, 9-2, . . . , 9-n sequentially and also, separately therefrom, the even-numbered lines 15-1, 15-2, . . . , 15-n sequentially. Here, as in the first embodiment, the pixels Ga11 to Gamn and Gb11 to Gbmn each have a circuit configuration as shown in FIG. 6.

Reference numeral 8 represents a horizontal scanning circuit, which sequentially feeds the signals fed from the pixels Ga11 to Gamn to output signal lines 10-1, 10-2, . . . , 10-m as a result of photoelectric conversion performed in those pixels to a signal line 12 serving as a final destination line, and also sequentially feeds the signals fed from the pixels Gb11 to Gbmn to output signal lines 16-1, 16-2, 16-m as a result of photoelectric conversion performed in those pixels to a signal line 17 serving as a final destination line. Reference numeral 11 represents a power line. In addition, a connection switching section 18 is provided, which switches the destinations of the signal lines 12 and 17 individually between a brightness signal line 19 that leads to the brightness distribution evaluation section 45 (FIG. 22) and an image data line 20 that leads to the processing section 21 (FIG. 22).

The individual pixels are connected not only to the odd-numbered lines 9-1, 9-2, . . . , 9-n, the even-numbered lines 15-1, 15-2, . . . , 15-n, the output signal lines 10-1, 10-2, . . . , 10-m, the output signal lines 16-1, 16-2, . . . , 16-m, and to the power line 11 mentioned above, but also to other lines (for example clock lines and bias supply lines). These other lines, however, are omitted in FIG. 24.

As shown in the figure, N-channel MOS transistors Qa1, Qa2, . . . , Qam and N-channel MOS transistors Qc1, Qc2, ..., Qcm are provided in pairs, one pair for each of the output signal lines 10-1, 10-2, ..., 10-m. Moreover, N-channel MOS transistors Qb1, Qb2, ..., Qbm and N-channel MOS transistors Qd1, Qd2, ..., Qdm are provided in pairs, one pair for each of the output signal lines 16-1, 16-2, ..., 16-m.

The MOS transistors Qa1, Qa2, ..., Qam have their drains connected to the output signal lines 10-1, 10-2, ..., 10-m respectively, have their sources connected to the signal line 12 serving as a final destination line, and have their gates connected to the horizontal scanning circuit 8. The MOS transistors Qb1, Qb2, ..., Qbm have their drains connected to the output signal lines 16-1, 16-2, ..., 16-m respectively, have their sources connected to the signal line 17 serving as a final destination line, and have their gates connected to the horizontal scanning circuit 8. The MOS transistors Qc1, Qc2, ..., Qcm have their gates connected to a direct-current voltage line 13, have their drains connected to the output signal lines 10-1, 10-2, ..., 10-m respectively, and have their sources connected to a direct-current voltage VPSA line 14. The MOS transistors Qd1, Qd2, ..., Qdm have their gates connected to the direct-current voltage line 13, have their drains connected to the output signal lines 16-1, 16-2, ..., 16-m respectively, and have their sources connected to the direct-current voltage VPSA line 14.

As will be described later, the pixels G11 to Gmn are each provided with an N-channel MOS transistor (a fifth MOS transistor) T5 that outputs a signal in accordance with the photoelectric charge generated in that pixel. How this MOS transistor T5 is connected to the MOS transistor Q (this transistor Q corresponds to the transistors Qc1 to Qcm and Qd1 to Qdm shown in FIG. 24) is shown in FIG. 5A, i.e. the same as in the first embodiment. Thus, the lower-stage MOS transistor Q is equivalent to a resistor or constant-current source, and therefore the circuit shown in FIG. 5A forms an amplifier circuit of a source-follower type.

The MOS transistor Qx (this transistor Qx corresponds to the transistors Qa1 to Qam and Qb1 to Qbm shown in FIG. 24) is controlled by the horizontal scanning circuit 8 so as to function as a switching device as in the first embodiment. As described earlier, in the pixel shown in FIG. 6, another, i.e. a fourth, N-channel MOS transistor T4 functioning as a switch is provided. As in the first embodiment, if this fourth MOS transistor T4 is illustrated explicitly, the circuit shown in FIG. 5A has, more precisely, a circuit configuration as shown in FIG. 5B. Here, the MOS transistor T4 serves to select a row (line), and the MOS transistor Qx serves to select a column.

The circuit configuration shown in FIGS. 5A and 5B permits the signal generated therein to be output with a high gain. Accordingly, even in a case where the photoelectric current generated in a photosensitive element is converted natural-logarithmically to obtain a wider dynamic range and thus the output signal obtained is comparatively low if left intact, this amplifier circuit amplifies the signal so as to make it sufficiently high and thus easier to process in the succeeding signal processing circuit (not shown). Here, the MOS transistor Q that serves as the load resistor of the amplifier circuit is provided within each pixel; however, such transistors may be provided, instead, one for each of the output signal lines 10-1, 10-2, ..., 10-m and 16-1, 16-2, ..., 16-m, i.e. one for each of the groups of pixels constituting individual columns, with the pixels constituting each column collectively connected to one of the output signal lines 10-1, 10-2, ..., 10-m and 16-1, 16-2, ..., 16-m. This helps reduce the number of load resistors or constant-current sources required, and thus reduce the area occupied by the amplifying circuits on a semiconductor chip.

3. Outline of the Operation of the Image-Sensing Device

Next, descriptions will be given of how the image-sensing apparatus 1G operates when it is provided with an area sensor configured as shown in FIG. 23 and having pixels as shown in FIG. 3 or when it is provided with an area sensor configured as shown in FIG. 24 and having pixels as shown in FIG. 6.

When the pixels arranged in the odd-numbered lines of the area sensor 3 output image data corresponding to one field, the pixels arranged in the even-numbered lines of the area sensor 3 output a brightness signal to the brightness distribution evaluation section 45. Here, the pixels arranged in the even-numbered lines of the area sensor 3 perform logarithmic conversion. On the other hand, when the pixels arranged in the even-numbered lines of the area sensor 3 output image data corresponding to one field, the pixels arranged in the odd-numbered lines of the area sensor 3 output a brightness signal to the brightness distribution evaluation section 45. Here, the pixels arranged in the odd-numbered lines of the area sensor 3 perform logarithmic conversion.

The brightness distribution evaluation section 45 then evaluates brightness distribution, i.e. the distribution of the frequencies of different brightness values as known from the brightness signal output from the area sensor 3. The thus evaluated brightness distribution is then fed to the switching judgment circuit 5E, which determines, on the basis of the shape of the brightness distribution fed thereto, whether the pixels that are used for image data output next time should be made to perform logarithmic or linear conversion. The result of this determination is fed, as a judgment signal, to the switching signal generating circuit 6, which then, by switching the signal φVPS (FIG. 3 or 6) fed to the pixels that are used for image data output next time, determines the type of photoelectric conversion that those pixels should perform then. In this image-sensing apparatus operating as described above, which type of conversion to perform is determined in the following manner.

4. How to Determine which Type of Conversion to Perform

Figure 25:
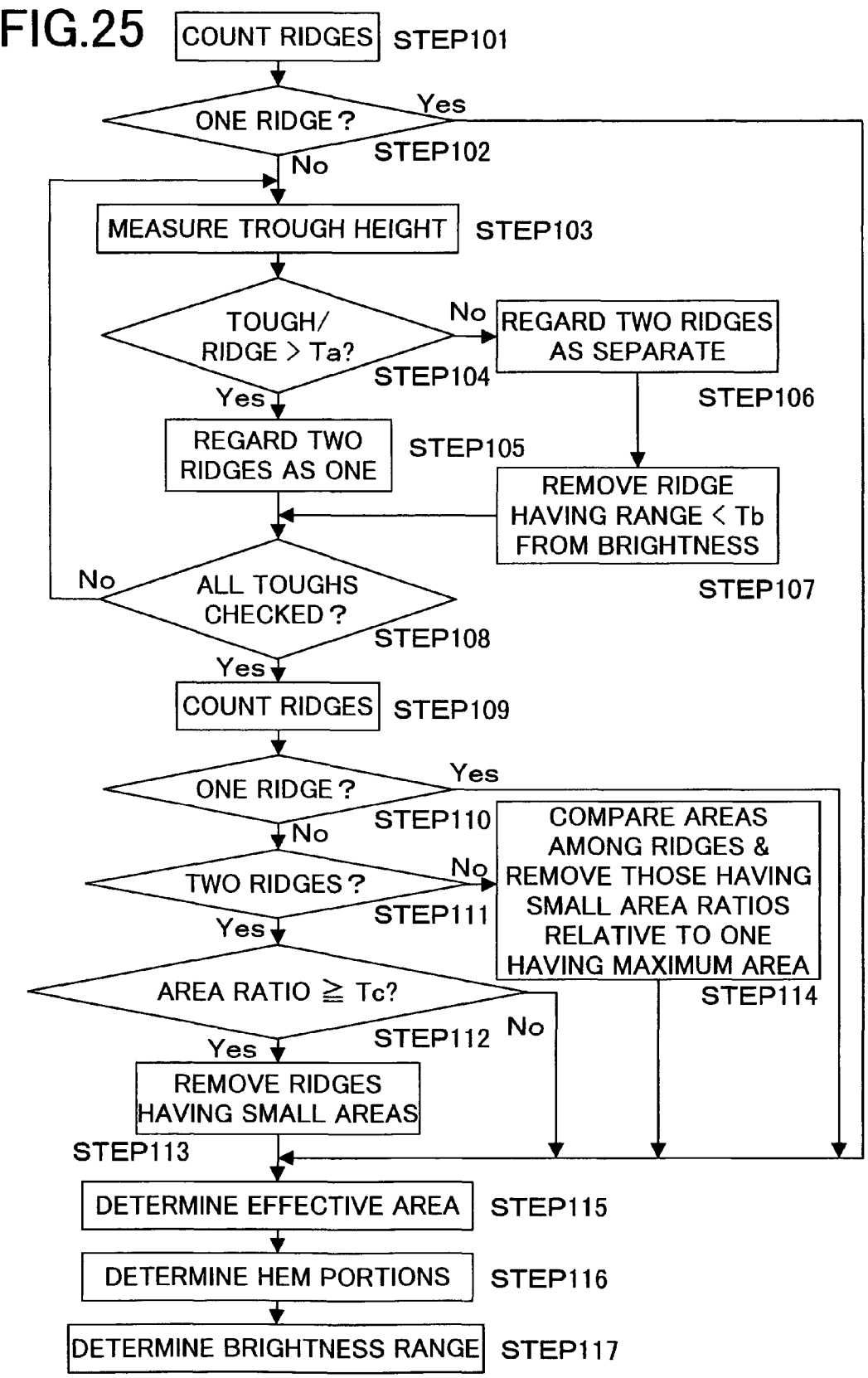
FIG. 25 is a flow chart of the operations performed by the switching judgment circuit provided in the image-sensing apparatus shown in FIG. 22.
Figure 26:
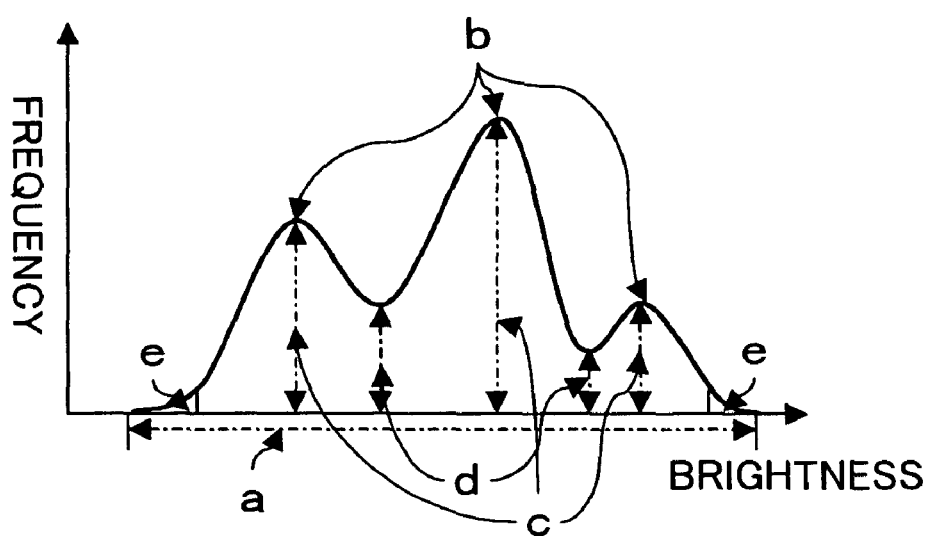
FIG. 26 is a diagram showing an example of brightness distribution.

FIG. 25 is a flow chart showing the flow of operations performed in this image-sensing apparatus 1G to determine which type of conversion the area sensor 3 should be made to perform on the basis of brightness distribution. FIG. 26 shows an example of brightness distribution, with brightness taken along the horizontal axis and the frequencies of different brightness values taken along the vertical axis. In the following descriptions, on a curve defining a particular brightness distribution, a point that corresponds to a maximum value is referred to as a "ridge" and a point that corresponds to a minimum value is referred to as a "trough"; the frequency observed at a ridge is referred to as "the height of the ridge" and the frequency observed at a trough is referred to as "the height of the trough"; the portions of the brightness distribution near both ends thereof, where the frequencies observed are largely low, are called "hem portions". Thus, in FIG. 26, a indicates the width of a brightness range, b indicates the number of ridges, c indicates the height of ridges, d indicates the height of troughs, and e indicates the hem portions of the distribution curve.

Figure 27A:
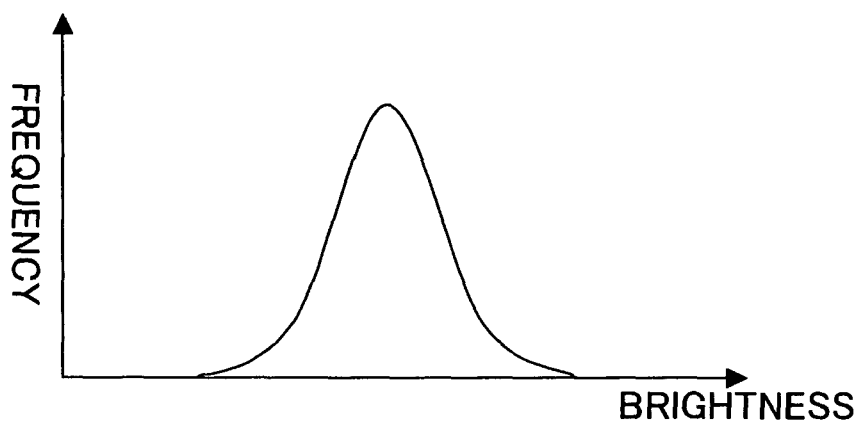
FIGS. 27A, 27B, and 27C are diagrams showing an example of brightness distribution.
Figure 27B:
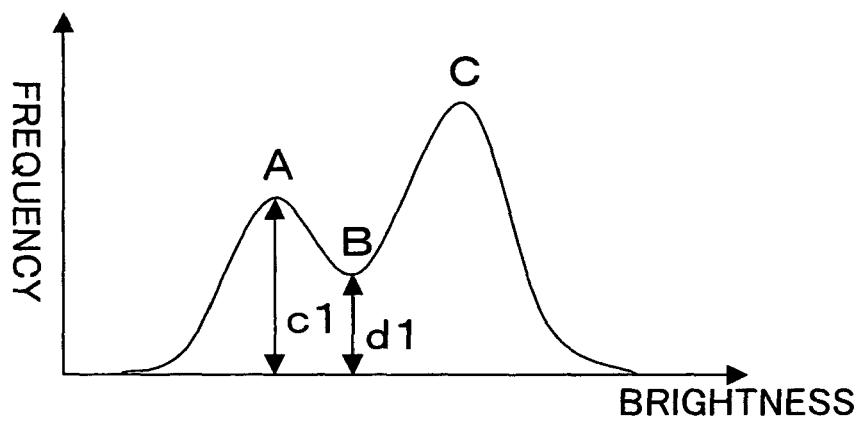

When the brightness distribution evaluated by the brightness distribution evaluation section 45 is fed to the switching judgment circuit 5E, first, the number of ridges is counted (STEP 101). If the number of ridges thus counted is one as shown in FIG. 27A (Yes), the operation flow proceeds to STEP 115; if the number of ridges is more than one as shown in FIG. 27B (No), the operation flow proceeds to STEP 103 (STEP 102). When the operation flow proceeds from STEP 102 to STEP 103, the height of the trough is measured. If the ratio of the height of the trough measured here to the height of the lower one of the two ridges adjacent thereto is greater than a threshold value Ta (Yes), the operation flow proceeds to STEP 105; if that ratio is less than the threshold value Ta (No), the operation flow proceeds to STEP 106 (STEP 104). That is, in the case shown in FIG. 27B, in STEP 104, whether the ratio (d1)/(c1) of the height d1 of the trough B to the height of the lower one of the ridges A and C adjacent thereto is greater than Ta or not is checked.

When the operation flow proceeds from STEP 104 to STEP 105, instead of regarding the lower ridge as an independent ridge, the two ridges adjacent to the trough is regarded as a single ridge as a whole. That is, in FIG. 27B, if the trough B is so high that the ratio of its height to the height of the lower ridge A is greater than the threshold value Ta, the lower ridge A is regarded no longer as an independent ridge but as part of the higher ridge C. When the operation flow proceeds from STEP 104 to STEP 106, the two ridges adjacent to the trough are regarded as separate and thus independent ridges. That is, in FIG. 27B, if the trough B is so low that the ratio of its height to the height of the lower ridge A is lower than the threshold value Ta, the ridges A and C are regarded as independent ridges.

Figure 27C:
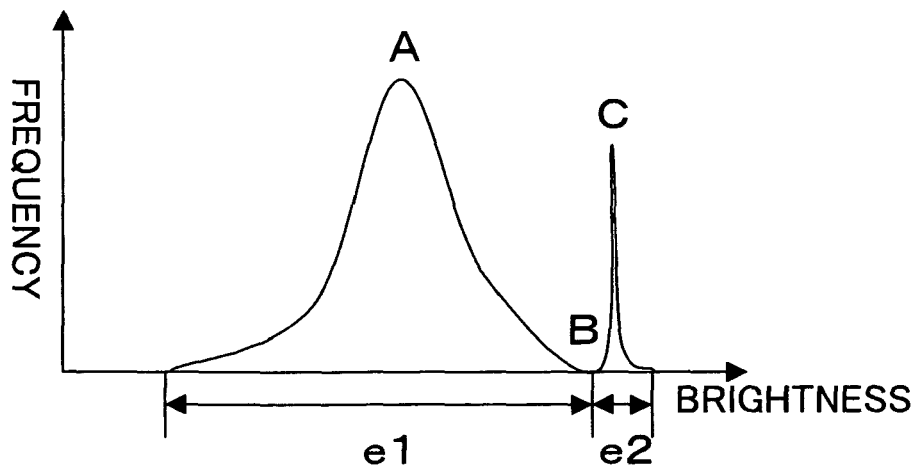

When, in STEP 106, the two ridges adjacent to the trough are found to be separate from each other, then, if any of those two ridges has a brightness range narrower than a threshold value Tb, it is no longer regarded as a ridge and is excluded from the brightness distribution (STEP 107). Here, the brightness range of a ridge is defined as the range between the brightness values at the two troughs adjacent thereto, or alternatively, in the case of a ridge located at one end of the brightness distribution, as the range between that end and the brightness value at the trough adjacent to the ridge on the opposite side thereof. Thus, if, as shown in FIG. 27C, the brightness range e1 of the ridge A is wider than the threshold value Tb, and the brightness range e2 of the ridge C is narrower than the threshold value Tb, the ridge C is no longer regarded as a ridge and is excluded from the brightness distribution.

When the operation flow proceeds from STEP 105 or STEP 107 to STEP 108, whether all the troughs within the evaluated brightness distribution have already been subjected to the operations in STEP 103 to STEP 107 or not is checked. If all the troughs have already been subjected to the operations in STEP 103 to STEP 107 (Yes), the operation flow proceeds to STEP 109; if any of the troughs has not yet been subjected to those operations (No), the operation flow returns to STEP 103 to repeat those operations.

In STEP 109, the number of ridges is counted once again. If the number of ridges counted here is one (Yes), the operation flow proceeds to STEP 115; if the number of ridges is more than one (No), the operation flow proceeds to STEP 111 (STEP 110). In STEP 111, whether the number of ridges is two or not is checked. If the number of ridges is two (Yes), the operation flow proceeds to STEP 112; if the number of ridges is three or more (No), the operation flow proceeds to STEP 114. In STEP 112, whether the area ratio calculated by dividing the area of the ridge having the larger area by that of the ridge having the smaller area is greater than a threshold value Tc or not is checked. If this area ratio is greater than the threshold value Tc (Yes), the operation flow proceeds to STEP 113, where the ridge having the smaller area is excluded from the brightness distribution; if the area ratio is smaller than the threshold value Tc (No), the operation flow proceeds to STEP 115.

Figure 28:
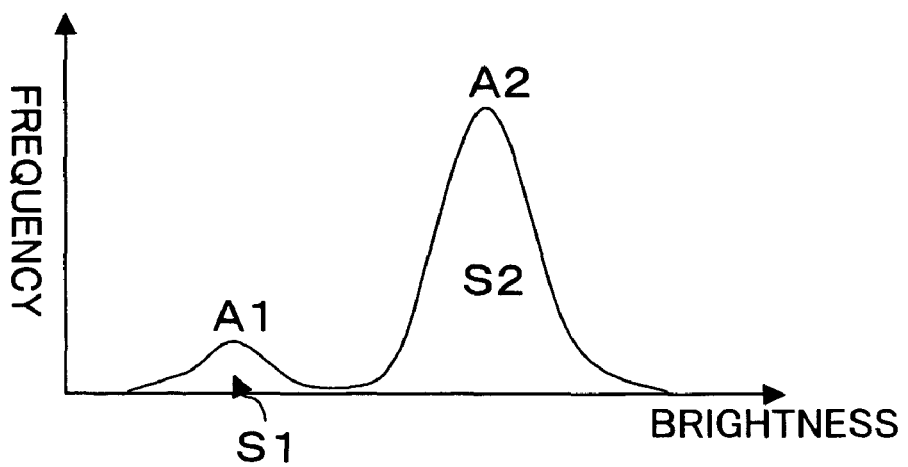
FIG. 28 is a diagram showing an example of brightness distribution.

In STEP 113, the ridge having the smaller area is excluded from the brightness distribution. That is, as shown in FIG. 28, if, in STEP 109, two ridges A1 and A2 are recognized, their respective areas S1 and S2 are calculated, and then, since S1<S2 here, the area ratio (S2)/(S1) is compared with the threshold value Tc (STEP 112). In this case, if the area ratio (S2)/(S1) is greater than the threshold value Tc, the ridge A1 having the smaller area is excluded from the brightness distribution, and thus the brightness distribution is regarded as being formed by the ridge A2. Here, the area of a ridge is defined as the integral with respect to brightness of the frequencies of different brightness values between the troughs adjacent thereto, or alternatively, in the case of a ridge located at one end of the brightness distribution, as the integral with respect to brightness of the frequencies of different brightness values between that end and the trough adjacent to the ridge on the opposite side thereof.

Figure 29:
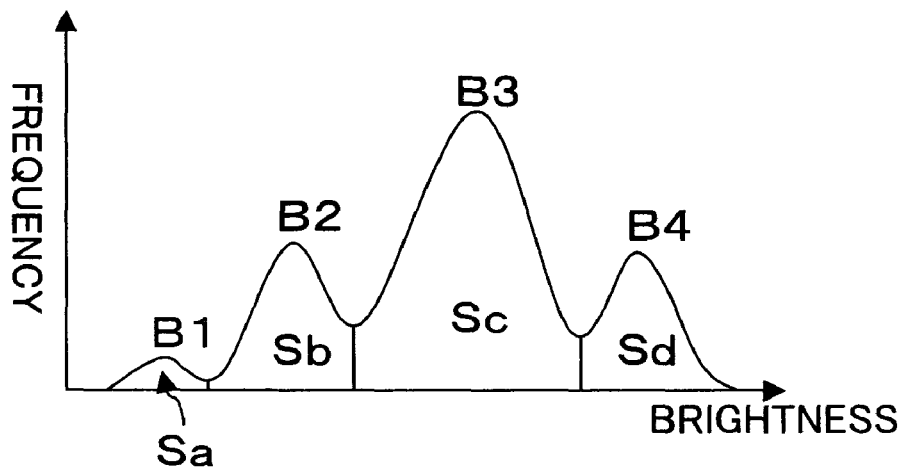
FIG. 29 is a diagram showing an example of brightness distribution.

In STEP 114, out of the ridges still regarded as ridges, the one having the largest area is selected as the reference, and, in order of decreasing distance to this reference ridge, the area ratio calculated by dividing the area of each of the other ridges by the area of the reference ridge having the largest area is compared, one after another, with a threshold value Td. Here, any ridge of which the area ratio is smaller than the threshold value Td is no longer regarded as a ridge, and is excluded from the brightness distribution. When ridges of which the area ratios are larger than the threshold value Td are found on both sides, i.e. lower-brightness and higher-brightness sides, of the reference ridge having the largest area, the operation flow is ended. That is, as shown in FIG. 29, if, in STEP 109, four ridges B1 to B4 are recognized, their respective areas Sa to Sd are calculated, and, when the area Sc of the ridge B3 is the largest of all these areas, the area ratios (Sa)/(Sc), (Sd)/(Sc), and (Sb)/(Sc) are compared, in this order, with the threshold value Td. Here, relative to the ridge B3, the ridges B1/4, and B2 are so located that their distances to the ridge B3 increases in the order named.

Here, assume that the area ratio (Sa)/(Sc) is smaller than the threshold value Td, and that the area ratios (Sd)/(Sc) and (Sb)/(Sc) are greater than the threshold value Td. In this case, first, the ridge B1 is checked, and its area ratio is found to be smaller than the threshold value Td. Thus, the ridge B1 is no longer regarded as a ridge and is thus excluded from the brightness distribution. Next, the ridge B4 is checked, and its area ratio is found to be greater than the threshold value Td. Thus, the checking of the ridges that are located on the higher-brightness side of the ridge B3 is ended. Next, the ridge B2 is checked, and its area ratio is found to be greater than the threshold value Td. Thus, the checking of the ridges that are located on the lower-brightness side of the ridge B3 is ended. When the operation in STEP 114 is completed in this way, the operation flow proceeds to STEP 115.

In STEP 115, the area of the ridges excluded from the brightness distribution is subtracted from the area of the entire brightness distribution, and the area that remains thereafter is determined as the effective area. That is, if only one ridge is recognized in STEP 102 or STEP 110, or if the area ratios of two ridges are smaller than the threshold value Tc in STEP 112, then the entire brightness distribution is determined as the effective area; on the other hand, when the operation flow proceeds from STEP 113 or STEP 114 to STEP 115, the area that remains after subtracting the area of the ridges excluded from the brightness distribution in STEP 113 or STEP 114 from the area of the entire brightness distribution is determined as the effective area.

Figure 30:
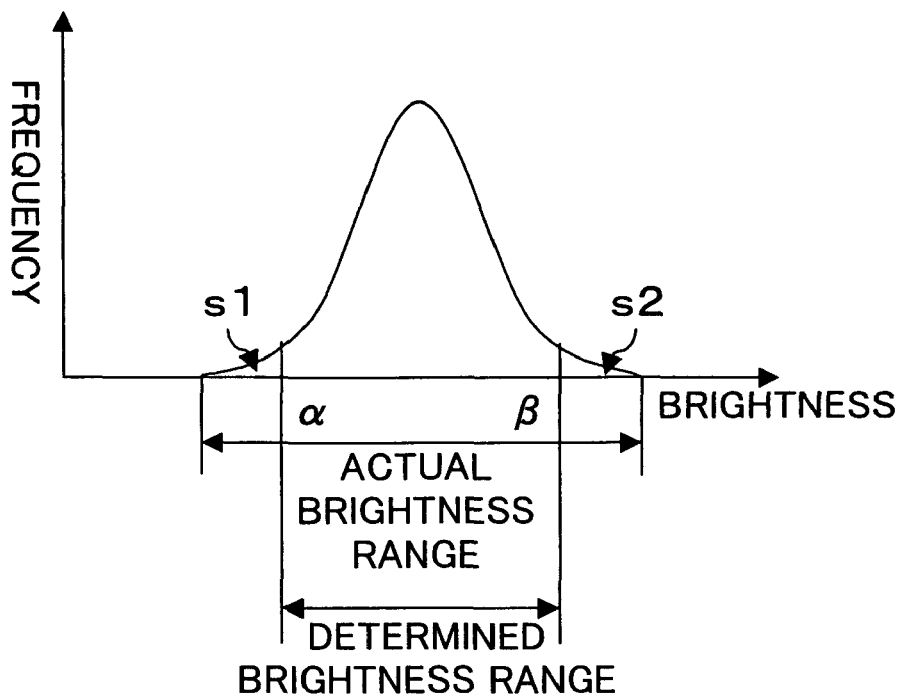
FIG. 30 is a diagram showing an example of brightness distribution.

When the effective area is determined in this way, on the basis of what portion of the brightness distribution forms the effective area, the hem portions are determined. That is, as shown in FIG. 30, the brightness α at which the value obtained by integrating the frequencies of different brightness values with respect to brightness from the lowest brightness upward within the portion of the brightness distribution that forms the effective area becomes equal to x percent of the effective area is calculated, and also the brightness β at which the value obtained by integrating the frequencies of different brightness values with respect to brightness from the highest brightness downward within the portion of the brightness distribution that forms the effective area becomes equal to x percent of the effective area is calculated. Then, the portion s1 corresponding to brightness lower than the brightness α and the portion s2 corresponding to brightness higher than the brightness β are determined as the hem portions.

The hem portions thus determined are removed from the brightness distribution, and the brightness range that remains thereafter in the brightness distribution is determined as the brightness range of the subject (STEP 117). That is, in FIG. 30, the brightness range from the brightness α to the brightness β is determined as the brightness range of the subject. In this way, the switching point with reference to which to determine whether to make the area sensor 3 perform logarithmic or linear conversion is set at a point at which the brightness range of a subject as evaluated by performing the operations shown in the flow chart FIG. 25 is expressed, for example, with a 2.5-digit value. By determining the brightness range of a subject in accordance with the shape of the brightness distribution in this way, it is possible to determine proper brightness ranges with subjects having different brightness distribution, and thus shoot various subjects properly.

When the area sensor 3 is made to perform logarithmic conversion, it is possible to shoot a subject having a wide brightness range, though with poor gradation in bright portions of the subject Accordingly, logarithmic conversion is effective in cases where the brightness range is so wide as to be expressed with a three- to four-digit value, as when the brightness of a subject is high, in particular when the subject is in direct sunlight or the background includes direct sunlight, because logarithmic conversion then offers sufficient rendering of portions in shade and thus yields high-quality images with satisfactory perspective.

When the area sensor 3 is made to perform linear conversion, although it is not possible to shoot a subject having a wide brightness range, it is possible to obtain superb gradation all over the image obtained. Accordingly, linear conversion is effective in cases where the brightness range is so narrow as to be expressed with a two-digit value, as when the brightness of a subject is low, in particular when the subject is in shade or the subject is shot under a cloudy sky, because linear conversion then yields high-quality images with superb gradation.

(A) When the Brightness Range of the Evaluated Brightness Distribution is Wide

When the pixels arranged in the odd-numbered lines of the area sensor 3 output image data corresponding to one field, the pixels arranged in the even-numbered lines of the area sensor 3 output a brightness signal to the brightness distribution evaluation section 45. Here, the pixels arranged in the even-numbered lines of the area sensor 3 perform logarithmic conversion. The brightness distribution evaluated by the brightness distribution evaluation section 45 is fed to the switching judgment circuit 5E, which, on the basis of the brightness distribution fed thereto, determines the brightness range of the subject by performing the operations shown in FIG. 25 and, if the thus determined brightness range of the subject is found to be expressed with a value having 2.5 or more digits, the brightness range of the subject is judged to be wide. Thus, the switching judgment circuit 5E judges that the area sensor 3 should be made to perform logarithmic conversion. On receiving a judgment signal to that effect, the switching signal generating circuit 6 generates a switching signal that turns the signal φVPS (FIG. 3 or 6) to a low level.

This switching signal causes the voltage applied to the source of the transistor T1 (FIG. 3 or 6) and to the capacitor C (FIG. 3 or 6) in each of the pixels arranged in the even-numbered lines of the area sensor 3 and currently selected for image data output for the next field to turn to a low level. As a result, the transistors T1 and T2 (FIG. 3 or 6) are so biased as to operate in a subthreshold region as described earlier. Thus, the pixels arranged in the even-numbered lines of the area sensor 3, which are so biased as to perform logarithmic conversion, output the image data of the next field, and simultaneously the pixels arranged in the odd-numbered lines of the area sensor 3 output a brightness signal to the brightness distribution evaluation section 45. Here, the pixels arranged in the odd-numbered lines of the area sensor 3 perform logarithmic conversion.

(B) When the Brightness Range of the Evaluated Brightness Distribution is Narrow When the pixels arranged in the odd-numbered lines of the area sensor 3 output image data corresponding to one field, the pixels arranged in the even-numbered lines of the area sensor 3 output a brightness signal to the brightness distribution evaluation section 45. Here, the pixels arranged in the even-numbered lines of the area sensor 3 perform logarithmic conversion. The brightness distribution evaluated by the brightness distribution evaluation section 45 is fed to the switching judgment circuit 5E, which, on the basis of the brightness distribution fed thereto, determines the brightness range of the subject by performing the operations shown in FIG. 25 and, if the thus determined brightness range of the subject is found to be expressed with a value having less than 2.5 digits, the brightness range of the subject is judged to be narrow. Thus, the switching judgment circuit 5E judges that the area sensor 3 should be made to perform linear conversion. On receiving a judgment signal to that effect, the switching signal generating circuit 6 generates a switching signal that turns the signal φVPS (FIG. 3 or 6) to a high level.

This switching signal causes the voltage applied to the source of the transistor T1 (FIG. 3 or 6) in each of the pixels arranged in the even-numbered lines of the area sensor 3 and currently selected for image data output for the next field to turn to a high level. As a result, the transistor T1 (FIG. 3 or 6) is substantially turned off. Thus, the pixels arranged in the even-numbered lines of the area sensor 3, which are so biased as to perform linear conversion, output the image data of the next field, and simultaneously the pixels arranged in the odd-numbered lines of the area sensor 3 output a brightness signal to the brightness distribution evaluation section 45. Here, the pixels arranged in the odd-numbered lines of the area sensor 3 perform logarithmic conversion.

In this way, while the image data of a field is output from the pixels arranged in the odd-numbered lines of the area sensor 3, a brightness signal is output from the pixels, performing logarithmic conversion, arranged in the even-numbered lines to permit the brightness distribution evaluation section 45 to evaluate the brightness distribution. Then, on the basis of the thus evaluated brightness distribution, the switching judgment circuit 5E determines the brightness range and makes a judgment, on the basis of which the switching signal generating circuit 6 feeds a switching signal to the area sensor 3 to determine the type of conversion that the pixels arranged in the even-numbered lines should perform when they output the image data of the next field.

On the other hand, while the image data of a field is output from the pixels arranged in the even-numbered lines of the area sensor 3, a brightness signal is output from the pixels, performing logarithmic conversion, arranged in the odd-numbered lines to permit the brightness distribution evaluation section 45 to evaluate the brightness distribution. Then, on the basis of the thus evaluated brightness distribution, the switching judgment circuit 5E determines the brightness range and makes a judgment, on the basis of which the switching signal generating circuit 6 feeds a-switching signal to the area sensor 3 to determine the type of conversion that the pixels arranged in the odd-numbered lines should perform when they output the image data of the next field.

In this embodiment, image shooting is achieved by performing interlaced scanning in which the type of conversion that the area sensor should be made to perform is determined on the basis of a brightness signal obtained as image data corresponding to one field from the pixels that are not currently selected for image data output and that perform logarithmic conversion. However, it is also possible to determine the type of conversion that the area sensor should be made to perform on the basis of a brightness signal obtained by permitting the area sensor to perform logarithmic conversion several times per second. Specifically, the area sensor is so controlled that, while performing a shooting operation, it first outputs several frames as image data and then outputs the image data of the next one frame as a brightness signal so that the type of conversion that the area sensor should be made to perform is determined on the basis of this brightness signal. This makes it possible to determine the type of conversion that the area sensor should be made to perform even in image-sensing apparatuses that achieve image shooting by progressive scanning.

Alternatively, it is also possible to feed the output of the area sensor as image data to the processing section and concurrently feed it also as a brightness signal to the brightness distribution evaluation section all the time. In this case, while the area sensor is performing logarithmic conversion, the brightness distribution is evaluated on the basis of the output from the area sensor in a manner as described above, and then, on the basis of the thus evaluated brightness distribution, the type of conversion that the area sensor should be made to perform is determined. While the area sensor is performing linear conversion, the brightness distribution is evaluated on the basis of the output from the area sensor in a similar manner. If saturation or flat blackness is recognized in the thus evaluated brightness distribution, first, the operation of the area sensor is switched to logarithmic conversion. Then, the brightness distribution is evaluated on the basis of the output of the area sensor performing logarithmic conversion, and, on the basis of the thus evaluated brightness distribution, the type of conversion that the area sensor should be made to perform is determined.

The configuration of this embodiment is applicable not only to image-sensing apparatuses in which all of the pixels currently outputting the image data of the field currently being shot are used to output a brightness signal, but also to image-sensing apparatuses in which only part of those pixels are used to output a brightness signal. Even in cases where the image data of several frames is used as image data and then the image data of the next one frame is used as a brightness signal, it is possible to output a brightness signal by using either all or part of the pixels of that one frame.

Figure 31:
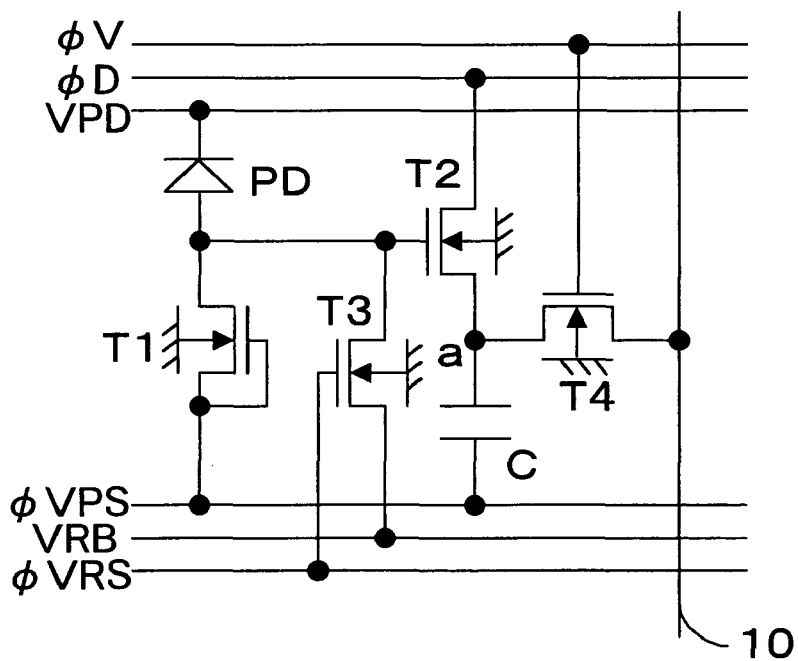
FIG. 31 is a diagram showing an example of the circuit configuration of each pixel provided in an area sensor.
Figure 32:
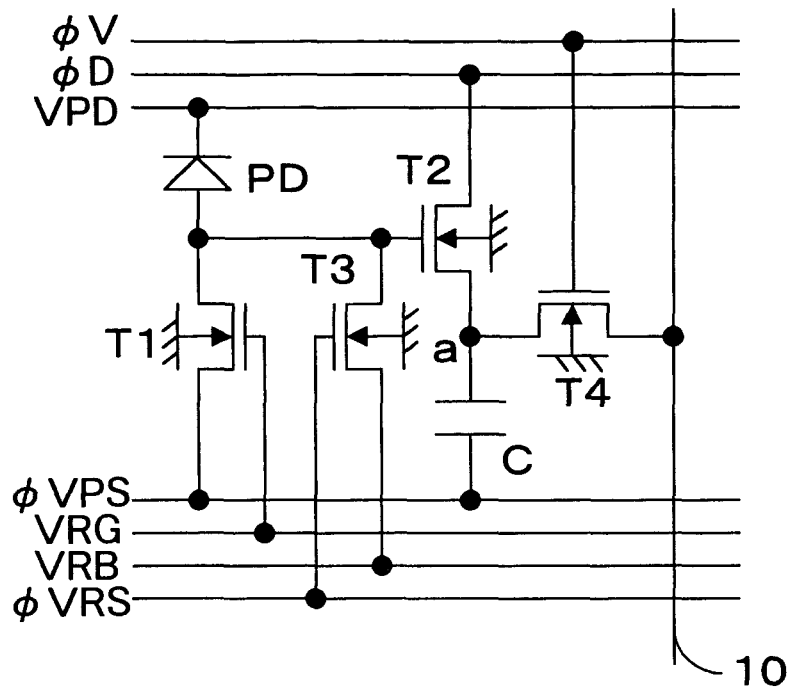
FIG. 32 is a diagram showing an example of the circuit configuration of each pixel provided in an area sensor.

The first to eighth embodiments described above assume the use of an area sensor configured as shown in FIG. 2 or 23 and provided with pixels each having a circuit configuration as shown in FIG. 3. However, it is also possible to use an area sensor provided with pixels having any other circuit configuration, for example as shown in FIG. 31 or 32. Now, the circuit configuration of the pixel shown in FIG. 31 will be described. It is to be noted that such elements, signal lines, and others as are used for the same purposes here as in the pixel shown in FIG. 3 are identified with the same reference symbols, and their detailed descriptions will be omitted.

In the pixel shown in FIG. 31, the source and gate of the transistor T1 are connected together in contrast to the pixel shown in FIG. 3, in which the drain and gate of the transistor T1 are connected together. When this pixel produces an output by converting the photoelectric current logarithmically, it operates as follows. The voltage difference between the source and drain of the transistor T1 is made greater so that the voltage appearing between the gate and source of the same transistor becomes lower than the threshold voltage. This brings the transistor T1 into the same state as when it is so biased as to operate in a subthreshold region. As a result, the pixel yields an output that is obtained by converting logarithmically the photoelectric current generated in the photodiode PD.

When the pixel produces an output by converting the photoelectric current linearly, it operates as follows. In this case, the signal φVPS applied to the source of the transistor T1 is made equal to a voltage slightly lower than the direct-current voltage VPD. This brings the transistor T1 into a substantially cut-off state. Thus, no current flows between the source and drain of the transistor T1. How the pixel operates hereafter is the same as with the pixel shown in FIG. 3.

Next, the circuit configuration of the pixel shown in FIG. 32 will be described. It is to be noted that such elements, signal lines, and others as are used for the same purposes here as in the pixel shown in FIG. 31 are identified with the same reference symbols, and their detailed descriptions will be omitted.

In the pixel shown in FIG. 32, a direct-current voltage VRG is applied to the gate of the transistor T1. In other respects, the pixel shown in FIG. 32 has the same circuit configuration as the pixel shown in FIG. 31. The pixel configured as shown in FIG. 32 operates essentially in the same manner as the pixel configured as shown in FIG. 31, and differs therefrom only in that it permits the gate voltage of the transistor T1 to be set at an appropriate voltage. This eliminates the need to turn the signal φVPS to a sufficiently low voltage when logarithmic conversion is performed as in the pixel shown in FIG. 31; that is, here, the transistor T1 can be brought into the same state as when it is so biased as to operate in a subthreshold region simply by turning the signal φVPS to a moderately low voltage. Linear conversion is performed in the same manner as in the pixel shown in FIG. 31.

Figure 33:
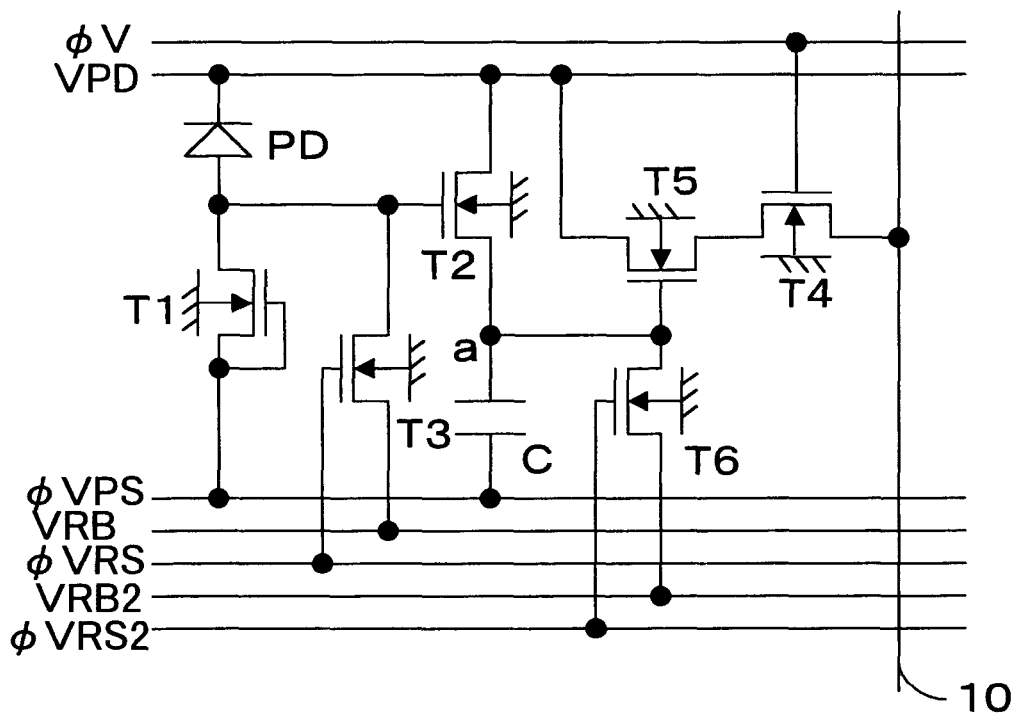
FIG. 33 is a diagram showing an example of the circuit configuration of each pixel provided in an area sensor.
Figure 34:
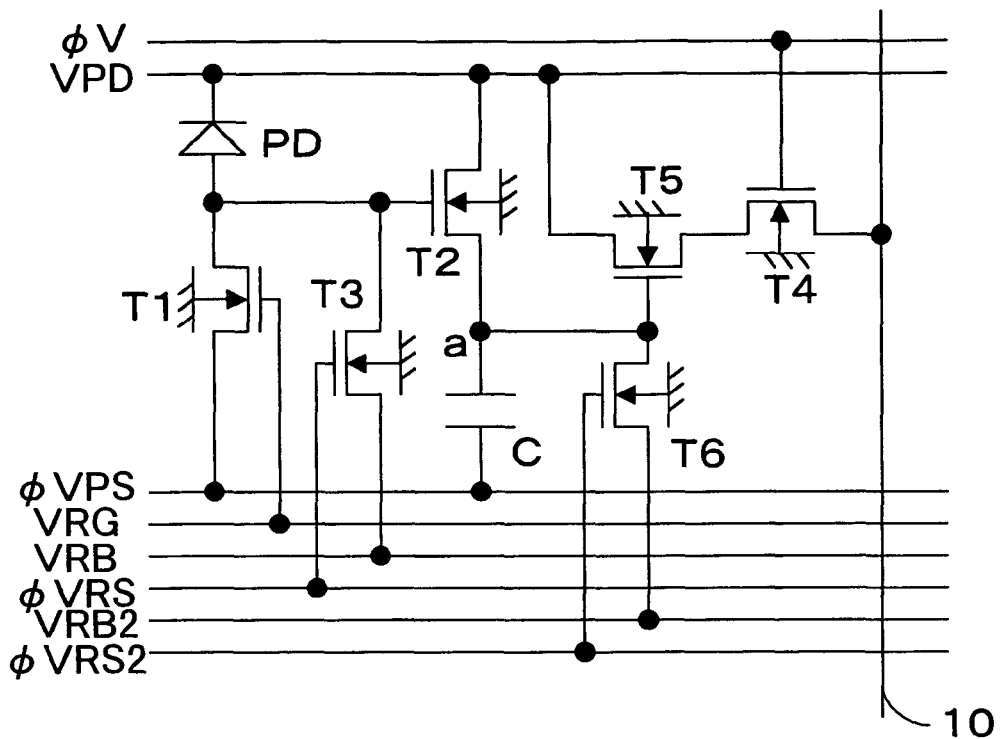
FIG. 34 is a diagram showing an example of the circuit configuration of each pixel provided in an area sensor.
Figure 35:
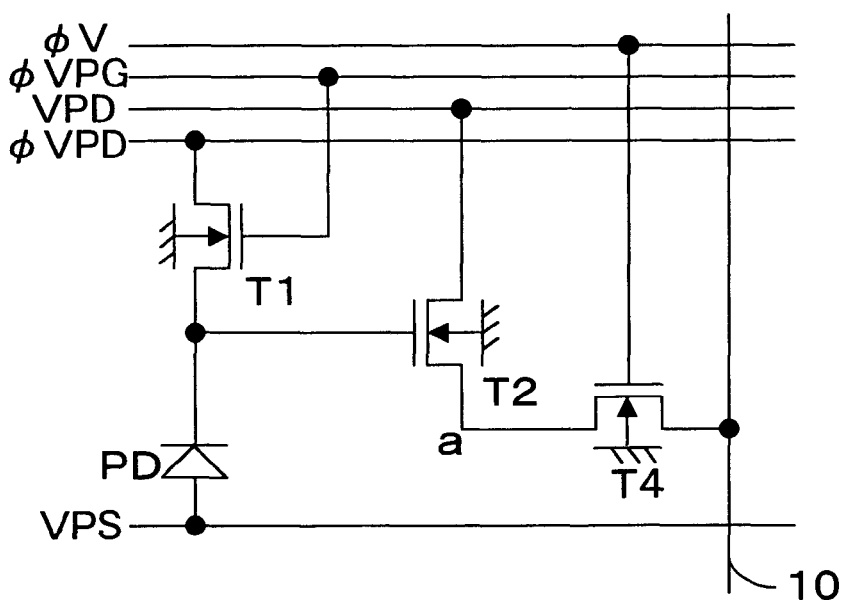
FIG. 35 is a diagram showing an example of the circuit configuration of each pixel provided in an area sensor.
Figure 36:
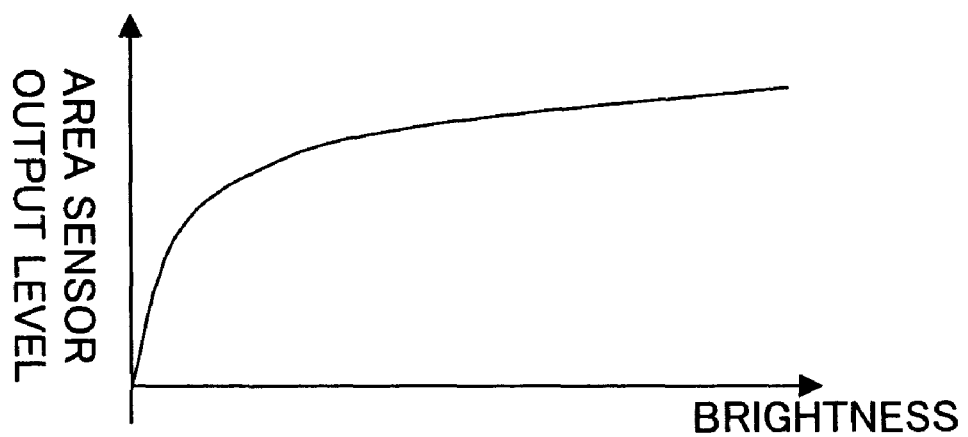
FIG. 36 is a diagram showing the output characteristic of a LOG sensor.

The first to seventh embodiments described above assume the use of an area sensor configured as shown in FIG. 4 or 24 and provided with pixels each having a circuit configuration as shown in FIG. 6. However, it is also possible to use an area sensor provided with pixels having any other circuit configuration, for example as shown in FIG. 33, 34, or 35. Now, the circuit configuration of the pixel shown in FIG. 33 will be described. It is to be noted that such elements, signal lines, and others as are used for the same purposes here as in the pixel shown in FIG. 6 are identified with the same reference symbols, and their detailed descriptions will be omitted.

In the pixel shown in FIG. 33, the source and gate of the transistor T1 are connected together in contrast to the pixel shown in FIG. 6, in which the drain and gate of the transistor T1 are connected together. When this pixel produces an output by converting the photoelectric current logarithmically, it operates as follows. The voltage difference between the source and drain of the transistor T1 is made greater so that the voltage appearing between the gate and source of the same transistor becomes lower than the threshold voltage. This brings the transistor T1 into the same state as when it is so biased as to operate in a subthreshold region. As a result, the pixel yields an output that is obtained by converting logarithmically the photoelectric current generated in the photodiode PD.

When the pixel produces an output by converting the photoelectric current linearly, it operates as follows. In this case, the signal φVPS applied to the source of the transistor T1 is made equal to a voltage slightly lower than the direct-current voltage VPD. This brings the transistor T1 into a substantially cut-off state. Thus, no current flows between the source and drain of the transistor T1. How the pixel operates hereafter is the same as with the pixel shown in FIG. 6.

Next, the circuit configuration of the pixel shown in FIG. 34 will be described. It is to be noted that such elements, signal lines, and others as are used for the same purposes here as in the pixel shown in FIG. 33 are identified with the same reference symbols, and their detailed descriptions will be omitted.

In the pixel shown in FIG. 34, a direct-current voltage VRG is applied to the gate of the transistor T1. In other respects, the pixel shown in FIG. 34 has the same circuit configuration as the pixel shown in FIG. 33. The pixel configured as shown in FIG. 34 operates essentially in the same manner as the pixel configured as shown in FIG. 33, and differs therefrom only in that it permits the gate voltage of the transistor T1 to be set at an appropriate voltage. This eliminates the need to turn the signal φVPS to a sufficiently low voltage when logarithmic conversion is performed as in the pixel shown in FIG. 33; that is, here, the transistor T1 can be brought into the same state as when it is so biased as to operate in a subthreshold region simply by turning the signal φVPS to a moderately low voltage. Linear conversion is performed in the same manner as in the pixel shown in FIG. 33.

Next, the circuit configuration of the pixel shown in FIG. 35 will be described. It is to be noted that such elements, signal lines, and others as are used for the same purposes here as in the pixel shown in FIG. 33 are identified with the same reference symbols, and their detailed descriptions will be omitted.

In the pixel shown in FIG. 35, a direct-current voltage VPS is applied to the anode of the photodiode PD, a signal φVPD is fed to the drain of the first MOS transistor T1, and the source of this first MOS transistor T1 is connected to the gate of the second MOS transistor T2. Moreover, a direct-current voltage VPD is applied to the drain of the MOS transistor T2, and the source of this MOS transistor T2 is connected to the drain of the fourth MOS transistor T4. A signal φV is fed to the gate of the MOS transistor T4, and the source of this MOS transistor T4 is connected to the signal line 10. Moreover, the cathode of the photodiode PD is connected to the source of the MOS transistor T1, and a signal φVPG is fed to the gate of this MOS transistor T1.

In this pixel, the voltages of the signals φVPD and φVPG are adjusted in such a way as to permit the MOS transistor T1 to operate in a subthreshold region. When the MOS transistor T1 is operating in a subthreshold region, a voltage logarithmically proportional to the photoelectric current generated in the photodiode PD appears at the gate of the MOS transistor T2, and thus the pixel outputs a logarithmically converted output signal. By contrast, when the MOS transistor T1 is turned off, a voltage linearly proportional to the photoelectric current generated in the photodiode PD appears at the gate of the MOS transistor T2, and thus the pixel outputs a linearly converted output signal. Here, the signal φVPD is used as the voltage for activating the MOS transistor T2, and, by turning on the MOS transistor T1, it is possible to reset the gate voltage of MOS transistor T2.

It is to be understood that, in the present invention, pixels configured in any other manner than specifically described above can be used as long as their operation can be switched between logarithmic and linear conversion. For example, it is possible to use pixels having a circuit configuration as shown in FIG. 3, 6, 31, 32, 33, or 34 but excluding the capacitor shown in those figures. It is also possible to use pixels having a circuit configuration as shown in FIG. 35 and further including an integrator circuit. In this way, it is possible to use pixels having any circuit configuration as long as their operation can be switched between logarithmic and linear conversion.

Also with respect to the area sensor, although the descriptions given above assume the use of an area sensor configured as shown in FIG. 2, 4, 23, or 24, it is also possible to use an area sensor configured in any other manner than specifically described above. For example it is possible to use an area sensor having P-channel MOS transistors instead of N-channel MOS transistors.

As described heretofore, according to the present invention, it is possible to convert the amount of incident light into an electric signal either logarithmically or linearly in accordance with the brightness, brightness range, or brightness distribution of a subject. This makes it possible to perform shooting properly at all times irrespective of the condition of light in which a subject is shot. For example, it is possible to make a solid-state image-sensing device perform logarithmic conversion to cope with a wide brightness range when a brightly-lit subject is shot and make it perform linear conversion to obtain satisfactory gradation when a dimly-lit subject is shot.

What is claimed is:

1. An image-sensing apparatus comprising:
a solid-state image-sensing device composed of a plurality of pixels individually including photosensitive portions that generate electric signals in accordance with the amount of light incident thereon, the solid-state image-sensing device operating selectively either in a first state in which the individual pixels output signals are obtained by linearly converting the electric signals generated by the photosensitive portions thereof for a given amount of incident light, or in a second state in which the individual pixels output signals are obtained by natural-logarithmically converting the electric signals generated by the photosensitive portions thereof for the given amount of incident light; and
a generator for generating a switching signal for switching the solid-state image-sensing device between the first and second states.

2. An image-sensing apparatus as claimed in claim 1, wherein the pixels of the solid-state image-sensing device individually include transistors to which the electric signals generated by the photosensitive portions are fed, and natural-logarithmically convert the electric signals generated by the photosensitive portions by exploiting a subthreshold characteristic of those transistors.

3. An image-sensing apparatus as claimed in claim 2, wherein the solid-state image-sensing device is switched between the first and second states as a result of the switching signal generated by the generator causing a potential fed to the transistors of the individual pixels to vary.

4. An image-sensing apparatus as claimed in claim 1, wherein the switching signal is a binary voltage signal.

5. An image-sensing apparatus as claimed in claim 1,
wherein the generator generates the switching signal on a basis of the signal output from the solid-state image-sensing device.

6. An image-sensing apparatus as claimed in claim 1,
wherein the generator generates the switching signal in accordance with brightness of a subject to be shot.

7. An image-sensing apparatus as claimed in claim 6,
wherein the generator, when the brightness of the subject to be shot is lower than a predetermined threshold value, generates a switching signal that brings the solid-state image-sensing device into the first state, and, when the brightness of the subject to be shot is higher than the predetermined threshold value, generates a switching signal that brings the solid-state image-sensing device into the second state.

8. An image-sensing apparatus as claimed in claim 1, further comprising:
an input member for receiving a manual operation from an operator,
wherein the generator generates the switching signal on a basis of the manual operation received through the input member.

9. An image-sensing apparatus as claimed in claim 1, further comprising:
an input member for receiving a manual operation from an operator,
wherein the generator operates selectively either in a first mode in which it generates the switching signal on a basis of the manual operation received through the input member or in a second mode in which it generates the switching signal automatically on a basis of a predetermined shooting condition.

10. An image-sensing apparatus as claimed in claim 9,
wherein the generator, when the input member is operated in the second mode, generates the switching signal preferentially on the basis of the manual operation received through the input member.

11. An image-sensing apparatus as claimed in claim 1, further comprising:
a detector for detecting a brightness range of a subject to be shot,
wherein the generator generates the switching signal on a basis of the brightness range of the subject to be shot detected by the detector.

12. An image-sensing apparatus as claimed in claim 11,
wherein the generator, when the brightness range of the subject to be shot is narrower than a predetermined threshold value, generates a switching signal that brings the solid-state image-sensing device into the first state, and, when the brightness range of the subject to be shot is wider than the predetermined threshold value, generates a switching signal that brings the solid-state image-sensing device into the second state.

13. An image-sensing apparatus as claimed in claim 1,
wherein the generator generates the switching signal on a basis of at least one of a distance to a subject to be shot and a shooting magnification.

14. An image-sensing apparatus as claimed in claim 1, further comprising:
an optical system having a variable focal length,
wherein the generator generates the switching signal on a basis of a focal length of the optical system.

15. An image-sensing apparatus as claimed in claim 1, further comprising:
an optical system that is focused on a subject to be shot selectively at least either at a wide-angle side or at a telephoto side,
wherein the generator generates the switching signal on a basis of whether the optical system is focused at the telephoto side or at the wide-angle side.

16. An image-sensing apparatus as claimed in claim 15,
wherein the generator, when the optical system is focused at the telephoto side, generates a switching signal that brings the solid-state image-sensing device into the first state, and, when the optical system is focused at the wide-angle side, generates a switching signal that brings the solid-state image-sensing device into the second state.

17. An image-sensing apparatus as claimed in claim 15,
wherein the optical system can be focused continuously between the wide-angle side and the telephoto side.

18. An image-sensing apparatus as claimed in claim 15,
wherein the optical system includes a plurality of optical systems having different focal lengths, and at which position between the wide-angle and telephoto sides to focus the optical system is controlled by switching among the plurality of optical systems.

19. An image-sensing apparatus as claimed in claim 1, further comprising:
an optical system that is focused on a subject to be shot selectively at least either at a wide-angle side or at a telephoto side,
wherein the generator generates the switching signal on a basis of a shooting range to be shot by the solid-state image-sensing device through the optical system.

20. An image-sensing apparatus as claimed in claim 19, further comprising:
a measurement portion for measuring a distance to the subject to be shot; and
a calculation portion for calculating the shooting range on a basis of the distance to the object to be shot measured by the measurement portion and a magnification of the optical system.

21. An image-sensing apparatus as claimed in claim 1, further comprising:
a brightness distribution evaluation portion for evaluating brightness distribution of a subject to be shot on a basis of brightness signals obtained from the individual pixels,
wherein the generator generates the switching signal on a basis of the brightness distribution evaluated by the brightness distribution evaluation portion.

22. An image-sensing apparatus as claimed in claim 1,
wherein the pixels each include a photosensitive device having a first electrode to which a direct-current voltage is applied and a second electrode, and a transistor having a first electrode and a control electrode both connected to the second electrode of the photosensitive device and a second electrode,
wherein the solid-state image-sensing device is switched between the first and second states as a result of the switching signal from the generator causing a potential difference between the first and second electrodes of the transistor of each pixel to vary.

23. An image-sensing apparatus as claimed in claim 1,
wherein the pixels each include a photosensitive device having a first electrode to which a direct-current voltage is applied and a second electrode, and a transistor having a first electrode connected to the second electrode of the photosensitive device and a second electrode and a control electrode connected together, wherein the solid-state image-sensing device is switched between the first and second states as a result of the switching signal from the generator causing a potential difference between the first and second electrodes of the transistor of each pixel to vary.

24. An image-sensing apparatus as claimed in claim 1,
wherein the pixels each include a photosensitive device having a first electrode to which a direct-current voltage is applied and a second electrode, and a transistor having a first electrode connected to the second electrode of the photosensitive device, a second electrode, and a control electrode to which a direct-current voltage is applied,
wherein the solid-state image-sensing device is switched between the first and second states as a result of the switching signal from the generator causing a potential difference between the first and second electrodes of the transistor of each pixel to vary.

25. An image-sensing apparatus as claimed in claim 1,
wherein the pixels each include a photosensitive device having a first electrode to which a direct-current voltage is applied and a second electrode, a first transistor having a first electrode, a second electrode connected to the second electrode of the photosensitive device, and a control electrode, and a second transistor having a first electrode to which a direct-current voltage is applied, a second electrode from which an electric signal is output, and a control electrode connected to the second electrode of the first transistor,
wherein the solid-state image-sensing device is switched between the first and second states as a result of the switching signal from the generator causing a potential difference fed to the control electrode of the first transistor of each pixel to vary.

26. An image-sensing apparatus comprising:
a plurality of pixels individually including photosensitive portions that generate electric signals in accordance with amount of light incident thereon;
a conversion portion for logarithmically converting the electric signals generated by the photosensitive portions;
an evaluation portion for evaluating brightness distribution of a subject to be shot on a basis of a signal output from the conversion portion; and
a determination portion for determining a brightness range of the subject to be shot on a basis of the brightness distribution evaluated by the evaluation portion.

27. An image sensing apparatus comprising:
a solid-state image-sensing device composed of a plurality of pixels individually including photosensitive portions that generate electric signals in accordance with an amount of light incident thereon, the solid-state image-sensing device operating in response to a given same amount of incident light in one of a plurality of output states; and
a generator for generating a switching signal for selecting one of the plurality of output states based on an output from the solid-state image-sensing device,
wherein the plurality of output states include a state in which the individual pixels output signals are obtained by linearly converting the electric signals generated by the photosensitive portions thereof for a given amount of incident light, and a state in which the individual pixels output signals are obtained by natural-logarithmically converting the electric signals generated by the photosensitive portions thereof for the given amount of incident light.

* * * * *